(12) United States Patent
Ohmae et al.

(10) Patent No.: US 9,319,742 B2
(45) Date of Patent: Apr. 19, 2016

(54) AUDIO-VISUAL TERMINAL, VIEWING AUTHENTICATION SYSTEM AND CONTROL PROGRAM

(71) Applicant: BUSINESS BREAKTHROUGH INC., Tokyo (JP)

(72) Inventors: Kenichi Ohmae, Tokyo (JP); Yasushi Ito, Tokyo (JP); Hidebumi Hara, Tokyo (JP)

(73) Assignee: BUSINESS BREAKTHROUGH INC., Tokyo (JP)

( * ) Notice: Subject to any disclaimer, the term of this patent is extended or adjusted under 35 U.S.C. 154(b) by 59 days.

(21) Appl. No.: 14/506,818

(22) Filed: Oct. 6, 2014

(65) Prior Publication Data

US 2015/0089519 A1  Mar. 26, 2015

Related U.S. Application Data

(62) Division of application No. 13/089,232, filed on Apr. 18, 2011, now Pat. No. 8,887,187.

(30) Foreign Application Priority Data

Apr. 19, 2010 (JP) ................................ 2010-096472
Apr. 19, 2010 (JP) ................................ 2010-096473
Dec. 24, 2010 (JP) ................................ 2010-288665

(51) Int. Cl.
*H04N 21/44* (2011.01)
*H04N 21/442* (2011.01)
*G09B 7/00* (2006.01)
(Continued)

(52) U.S. Cl.
CPC .......... *H04N 21/44218* (2013.01); *G06F 3/017* (2013.01);
(Continued)

(58) Field of Classification Search
None
See application file for complete search history.

(56) References Cited

U.S. PATENT DOCUMENTS 7,500,256 B1 * 3/2009 Ohmae et al. ..................... 725/9
2010/0070987 A1 * 3/2010 Amento et al. .................. 725/10

FOREIGN PATENT DOCUMENTS

JP  2002-041458 A  2/2002
JP  2003-228272 A  8/2003
(Continued)

OTHER PUBLICATIONS

Japanese Office Action dated Jul. 10, 2014, with partial English translation, for corresponding Japanese Application No. 2010-288665. Submitted in parent U.S. Appl. No. 13/089,232.
(Continued)

*Primary Examiner* — Cai Chen
(74) *Attorney, Agent, or Firm* — Squire Patton Boggs (US) LLP

(57) ABSTRACT

An audio-visual terminal and a viewing authentication system and control programs therefor are provided. The audio-visual terminal includes a reproducing part for reproducing the audio-visual program, a motion instructing part for instructing, a motion sensor for detecting a response motion of the viewer made by the viewer for transmission to a viewing authenticating principal, a sending part for sending information output from the audio-visual terminal to a viewing authentication system of the viewing authenticating principal, and a coding part for coding information about the response motion of the viewer obtained from a detection result detected by the motion sensor into a signal sendable by the sending part.

21 Claims, 19 Drawing Sheets

(51) Int. Cl.
*H04N 21/258* (2011.01)
*H04N 21/422* (2011.01)
*G06F 3/01* (2006.01)
*H04N 21/45* (2011.01)
*H04N 21/475* (2011.01)

(52) U.S. Cl.
CPC ............ *G09B 7/00* (2013.01); *H04N 21/25875* (2013.01); *H04N 21/42201* (2013.01); *H04N 21/4508* (2013.01); *H04N 21/475* (2013.01)

(56) References Cited

FOREIGN PATENT DOCUMENTS

| | | |
|---|---|---|
| JP | 3498057 B2 | 2/2004 |
| JP | 2004-252970 A | 9/2004 |

OTHER PUBLICATIONS

Office Action issued by JPO for JP 2010-096473, dispatched Nov. 12, 2013 and Partial Translation thereof. Submitted in parent U.S. Appl. No. 13/089,232.

* cited by examiner

| Program ID | Instruction ID | Viewer ID | Sending Time | Instruction Time | Instructed Motion | Authentication Criteria |
|---|---|---|---|---|---|---|
|  |  |  |  |  |  |  |
|  |  |  |  |  |  |  |
|  |  |  |  |  |  |  |

FIG. 14

| Authentication ID | Reproduction Authentication Point | Reproduction Operation History | Reception Time | Recorded Time | Viewing Authentication |
|---|---|---|---|---|---|
| | | 111a<br>111b<br>111c | | | 114a<br>114b |
| | | | | | |
| | | | | | |

Conventional viewing authentication method using broadcasting

AUDIO-VISUAL TERMINAL, VIEWING AUTHENTICATION SYSTEM AND CONTROL PROGRAM

CROSS REFERENCE TO RELATED APPLICATION

This is a Division of U.S. patent application Ser. No. 13/089,232 filed Apr. 18, 2011, which claims priority from Japanese Patent Application No. 2010-288665 filed Dec. 24, 2010; Japanese Patent Application No. 2010-096473 filed Apr. 19, 2010; and Japanese Patent Application No. 2010-096472 filed Apr. 19, 2010. The contents of these applications are hereby incorporated by reference.

BACKGROUND OF THE INVENTION

1. Technical Field

The present invention relates to remote education, such as education by correspondence or self-learning education, and, more specifically, to device and program for authenticating whether or not a viewer is actually viewing a remote education program.

2. Related Art

In remote education, the learners learn using programs provided through broadcasting media, such as television broadcasting or radio broadcasting, magnetic or optical recording media such as VTR, CD-ROM or DVD, printed media such as books or booklets, and electronic media such as the Internet. In conventional remote education, such as education by correspondence or self-learning education, the level of understanding of the contents is checked by giving examination questions to the learners and requiring the learners to submit the answers for the questions and used as criteria for judging the proficiency of the learners.

FIG. 22 is a view illustrating an audio-visual authentication method in remote education using satellite broadcasting as a broadcasting medium. In the drawing, reference numeral 1 denotes a video material for a program, 2 denotes a broadcast station, and 3 denotes a broadcast satellite, which may be either a geostationary orbit satellite or a low-earth-orbit satellite. Reference numeral 4 denotes a satellite broadcasting receiving tuner, and 5 denotes a TV set. Reference numeral 8 denotes a communication line, which may be either a public line or a dedicated (private-network) line. Reference numeral 12 denotes a response sheet, 13 denotes a facsimile machine, and 14 denotes postal service, which may be parcel delivery service by a private company (courier service). Reference numeral 15 denotes a remote education control center.

In the remote education constructed as above, the video material 1 as an educational material is broadcast as a program via the broadcast station 2 and the broadcast satellite 3. The viewer views (and/or listens to (just referred to as "view" hereinafter)) the program on the TV set 5 via the satellite broadcasting receiving tuner 4. After viewing the program, the viewer fills out the response sheet 12, and sends it to the control center 15 either by the facsimile machine 13 through the communication line 8 or by means of the postal service 14.

In the conventional remote education, however, it is impossible to know for certain whether or not the learner is viewing the program. That is, the problem is that confirmatory tests are conducted to confirm the learner's viewing in the remote education but it is impossible to know whether or not the learner has actually viewed the program only by checking the level of understanding as judged from the answers to the examination questions. The learner can give a correct answer without viewing the program if the learner has knowledge.

Another problem is that the learner cannot be identified from the response sheet 12 submitted as a response to the examination questions.

Yet another problem is that the confirmation of viewing takes much time because the collection of answer is made by means of the postal service 14, the facsimile machine 13 or the like.

As an invention for solving the problem of the conventional remote education, the invention disclosed in Patent Document 1 is known. Patent Document 1 discloses an invention in which the viewer's viewing of the audio-visual program is authenticated when the viewer transmits a viewing confirmation code, which is unique to the audio-visual program the viewer is viewing and consists of a predetermined character string to a viewing authenticating principal (or agent).

[Patent Document 1] JP-B2-P3498057 (refer to claim 1, FIG. 1 and FIG. 3)

The invention disclosed in Patent Document 1 is an outstanding invention compared to inventions known before the disclosure of the invention but has a problem because it may force the viewer of the audio-visual program to look away from the audio-visual program which the viewer is viewing for a while to watch his or her hand operating an audio-visual terminal when the viewer transmits a viewing confirmation code consisting of a predetermined character string via the audio-visual terminal operated by the viewer to the viewing authenticating principal. Especially, it is effective that the viewing authenticating principal authenticates the viewing when a part of the audio-visual program including important information is being presented, but the possibility which can be pointed out is that the viewer may miss important video images or description given by subtitles in the audio-visual program because the viewer looks away from the audio-visual program for a while to input a viewing confirmation code presented to the viewer in a part of the audio-visual program including important information into the audio-visual terminal operated by the viewer.

The present invention has been made to solve the above problems, and it is, therefore, an object of the present invention to provide audio-visual terminal and viewing authentication system suitable for authenticating that the viewer has viewed an audio-visual program, especially, for viewing authentication in remote education, and a program for controlling these devices.

SUMMARY OF THE INVENTION

To achieve the above objectives, in an audio-visual terminal of the first aspect, for example, an audio-visual terminal 20 shown in FIG. 1 operated by a viewer of an audio-visual program, the audio-visual terminal 20 includes a reproducing part 21 for reproducing the audio-visual program; a motion instructing part 22 for instructing, based on "motion instruction information 101" unique (or specific) to the audio-visual program with which a program provider that provides the audio-visual program requests the viewer to make a predetermined motion at times unique (specific times) to the audio-visual program, the viewer to make the motion (refer to FIG. 3); a motion sensor 23 for detecting a response motion of the viewer made by the viewer for transmission to a viewing authenticating principal, which authenticates that the viewer is normally viewing the audio-visual program, every time the motion is instructed by the motion instructing part 22; a sending part 29 for sending information output from the audio-visual terminal 20 to a viewing authentication system

40 of the viewing authenticating principal (refer to FIG. 8), for obtaining a viewing authentication; and a coding part 24 for coding "information about the response motion of the viewer" obtained from a detection result detected by the motion sensor 23 into a signal sendable by the sending part 29.

For example, the reproducing part 21 shown in FIG. 1 presents an audio-visual program provided by the program provider on the audio-visual terminal 20 operated by the viewer by means of video images and sounds. The reproducing part 21 has a liquid crystal display screen (refer to FIG. 6A) and an air-conduction loudspeaker (not shown) to present an audio-visual program to the viewer by means of video images and sounds.

For example, the motion instructing part 22 shown in FIG. 1 instructs the viewer to make a predetermined motion based on the "motion instruction information 101" unique to the audio-visual program with which the audio-visual program provider that provides an audio-visual program requests the viewer to make the motion at times unique to the audio-visual program (refer to FIG. 3). The motion instructing part 22 shows a sample of the predetermined motion the viewer should make in a part of the liquid crystal display screen (refer to FIG. 6A) of the reproducing part 21 by means of animation or text (refer to FIG. 6A). The motion instructing part 22 also emits a notification sound from the air-conduction loudspeaker (not shown) of the reproducing part 21 to alert the viewer.

For example, the motion sensor 23 shown in FIG. 1 is a detecting device, which detects a response motion of the viewer made by the viewer for transmission to a viewing authenticating principal, which authenticates that the viewer is normally viewing the audio-visual program, every time the motion is instructed by the motion instructing part 22. The term "motion" used herein refers to a movement of the body or a part of the body, a hand in particular, of the viewer. The movement is a one-dimensional, two-dimensional or three-dimensional movement, in other words, a movement detectable by the motion sensor 23. The motion sensor 23 has a three-axis six-degree-of-freedom acceleration sensor (not shown), for example, and has an auxiliary camera (not shown) for capturing the viewer to detect a response motion of the viewer.

For example, the sending part 29 shown in FIG. 1 sends the information output from the audio-visual terminal 20 to a viewing authentication system 40 of the viewing authenticating principal (refer to FIG. 8), for obtaining a viewing authentication. Specifically, the sending part 29 is an information communication instrument (wireless LAN communication instrument (router)) (not shown) wirelessly connectable to a public wireless LAN (Local Area Network) (not shown) for information communication.

For example, the coding part 24 codes "information about the response motion of the viewer" obtained from a detection result detected by the motion sensor 23 into a signal sendable by the sending part 29. The coding part 24 first acquires a detection of response motion of the viewer detected by the motion sensor 23 as a detection result (primary information) based on "authentication criteria" decided by the viewing authenticating principal. Also, the coding part 24 creates secondary information (derivative information), which is information indicated in an index of (numerically indicating) the detection result of the response motion of the viewer (primary information), based on the "authentication criteria." Also, the coding part 24 creates tertiary information (derivative information) as an authentication result from the secondary information indicated in an index of the detection result of the response motion of the viewer based on the "authentication criteria." As described above, the coding part 24 codes the "information about a response motion of the viewer" obtained from a detection result detected by the motion sensor 23 into a signal sendable by the sending part 29 based on the "authentication criteria" decided by the viewing authenticating principal.

With this configuration, the reproducing part for reproducing an audio-visual program of the audio-visual terminal operated by the viewer enables the audio-visual program viewer to reproduce and view an audio-visual program. Also, the motion instructing part for instructing the viewer to make the motion based on motion instruction information unique to the audio-visual program with which the audio-visual program provider requests the viewer to make the motion at times unique to the audio-visual program enables the audio-visual program viewer to recognize a predetermined motion the audio-visual program provider requests the viewer to make as a motion instruction given by the motion instructing part. Also, the audio-visual program viewer can have a response motion of the viewer detected by the motion sensor for detecting a response motion of the viewer made by the viewer for transmission to the viewing authenticating principal, which authenticates that the viewer is normally viewing the audio-visual program, every time the motion is instructed by the motion instructing part as a detection from the motion sensor. Also, the sending part for sending the information output from the audio-visual terminal to the viewing authentication system of the viewing authenticating principal, for obtaining a viewing authentication can send the information output from the audio-visual terminal to the viewing authenticating principal. Also, the coding part for coding information about the response motion of the viewer obtained from a detection result detected by the motion sensor into a signal sendable by the sending part can code the detection of the response motion of the viewer detected by the motion sensor into a signal sendable by the sending part as information about the response motion of the viewer obtained from the detection result detected by the motion sensor. Thus, the audio-visual program viewer can have the viewing authenticating principal authenticate that the viewer has viewed the audio-visual program based on the information about the response motion of the viewer obtained from the detection result detected by the motion sensor and sent by the sending part.

Also, in an audio-visual terminal of the second aspect, for example, an audio-visual terminal 20 shown in FIG. 1 according to the first aspect, wherein the coding part 24 has a motion authenticating part 24a (refer to FIG. 2) for outputting a "motion authentication" which determines the response motion of the viewer to be a valid response motion when the response motion of the viewer detected by the motion sensor 23 and the motion instructed to the viewer by the motion instructing part 22 are determined to agree with each other in the light of predetermined criteria.

For example, the coding part 24 shown in FIG. 1 and FIG. 2 has a motion authenticating part 24a (refer to FIG. 2) for authenticating that the response motion of the viewer detected by the motion sensor 23 agrees with the motion instructed to the viewer by the motion instructing part 22 in the light of predetermined criteria decided by the viewing authenticating principal (for example, "authentication criteria" requiring "the difference in acceleration to be a predetermined value (index value: 1.2 G (1.2 times the gravitational acceleration on the earth), for example) or smaller at a maximum" in order for the motions to be determined to agree with each other). Also, the motion authenticating part 24a of the coding part 24 outputs a "motion authentication (audio-visual terminal)

103a" (refer to FIG. 5) (tertiary information) when the response motion of the viewer detected by the motion sensor 23 is authenticated to agree with the motion instructed to the viewer by the motion instructing part 22 in the light of the predetermined criteria decided by the viewing authenticating principal.

With this configuration, because the coding part of the audio-visual terminal operated by the viewer has the motion authenticating part for outputting a motion authentication which determines the response motion of the viewer to be a valid response motion when the response motion of the viewer detected by the motion sensor and the motion instructed to the viewer by the motion instructing part are determined to agree with each other in the light of predetermined criteria is provided, the audio-visual program viewer can obtain a motion authentication that determines the response motion of the viewer to be a valid response motion. Also, the sending part of the audio-visual terminal can send the motion authentication to the viewing authentication system of the viewing authenticating principal. Thus, the audio-visual program viewer can have the viewing authenticating principal authenticate that the viewer has viewed the audio-visual program based on the motion authentication.

Also, in an audio-visual terminal of the third aspect, for example, an audio-visual terminal 20 shown in FIG. 1 according to the first aspect, wherein the coding part 24 has at least one authenticating part selected from a group consisting of a motion authenticating part 24a (refer to FIG. 2) for outputting a "motion authentication (audio-visual terminal) 103a" (refer to FIG. 5) which determines the response motion of the viewer to be a valid response motion when the response motion of the viewer detected by the motion sensor 23 and the motion instructed to the viewer by the motion instructing part 22 are determined to agree with each other in the light of predetermined criteria; a response authenticating part 24b (refer to FIG. 2) for outputting a "viewing authentication (audio-visual terminal) 105a" (refer to FIG. 5) based on a "motion response rate" when a "motion response rate" comparing the total number of pieces of the "motion instruction information 101" (refer to FIG. 3) and the total number of detections of the response motion of the viewer detected by the motion sensor 23 satisfies predetermined criteria; and a time authenticating part 24c (refer to FIG. 2) for outputting a "time authentication (audio-visual terminal) 104a" (refer to FIG. 5) based on a "period of time taken by the viewer to respond" when the "period of time taken by the viewer to respond" from the time when the motion instructing part 22 instructed the viewer to make the motion, which is output from a clock 28 of the audio-visual terminal 20 for outputting the times when the audio-visual terminal 20 performs a control operation, to the time when the response motion of the viewer was detected by the motion sensor 23, which is output from the clock 28, satisfies predetermined criteria, and includes the clock 28; and wherein the coding part 24 is configured to output "information about the response motion of the viewer" based on an authentication result output from the authenticating part and code the "information about the response motion of the viewer."

For example, the audio-visual terminal 20 shown in FIG. 1 has a clock 28 for outputting the times when the audio-visual terminal 20 performs a control operation.

Also, the coding part 24 shown in FIG. 1 (and FIG. 2) has a response authenticating part 24b (refer to FIG. 2) and a time authenticating part 24c (refer to FIG. 2) in addition to the motion authenticating part 24a (refer to FIG. 2) discussed previously.

For example, the response authenticating part 24b (refer to FIG. 2) of the coding part 24 shown in FIG. 1 (and FIG. 2) outputs a "viewing authentication (audio-visual terminal) 105a" (refer to FIG. 5) (tertiary information) based on a "motion response rate" when a "motion response rate" (secondary information) comparing the total number of pieces of "motion instruction information 101" (refer to FIG. 3) and the total number of detections of the response motion of the viewer detected by the motion sensor 23 satisfies predetermined criteria decided by the viewing authenticating principal (for example, "authentication criteria" requiring the "motion response rate" to be equal to or higher than a predetermined value ("80%," for example)" in order to obtain a viewing authentication based on a "motion response rate").

For example, the time authenticating part 24c (refer to FIG. 2) of the coding part 24 shown in FIG. 1 (and FIG. 2) outputs a "time authentication (audio-visual terminal) 104a" based on a "period of time taken by the viewer to respond" (refer to FIG. 5) (tertiary information) which determines that the "period of time taken by the viewer to respond" (secondary information) to be appropriate when the time when the response motion of the viewer was detected by the motion sensor 23, which is output from the clock 28, is within a predetermined time range decided by the viewing authenticating principal from the time when a motion was instructed to the viewer by the motion instructing part 22, which is output from the clock 28, (for example, the "period of time taken by the viewer to respond" is within a time range of a predetermined value (for example, three minutes) based on the "authentication criteria").

For example, the coding part 24 shown in FIG. 1 (and FIG. 2) has at least one authenticating part selected from the group consisting of the three authenticating parts, i.e., the motion authenticating part 24a (refer to FIG. 2), the response authenticating part 24b (refer to FIG. 2) and the time authenticating part 24c (refer to FIG. 2), and creates and codes the "information about a response motion of the viewer" (affirmative information indicating that "all the authentication criteria for the motion, response and time are satisfied," for example, or negative information indicating that "the authentication criteria for the motion are not satisfied," for example) (tertiary information) based on an authentication result output from the authenticating part.

With this configuration, because a clock for outputting the times when the audio-visual terminal operated by the viewer performs a control operation is provided, the audio-visual program viewer can have the viewing authenticating principal authenticate that the audio-visual program viewer has viewed the audio-visual program based on the times when the audio-visual terminal operated by the viewer performs a control operation, which is output from the clock. Also, because the coding part of the audio-visual terminal has the motion authenticating part for outputting a motion authentication which determines the response motion of the viewer to be a valid response motion when the response motion of the viewer detected by the motion sensor and the motion instructed to the viewer by the motion instructing part are determined to agree with each other in the light of predetermined criteria, it is possible to obtain a motion authentication that determines the response motion of the viewer to be a valid response motion. Also, the sending part of the audio-visual terminal can send the motion authentication to the viewing authentication system of the viewing authenticating principal. Thus, the audio-visual program viewer can have the authentication by the viewing authenticating principal that the viewer has viewed the audio-visual program based on the motion authentication. Also, because the cording part of the audio-visual terminal has the response authenticating part for outputting a viewing authentication based on a motion response rate when a motion response rate comparing the total number of pieces of the motion instruction information and the total number of detections of the response motion of the viewer detected by the motion sensor satisfies predetermined criteria, it is possible to obtain a viewing authentication based on the motion response rate. Also, the sending part of the audio-visual terminal can send the viewing authentication based on a motion response rate to the viewing authentication system of the viewing authenticating principal. Thus, the audio-visual program viewer can have the authentication by the viewing authenticating principal that the viewer has viewed the audio-visual program based on the viewing authentication based on a motion response rate. Also, because the coding part of the audio-visual terminal has a time authenticating part for outputting a time authentication based on a period of time taken by the viewer to respond which determines that the period of time taken by the viewer to respond to be appropriate when the time when the response motion of the viewer was detected by the motion sensor, which is output from the clock, is within a predetermined time range from the time when the motion was instructed to the viewer by the motion instructing part, which is output from the clock, it is possible to obtain a time authentication based on a period of time taken by the viewer to respond. Also, the sending part of the audio-visual terminal can send the time authentication based on a period of time taken by the viewer to respond to the viewing authentication system of the viewing authenticating principal. Thus, the audio-visual program viewer can have the authentication by the viewing authenticating principal that the viewer has viewed the audio-visual program based on the time authentication based on a period of time taken by the viewer to respond. Also, because the coding part of the audio-visual terminal has at least one authenticating part selected from the group consisting of the three authenticating part, i.e., the motion authenticating part, the response authenticating part and the time authenticating part, and is configured to output information about the response motion of the viewer based on an authentication result output from the authenticating part and code the information about the response motion of the viewer, the viewing authenticating principal can perform derivative and composite authentication to authenticate that the viewer has viewed the audio-visual program based on the information of the motion authentication, viewing authentication and time authentication.

Also, in an audio-visual terminal of the fourth aspect, for example, an audio-visual terminal 20 shown in FIG. 1 according to any one of the first to third aspect, the audio-visual terminal 20 further includes a response motion recording part 25 for recording detection results detected by the motion sensor 23 as a "response motion history;" a response motion comparing part 26 for comparing the detection result detected last by the motion sensor 23 and detection results except the detection result detected last by the motion sensor 23 in the "response motion history" recorded by the response motion recording part 25; and a viewer authenticating part 27 for outputting a "viewer authentication" which authenticates the viewer as the correct viewer to whom the program provider of the audio-visual program is supposed to provide the audio-visual program when the detection result detected last by the motion sensor 23 is determined to agree with the other detection results included in the "response motion history" in the light of predetermined criteria based on a result of comparison by the response motion comparing part 26.

For example, the response motion recording part 25 shown in FIG. 1 is a database-management system for recording pieces of "motion response information 102" (refer to FIG. 4) including a detection result detected by the motion sensor 23 as constituent information ("response motion") thereof in a response motion history database 31, which is a large-capacity storage device (hard disk/memory) connected to the response motion recording part 25. The response motion history database 31 can record pieces of information of "motion response information 102" including a detection result detected by the motion sensor 23 as constituent information ("response motion") thereof as a "response motion history." In each piece of "motion response information 102," a detection result (primary information) of the response motion of the viewer detected by the motion sensor 23 is recorded as information of "response motion" included in the "motion response information 102."

For example, the response motion recording part 25 shown in FIG. 1 can search and extract pieces of information (that is, "motion response information 102" (refer to FIG. 4), including a detection result (primary information) of the response motion of the viewer detected by the motion sensor 23 as constituent information thereof) from the "response motion history" recorded in the response motion history database 31 based on certain search conditions. Specifically, the response motion recording part 25 searches and extracts other detection results (pieces of "motion response information 102") made by the same viewer based on the same motion instruction from the "response motion history."

More specifically, each detection result detected by the motion sensor 23 shown in FIG. 1 (the information of "response motion" included in the "motion response information 102" (refer to FIG. 4)) is recorded in the response motion history database 31 together with related information added thereto by the coding part 24 as "motion response information 102." As information included in each piece of "motion response information 102," a piece of "motion instruction information 101" (refer to FIG. 3) corresponding to the piece of "motion response information 102," is recorded. As information included in the "motion instruction information 101," the information of "viewer ID," "instructed motion" and "instruction ID" is recorded. Thus, the response motion recording part 25 performs a search through the "response motion history" according to the search condition that each of the "viewer ID" and "instructed motion" among the information included in the "motion response information 102" is the same and the "instruction ID" is different to search and extract other detection results made by the same viewer based on an instruction to make the same motion and detected by the motion sensor 23.

For example, the response motion comparing part 26 shown in FIG. 1 compares the detection result (information of "response motion" included in the "motion response information 102" (refer to FIG. 4)) detected last by the motion sensor 23 and the detection results (information of "response motion" included in the "motion response information 102") searched and extracted by the response motion recording part 25. The response motion comparing part 26 quantitatively recognize the "differences between the detection results" detected by the motion sensor 23 (secondary information) by comparing a plurality of pieces of "motion response information 102" each other.

For example, the viewer authenticating part 27 shown in FIG. 1 is an authentication device for evaluating the "differences between response motions" quantitatively recognized by the response motion comparing part 26 (secondary information) in the light of predetermined criteria ("authentication criteria" decided by the viewing authenticating principal (refer to FIG. 3)). The viewer authenticating part 27 authenticates the viewer who made the response motion relating to the detection result detected last by the motion sensor 23 as the correct viewer to whom the audio-visual program provider is supposed to provide the audio-visual program when the difference (secondary information) between the detection result detected last by the motion sensor 23 (information of "response motion" included in the "motion response information 102" (refer to FIG. 4)) (primary information) and the average value of the other detection results searched and extracted by the response motion recording part 25 (information of "response motion" included in the "motion response information 102") (primary information) is within a reference range decided by the viewing authenticating principal (for example, "the difference in acceleration is determined to be within a range of 1.2 G or lower at a maximum" based on the "authentication criteria"). When the viewer made a response motion last is authenticated to be the correct viewer, the viewer authenticating part 27 outputs a "viewer authentication (audio-visual terminal) 106*a*" (refer to FIG. 5) (tertiary information). The output "viewer authentication (audio-visual terminal) 106*a*" (tertiary information) is sent to the viewing authentication system 40 of the viewing authenticating principal (refer to FIG. 8) by the sending part 29.

With this configuration, the audio-visual program viewer can have the response motion recording part for recording detection results detected by the motion sensor of the audio-visual terminal operated by the viewer as a response motion history record detection results detected by the motion sensor as a response motion history and search and extract detection results that satisfy certain conditions from the detection results. Also, the response motion comparing part for comparing the detection result detected last by the motion sensor and the detection results in the response motion history recorded by the response motion recording part except the detection result detected last by the motion sensor can quantitatively recognize the difference between the response motion the viewer made last and response motions the viewer made before. Also, the viewer authenticating part for outputting a viewer authentication which authenticates the viewer as the correct viewer to whom the audio-visual program provider is supposed to provide the audio-visual program when the detection result detected last by the motion sensor is determined to agree with other detection results included in the response motion history in the light of predetermined criteria based on the result of comparison by the response motion comparing part can obtain a viewer authentication which authenticates the viewer as the correct viewer to whom the audio-visual program provider is supposed to provide the audio-visual program based on authentication criteria decided by the viewing authenticating principal. Also, the sending part of the audio-visual terminal can send the viewer authentication to the viewing authentication system of the viewing authenticating principal. Thus, the audio-visual program viewer can have the viewing authenticating principal authenticate that the viewer has viewed the audio-visual program based on the viewer authentication.

Also, in an audio-visual terminal of the fifth aspect, for example, an audio-visual terminal 20*a* shown in FIG. 20 according to any one of the first to fourth aspect, wherein the motion instructing part 22 is configured to instruct, based on "touch instruction information" (not shown) unique to the audio-visual program with which the audio-visual program provider that provides the audio-visual program requests the viewer to make a predetermined touch at times unique to the audio-visual program, the viewer to make the touch; and includes a touch screen detecting part 35 for detecting a touch on the audio-visual terminal 20*a* made by the viewer for transmission to the viewing authenticating principal every time the touch is instructed by the motion instructing part 22; and wherein the coding part 24 is configured to code "information about the touch of the viewer" obtained from a detection result detected by the touch screen detecting part 35 into a signal sendable by the sending part 29.

For example, the motion instructing part 22 shown in FIG. 20 of the audio-visual terminal 20*a* instructs the viewer to make a predetermined touch based on the "touch instruction information" (not shown) unique to the audio-visual program with which the audio-visual program provider that provides an audio-visual program requests the viewer to make the touch at times unique to the audio-visual program, as in the case of the instructing a motion based on the "motion instruction information 101" (refer to FIG. 3), discussed previously. Also, the touch screen detecting part 35 of the audio-visual terminal 20*a* detects a predetermined touch on the audio-visual terminal 20*a*, which the viewer makes for transmission to the viewing authenticating principal every time a predetermined touch is instructed by the motion instructing part 22. Also, the coding part 24 of the audio-visual terminal 20*a* codes the "information about a touch of the viewer" obtained from a detection result detected by the touch screen detecting part 35 into a signal sendable by the sending part 29 as in the case of the "information about a response motion of the viewer," discussed previously.

With this configuration, the motion instructing part for instructing the viewer to make the predetermined touch based on the touch instruction information unique to the audio-visual program with which the audio-visual program provider that provides the audio-visual program requests the viewer to make the touch at times unique to the audio-visual program enables the audio-visual program viewer to recognize the touch the audio-visual program provider that provides the audio-visual program requests the viewer to make as a touch instruction given by the motion instructing part. Also, the audio-visual program viewer can have a touch of the viewer detected by the touch screen detecting part for detecting a touch of the viewer made by the viewer for transmission to the viewing authenticating principal, which authenticates that the viewer is normally viewing the audio-visual program, every time the touch is instructed by the motion instructing part as a detection from the touch screen detecting part. Also, the coding part for coding information about the touch of the viewer obtained from a detection result detected by the touch screen detecting part into a signal sendable by the sending part can code the detection of the touch of the viewer detected by the touch screen detecting part into a signal sendable by the sending part as information about the touch of the viewer obtained from the detection result detected by the touch screen detecting part. Also, the sending part for sending the information output from the audio-visual terminal to the viewing authentication system of the viewing authenticating principal for obtaining a viewing authentication can send the information output from the audio-visual terminal to the viewing authenticating principal.

Thus, when it is easier or more appropriate to respond by means of the instructed touch on the touch screen detecting part in response to a touch instruction from the motion instructing part than to respond by means of the instructed motion in response to a motion instruction from the motion instructing part in the light of the viewer's situation, for example, the viewer can select the touch on the touch screen detecting part of the audio-visual terminal to make a response. For example, when the viewer is temporarily in a place crowded with people or when the viewer does not want to attract attentions of others by making the response motion because the viewer is in a library or the like, the viewer can respond quietly by selecting a touch on the touch screen detecting part in response to the touch instruction. Thus, the audio-visual program viewer can have the viewing authenticating principal authenticate that the viewer has viewed the audio-visual program based on the information about the touch of the viewer obtained from the detection result detected by the touch screen detecting part and sent by the sending part.

Also, in an audio-visual terminal according to any one of the first to fifth aspect, an audio-visual terminal 20 shown in FIG. 1 may be provided as a portable terminal owned by the viewer, for example.

For example, the audio-visual terminal 20 shown in FIG. 1 is constructed small and light by the use of an electronic circuit integration technology. Thus, the viewer who operates the audio-visual terminal 20 can easily hold and operate the audio-visual terminal 20 with one hand.

With this configuration, because the audio-visual terminal operated by the viewer is provided as a portable terminal owned by the viewer, the audio-visual program viewer can take many opportunities to view an audio-visual program without being significantly limited by the conditions of the time and place where the audio-visual terminal is used. Especially, when the program provider provides remote education through remote education programs, which the viewer views using the audio-visual terminal, the viewer can take more opportunities to receive the remote education. In addition, because a viewing authentication system of the viewing authenticating principal can objectively authenticate that the viewer as a learner of the remote education program has viewed a remote education program, the viewer and the program provider, which provides the remote education program can properly realize the remote education, such as education by correspondence or self-taught education.

Also, in an audio-visual terminal according to any one of the first to fifth aspect, the reproducing part 21 of the audio-visual terminal 20 shown in FIG. 1 may be configured to receive and reproduce a broadcast audio-visual program, for example.

For example, the reproducing part 21 shown in FIG. 1 has a tuner (not shown) which can receive a broadcast of an audio-visual program and the information of "motion instruction information 101" (refer to FIG. 3) transmitted through wireless or wired broadcasting from the audio-visual program provider via a broadcast communication satellite, a radio tower on the ground or a wire communication cable. Thus, the received audio-visual program can be reproduced and presented to the viewer by the tuner of the reproducing part 21. Also, the motion instructing part 22 can instruct the viewer to make a motion when the reproducing part 21 transmits the "motion instruction information 101" received by the tuner of the reproducing part 21 to the motion instructing part 22.

With this configuration, because the reproducing part of the audio-visual terminal operated by the viewer is configured to receive and reproduce a broadcast audio-visual program, the audio-visual program viewer can take more opportunities to receive a broadcast audio-visual program and motion instruction information and view the audio-visual program.

Also, in an audio-visual terminal according to any one of the first to fifth aspect, the reproducing part 21 of the audio-visual terminal 20 shown in FIG. 1 may be configured to reproduce an audio-visual program recorded in a reproducible recording medium, for example.

For example, the reproducing part 21 shown in FIG. 1 also has a multimedia player (not shown) which can reproduce an audio-visual program recorded in an electromagnetically or optically reproducible recording medium such as a CD-R (Compact Disc Recordable), DVD (Digital Versatile Disc), MO (Magneto-Optical disc) or ROM (Read Only Memory) and provided by the audio-visual program provider. The information of "motion instruction information 101" (refer to FIG. 3) is also provided in the reproducible recording medium by the viewing authenticating principal. Thus, the reproducing part 21 can read the "motion instruction information 101" from the recording medium which can be played by the multimedia player of the reproducing part 21 and deliver the "motion instruction information 101" from the reproducing part 21 to the motion instructing part 22. Therefore, the motion instructing part 22 can instruct the viewer to make a motion.

With this configuration, because the reproducing part of the audio-visual terminal operated by the viewer is configured to reproduce an audio-visual program recorded in a reproducible recording medium, the audio-visual program viewer can reproduce the audio-visual program and use the information of "motion instructing information." Thus, the viewer can take more his or her opportunities, reproduce and view the audio-visual program.

Also, in an audio-visual terminal according to any one of the first to fifth aspect, the reproducing part 21 of the audio-visual terminal 20 shown in FIG. 1 may be configured to reproduce an audio-visual program converted into a form sendable through an electrical communication line, for example.

For example, the reproducing part 21 shown in FIG. 1 has an information communication instrument (wireless LAN communication instrument (router)) (not shown) connectable to a wide area network (WAN) via wireless or wired communication. Thus, the reproducing part 21 can reproduce an audio-visual program converted into a form sendable through an electrical communication line by the viewing authentication system 40 of the viewing authenticating principal (refer to FIG. 8) to present the audio-visual program to the viewer with the information communication instrument (wireless LAN communication instrument (router)). Also, the reproducing part 21 can obtain the "motion instruction information 101" (refer to FIG. 3) through the electrical communication line. Especially, the information communication instrument (wireless LAN communication instrument (router)) of the reproducing part 21 can reproduce and present an audio-visual program sendable through an electrical communication line to the viewer using an information communication technology such as streaming (stream distribution) or progressive download when the viewer can use the audio-visual terminal 20 with it connected to a high-speed electrical communication network.

With this configuration, because the reproducing part of the audio-visual terminal operated by the viewer is configured to reproduce an audio-visual program sendable through an electrical communication line, the audio-visual program viewer can obtain information of an audio-visual program and motion instruction information sendable through an electrical communication line. Thus, the viewer can take more his or her opportunities, reproduce and view the audio-visual program.

Also, in an audio-visual terminal of the sixth aspect, for example, an audio-visual terminal 20 shown in FIG. 1 according to any one of the first to fifth aspect, wherein the sending part 29 is configured to carry out the sending while the viewer is viewing the audio-visual program.

For example, the sending part 29 shown in FIG. 1 can send the information (primary information, secondary information and tertiary information) output from the audio-visual terminal 20 to the viewing authentication system 40 of the viewing authenticating principal (refer to FIG. 8) as needed even while the viewer is viewing an audio-visual program. Thus, when the audio-visual terminal 20 can perform high-speed bidirectional information communication via a high-speed electrical communication network, the sending part 29 can send the information (primary information, secondary information and tertiary information) output from the audio-visual terminal 20 to the viewing authentication system 40 as needed especially properly.

With this configuration, because the sending part of the audio-visual terminal operated by the viewer is configured to perform the sending while the viewer is viewing an audio-visual program, the audio-visual program viewer can have the information output from the audio-visual terminal send to the viewing authenticating principal as needed. Thus, the audio-visual program viewer can have the viewing authenticating principal authenticate that the viewer has viewed the audio-visual program at approximately the same time when the viewer is viewing the audio-visual program.

Also, in an audio-visual terminal of the seventh aspect, for example, an audio-visual terminal 20 shown in FIG. 1 according to any one of the first to fifth aspect, wherein the sending part 29 is configured to carry out the sending after the viewer has reproduced the audio-visual program.

For example, the audio-visual terminal 20 shown in FIG. 1 may not be able to be connected to a high-speed electrical communication network in some cases. One specific example is when an audio-visual program cannot be viewed using streaming (stream distribution) provided through a WAN by the viewing authenticating principal because the audio-visual terminal 20 is connected to a narrow band. Even in such a case, the viewer can view an audio-visual program transmitted via a broadcast or reproducible recording medium as described previously with the audio-visual terminal 20.

For example, the recording part 32 of the audio-visual terminal 20 shown in FIG. 1 does not send the information (primary information, secondary information and tertiary information) output from the audio-visual terminal 20 to the viewing authentication system 40 of the viewing authenticating principal (refer to FIG. 8) but records the information as needed while the viewer is viewing an audio-visual program.

Also, the viewer manually sends all the information (primary information, secondary information and tertiary information) output from the audio-visual terminal 20 and recorded in the recording part 32 to the viewing authentication system 40 of the viewing authenticating principal (refer to FIG. 8) at a time with the sending part 29 when the audio-visual terminal 20 shown in FIG. 1 is connected to a high-speed electrical communication network with sufficient communication capacity after reproducing the audio-visual program.

With this configuration, because the sending part of the audio-visual terminal operated by the viewer is configured to carry out the sending after the viewer has reproduced (finishes reproducing) an audio-visual program, the audio-visual program viewer can send all the information output from the audio-visual terminal at a time to the viewing authenticating principal with the sending part after the viewer has reproduced and viewed the audio-visual program with the audio-visual terminal even when the audio-visual terminal cannot be connected to a high-speed electrical communication network.

Also, in a control program of the eighth aspect, for example, a control program shown in FIG. 7 for controlling the audio-visual terminal 20 (refer to FIG. 1) operated by a viewer of an audio-visual program, the control program is configured to execute the steps of reproducing an audio-visual program; and instructing, based on a "motion instruction information 101" (refer to FIG. 3) unique to the audio-visual program with which a program provider that provides the audio-visual program requests the viewer to make a predetermined motion at times unique to the audio-visual program, the viewer to make the motion; and detecting a response motion of the viewer made by the viewer for transmission to a viewing authenticating principal, which authenticates that the viewer is normally viewing the audio-visual program, every time the motion is instructed, using a motion sensor 23; and cording "information about the response motion of the viewer" obtained from a detection result detected by the motion sensor 23 into a signal sendable; and sending information (primary information, secondary information and tertiary information) output from the audio-visual terminal 20 to a viewing authentication system 40 of the viewing authenticating principal (refer to FIG. 8), for obtaining a viewing authentication.

For example, the primary steps by which the control program shown in FIG. 7 controls the audio-visual terminal 20 (refer to FIG. 1) include the step of reproducing an audio-visual program, using the reproducing part 21 (refer to FIG. 1) (step M01). Also, the control program includes the primary step of instructing the viewer to make a motion based on the "motion instruction information 101" (refer to FIG. 3), using the motion instructing part 22 (refer to FIG. 1) (step M02). Also, the control program includes the primary step of detecting a response motion of the viewer, using the motion sensor 23 (refer to FIG. 1) (step M03). Also, the control program includes the primary step of coding a detection by the motion sensor 23, using the coding part 24 (refer to FIG. 1) to acquire it as a detection result (primary information) (step M04). Also, the control program includes the primary step of creating "motion response information 102" (refer to FIG. 4) based on the detection result (primary information) acquired, using the coding part 24 and coding it into a signal sendable by the sending part 29 (step M05). Also, the control program includes the primary step of sending the "motion response information 102" to the viewing authentication system 40 of the viewing authenticating principal (refer to FIG. 8), using the sending part 29 (refer to FIG. 1) (step M06).

With this configuration, the control program can properly control the audio-visual terminal operated by the viewer, and makes it possible to reproduce and present an audio-visual program to the viewer by the step of reproducing an audio-visual program. Also, the control program makes it possible to instruct the viewer to make a predetermined motion by the step of instructing the viewer to make a predetermined motion requested to the viewer by the program provider based on motion instruction information unique to the audio-visual program with which the audio-visual program provider requests the viewer to make the motion at times unique to the audio-visual program. Also, the control program makes it possible to detect the response motion made by the viewer by the step of detecting the response motion of the viewer made by the viewer for transmission to a viewing authenticating principal, which authenticates that the viewer is normally viewing the audio-visual program, every time the motion is instructed, using a motion sensor. Also, the control program makes it possible to acquire or create the information about a response motion of the viewer obtained from a detection result detected by the motion sensor as a signal sendable to the viewing authenticating principal by the step of coding information about a response motion of the viewer obtained from a detection result detected by the motion sensor into a sendable signal. Also, the control program makes it possible to send information output from the audio-visual terminal to the viewing authentication system of the viewing authenticating principal by the step of sending information output from the audio-visual terminal to the viewing authentication system of the viewing authenticating principal, for obtaining a viewing authentication. Thus, the audio-visual program viewer can have the viewing authenticating principal authenticate that the viewer has viewed the audio-visual program based on the information about the response motion of the viewer obtained from the detection result detected by the motion sensor.

Also, in a viewing authentication system of the ninth aspect, for example, a viewing authentication system 40 shown in FIG. 8 for authenticating that a viewer of an audio-visual program is normally viewing the audio-visual program, the viewing authentication system 40 includes a program sending part 41 for sending the audio-visual program to an audio-visual terminal 20 (refer to FIG. 1) operated by the viewer in response to a request from the viewer; a motion instruction information creating part 42 for creating "motion instruction information 101" (refer to FIG. 3) unique to the audio-visual program which consists of information with which a program provider that provides the audio-visual program requests the viewer to make a predetermined motion at times unique to the audio-visual program; a motion instruction information sending part 43 for sending the "motion instruction information 101" to the audio-visual terminal 20 operated by the viewer; a receiving part 44 for receiving "information about a response motion of the viewer" which is obtained from a detection result detected by a motion sensor 23 (refer to FIG. 1) of the audio-visual terminal 20 and which is output from the audio-visual terminal 20 operated by the viewer and sent back to transmit the fact that the viewer is normally viewing the audio-visual program; a received information processing part 45 for processing the received "information about a response motion of the viewer" into "information for use in authenticating that the viewer has viewed the audio-visual program;" and an authentication recording part 53 for recording the "information for use in authenticating that the viewer has viewed the audio-visual program" output from the viewing authentication system 40 to authenticate that the viewer has viewed the audio-visual program; and wherein the received information processing part 45 has a motion analyzing/specifying part 45a for analyzing the received "information about a response motion of the viewer" to specify the response motion of the viewer.

For example, the viewing authentication system 40 shown in FIG. 8 is a dedicated server of the viewing authenticating principal connected to a WAN (Wide Area Network). The viewing authentication system 40 has a dedicated "information service web page" (not shown) created in HTML language (Hyper Text Markup Language) and capable of providing information of an audio-visual program to the viewer. The viewing authentication system 40 receives a "program sending request 100" (refer to FIG. 10) from the viewer through the dedicated "information service web page." The viewing authentication system 40 also presents a dedicated "information service web page (simple viewer authentication page)" to check if the viewer who sent the "program sending request 100" is the correct viewer to whom the audio-visual program provider is supposed to provide the audio-visual program. The correct viewer has been previously notified of information of a "viewer ID" (refer to FIG. 3) and a "password" unique to the "viewer ID" (simple viewer authentication information) (not shown) issued by the viewing authenticating principal. The viewer inputs the information of both the "viewer ID" and "password" in appropriate entry fields in the dedicated "information service web page" offered by the viewing authentication system 40.

For example, the program sending part 41 shown in FIG. 8 is a streaming server connected to a WAN for sending an audio-visual program to the audio-visual terminal 20 operated by the viewer (refer to FIG. 1) based on a "program sending request 100" (refer to FIG. 10) from the viewer who is identified as the correct viewer by means of the "viewer ID"(refer to FIG. 3) and the "password" (not shown) in a simple manner by the viewing authentication system 40. The information of the audio-visual program is recorded in a program database 51 connected to the program sending part 41.

For example, the motion instruction information creating part 42 shown in FIG. 8 creates "motion instruction information 101" (refer to FIG. 3) unique to each audio-visual program and consisting of information with which the audio-visual program provider requests the viewer to make a predetermined motion at times unique to the audio-visual program. The motion instruction information creating part 42 creates the "motion instruction information 101" at times unique to the audio-visual program with reference to the information indicating the times unique to the audio-visual program decided by the audio-visual program provider and recorded in the program database 51 connected to the motion instruction information creating part 42.

For example, the motion instruction information sending part 43 shown in FIG. 8 is an information communication device for sending the "motion instruction information 101" (refer to FIG. 3) to the audio-visual terminal 20 operated by the viewer (refer to FIG. 1) at times unique to the audio-visual program. Specifically, the motion instruction information sending part 43 is an information communication instrument (high-speed wired information communication instrument (router)) connected to a WAN. The motion instruction information sending part 43 sends the "motion instruction information 101" created by the motion instruction information creating part 42 to the audio-visual terminal 20 operated by the viewer at times unique to the audio-visual program.

For example, the receiving part 44 shown in FIG. 8 is an information communication device for receiving "information about a response motion of the viewer" (primary information, secondary information and tertiary information) obtained from a detection result detected by the motion sensor 23 (refer to FIG. 1) of the audio-visual terminal 20 and sent back by the viewer with the sending part 29 (refer to FIG. 1) of the audio-visual terminal 20 operated by the viewer (refer to FIG. 1) to transmit the fact that the viewer is normally viewing the audio-visual program. Specifically, the receiving part 44 is, just like the motion instruction information sending part 43, an information communication instrument (high-speed wired information communication instrument (router)) connected to a WAN.

For example, the received information processing part 45 shown in FIG. 8 (and FIG. 9) is an information processing device for creating "information about a response motion of the viewer" (secondary information and tertiary information) which is obtained from a detection result (primary information) detected by the motion sensor 23 (refer to FIG. 1) of the audio-visual terminal 20 operated by the viewer (refer to FIG. 1) and received by the receiving part 44.

For example, the received information processing part 45 shown in FIG. 8 (and FIG. 9) first creates derivative information with an order lower than secondary information derived from the primary information, such as quantitative information of the movement of the viewer or the audio-visual terminal 20 (refer to FIG. 1) created by, for example, performing a numerical analysis on the primary information, by processing the primary information (detection result detected by the motion sensor 23 (refer to FIG. 1)) based on the "authentication criteria." Also, the received information processing part 45 creates secondary information, which is an index value indicated in an index of (numerically indicating) the response motion of the viewer, from the primary information (or derivative information) based on the "authentication criteria." Also, the received information processing part 45 creates information (tertiary information) for use in authenticating that the viewer has viewed the audio-visual program from the secondary information (information indicated in an index of the response motion of the viewer) based on "authentication criteria."

For example, the received information processing part 45 shown in FIG. 8 (and FIG. 9) has a motion analyzing/specifying part 45*a* (refer to FIG. 9) for analyzing the detection result (primary information) detected by the motion sensor 23 (refer to FIG. 1), which is output from the audio-visual terminal 20 operated by the viewer (refer to FIG. 1) and received by the receiving part 44, to specify the movement of the audio-visual terminal 20 (response motion of the viewer) in a three-dimensional space. The motion analyzing/specifying part 45*a* of the received information processing part 45 performs a numerical analysis to specify the movement of the audio-visual terminal 20 (response motion of the viewer) in a three-dimensional space from the detection result (primary information) in each of dimensions of acceleration, angular acceleration, velocity, angular velocity, displacement (on the three orthogonal coordinate axes) and displacement (about the three orthogonal coordinate axes).

For example, the authentication recording part 53 shown in FIG. 8 is a database device for collecting and recording information that the viewing authenticating principal uses as a basis to authenticate the viewer's viewing of an audio-visual program as "authentication record 107" (refer to FIG. 5). The authentication recording part 53 collects and records the "information for use in authenticating that the viewer has viewed an audio-visual program" (primary information, secondary information and tertiary information) output from the viewing authentication system 40 and the audio-visual terminal 20 (refer to FIG. 1) as information included in the "authentication record 107" to authenticate the viewer's viewing of the audio-visual program.

With this configuration, the viewing authenticating principal can send the audio-visual program to the audio-visual terminal operated by the viewer with the program sending part for sending an audio-visual program recorded and owned by the viewing authentication system of the viewing authenticating principal to the audio-visual terminal operated by the viewer in response to a request from the viewer. Also, the motion instruction information creating part for creating motion instruction information unique to each audio-visual program and consisting of information with which the audio-visual program provider requests the viewer to make a predetermined motion at times unique to the audio-visual program can create the motion instruction information to request the viewer to make the motion. Also, the motion instruction information sending part for sending motion instruction information to the audio-visual terminal operated by the viewer can send the motion instruction information to the audio-visual terminal operated by the viewer. Also, the receiving part for receiving the information about a response motion of the viewer which is obtained from a detection result detected by the motion sensor of the audio-visual terminal operated by the viewer and output from the audio-visual terminal and which is sent back to transmit the fact that the viewer is normally viewing the audio-visual program can receive the information about a response motion of the viewer obtained from a detection result detected by the motion sensor of the audio-visual terminal operated by the viewer. Also, the received information processing part for processing the received information about a response motion of the viewer into information for use in authenticating that the viewer has viewed the audio-visual program can process the received information about a response motion of the viewer detected by the motion sensor of the audio-visual terminal to obtain information for use in authenticating that the viewer has viewed the audio-visual program. Also, because the authentication recording part for recording information for use in authenticating that the viewer has viewed the audio-visual program, which is output from the viewing authentication system to authenticate the viewing, is provided, it is possible to collect and record information which is used as a basis to authenticate that the viewer has viewed the audio-visual program as information included in the authentication record. Thus, the viewing authenticating principal can authenticate that the viewer has viewed the audio-visual program based on the authentication record.

Also, in a viewing authentication system of the tenth aspect, for example, a viewing authentication system 40 shown in FIG. 8 according to the ninth aspect, wherein the received information processing part 45 has a motion authenticating part 45*b* (refer to FIG. 9) for outputting a "motion authentication" which determines that the response motion of the viewer is a valid response motion when the response motion of the viewer obtained from a detection result detected by the motion sensor 23 of the audio-visual terminal 20 (refer to FIG. 1) and the motion instructed by the "motion instruction information 110" (refer to FIG. 3) sent from the motion instruction information sending part 42 are determined to agree with each other in the light of predetermined criteria.

For example, the motion authenticating part 45*b* (refer to FIG. 9) of the received information processing part 45 shown in FIG. 8 outputs a "motion authentication (viewing authentication system) 103*b*" (refer to FIG. 5) (tertiary information) when the response motion of the viewer (primary information) obtained from a detection result detected by the motion sensor 23 (refer to FIG. 1) and the motion instructed to the viewer by the "motion instruction information 101" (refer to FIG. 3) are authenticated to agree with each other in the light of predetermined criteria (for example, "authentication criteria" requiring "the difference in acceleration to be 1.2 G or lower at a maximum in order for the motions to be determined to agree with each other") decided by the viewing authenticating principal.

With this configuration, because the received information processing part of the viewing authentication system of the viewing authenticating principal has the motion authenticating part for outputting a motion authentication which determines that the response motion of the viewer is a valid response motion when the response motion of the viewer obtained from a detection result detected by the motion sensor of the audio-visual terminal and the motion instructed by the motion instruction information and sent by the motion instruction information sending part are determined to agree with each other in the light of predetermined criteria, the viewing authenticating principal can obtain a motion authentication which determines that the response motion of the viewer is a valid response motion. Also, the authentication recording part of the viewing authentication system can record the motion authentication as information included in the authentication record. Thus, the viewing authenticating principal can authenticate that the viewer has viewed the audio-visual program based on the motion authentication.

Also, in a viewing authentication system of the eleventh aspect, for example, a viewing authentication system 40 shown in FIG. 8 according to the ninth or tenth aspect, the viewing authentication system 40 further includes a clock 49 for outputting the times when the viewing authentication system 40 performs a control operation; wherein the received information processing part 45 has a first time authenticating part 45c (refer to FIG. 9) which, when the "period of time taken to communicate with the viewer" from the time when the motion instruction information sending part 43 sent the "motion instruction information 101" (refer to FIG. 3), which is output from the clock 49, to the time when "information about a response motion of the viewer" obtained from a detection result detected by the motion sensor 23 (refer to FIG. 1) of the audio-visual terminal 20 operated by the viewer (refer to FIG. 1) and sent from the audio-visual terminal 20 was received by the receiving part 44, which is output from the clock 49, is within a predetermined time range, outputs a "time authentication (viewing authentication system) 104b" (refer to FIG. 5) based on a "period of time taken to communicate with the viewer" that determines the "period of time taken to communicate with the viewer" to be appropriate.

For example, the viewing authentication system 40 shown in FIG. 8 has a clock 49 for outputting the times when the viewing authentication system 40 performs a control operation.

Also, the first time authenticating part 45c (refer to FIG. 9) of the received information processing part 45 shown in FIG. 8 outputs a "time authentication (viewing authentication system) 104b" based on a "period of time taken to communicate with the viewer" (refer to FIG. 5) (tertiary information) which determines that the "period of time taken to communicate with the viewer" to be appropriate when the "period of time taken to communicate with the viewer" (secondary information) from the time when the "motion instruction information 101" (refer to FIG. 3) was sent by the motion instruction information sending part 43 (sending time), which is output from the clock 49, to the time when the "information about a response motion of the viewer" obtained from a detection result detected by the motion sensor 23 (refer to FIG. 1) of the audio-visual terminal 20 (refer to FIG. 1) and sent from the audio-visual terminal 20 was received by the receiving part 44 (reception time) is within a predetermined time range (for example, the "period of time taken to communicate with the viewer" is within a time range of "five minutes or shorter" based on the "authentication criteria").

Also, the authentication recording part 53 of the viewing authentication system 40 shown in FIG. 8 records the "time authentication (viewing authentication system) 104b" based on a "period of time taken to communicate with the viewer" (refer to FIG. 5) (tertiary information) output from the first time authenticating part 45c (refer to FIG. 9) of the received information processing part 45 as information included in the "authentication record 107" (refer to FIG. 5).

With this configuration, because a clock for outputting the times when the viewing authentication system of the viewing authenticating principal performs a control operation is provided, the viewing authenticating principal can use the information of the times when the viewing authentication system performed a control operation, which is output from the clock, to authenticate the viewer's viewing of an audio-visual program. Also, because the received information processing part of the viewing authentication system has the first time authenticating part for outputting a time authentication based on a period of time taken to communicate with the viewer which determines the period of time taken to communicate with the viewer to be appropriate when the period of time taken to communicate with the viewer from the time when the motion instruction information sending part sent the motion instruction information, which is output from the clock, to the time when the information about a response motion of the viewer obtained from a detection result detected by the motion sensor of the audio-visual terminal operated by the viewer and sent from the audio-visual terminal was received by the receiving part, which is output from the clock, is within a predetermined time range, the viewing authenticating principal can record the time authentication based on a period of time taken to communicate with the viewer as information included in the authentication record recorded by the authentication recording part of the viewing authentication system. Thus, the viewing authenticating principal can authenticate that the viewer has viewed the audio-visual program based on the time authentication based on a period of time taken to communicate with the viewer.

Also, in a viewing authentication system of the twelfth aspect, for example, a viewing authentication system 40 shown in FIG. 8 according to any one of the ninth to eleventh aspect, wherein the received information processing part 45 has a second time authenticating part 45d (refer to FIG. 9) which, when the "period of time taken by the viewer to respond" from the time when the audio-visual terminal 20 instructed the viewer to make the motion, which is output from a clock 28 (refer to FIG. 1) of the audio-visual terminal 20 operated by the viewer (refer to FIG. 1) and received by the receiving part 44, to the time when the response motion of the viewer was detected by the motion sensor 23 (refer to FIG. 1) of the audio-visual terminal 20, which is output from the clock 28 of the audio-visual terminal 20 operated by the viewer and received by the receiving part 44, is within a predetermined time range, outputs a "time authentication (viewing authentication system) 104b" (refer to FIG. 5) (tertiary information) based on a "period of time taken by the viewer to respond" that determines the "period of time taken by the viewer to respond" to be appropriate.

For example, the second time authenticating part 45d (refer to FIG. 9) of the received information processing part 45 shown in FIG. 8 outputs a "time authentication (viewing authentication system) 104b" based on a "period of time taken by the viewer to respond" (refer to FIG. 5) (tertiary information) which determines the "period of time taken by the viewer to respond" (secondary information) to be appropriate when the "period of time taken by the viewer to respond" (secondary information) from the time when a motion was instructed to the viewer by the motion instructing part 22 (refer to FIG. 1), which is output from the clock 28 (refer to FIG. 1) of the audio-visual terminal 20 operated by the viewer (refer to FIG. 1) and received by the receiving part 44, to the time when a response motion of the viewer was detected by the motion sensor 23 (refer to FIG. 1) of the audio-visual terminal 20, which is output from the clock 28 of the audio-visual terminal 20 operated by the viewer received by the receiving part 44, is within a predetermined time range (for example, the "period of time taken by the viewer to respond" is within a time range of "three minutes or shorter" based on the "authentication criteria").

With this configuration, because the received information processing part of the viewing authentication system of the viewing authenticating principal has the second time authenticating part for outputting a time authentication based on a period of time taken by the viewer to respond which determines the period of time taken by the viewer to respond to be appropriate when the period of time taken by the viewer to respond from the time when the audio-visual terminal instructed the viewer to make the motion, which is output from the clock of the audio-visual terminal operated by the viewer and received by the receiving part, to the time when the response motion of the viewer was detected by the motion sensor of the audio-visual terminal, which is output from the clock of the audio-visual terminal operated by the viewer and received by the receiving part, is within a predetermined time range, the viewing authenticating principal can obtain the time authentication based on a period of time taken by the viewer to respond. Also, the authentication recording part of the audio-visual terminal can record the time authentication based on a period of time taken by the viewer to respond as information included in the authentication record. Thus, the viewing authenticating principal can authenticate that the viewer has viewed the audio-visual program based on the time authentication based on a period of time taken by the viewer to respond.

Also, in a viewing authentication system of the thirteenth aspect, for example, a viewing authentication system 40 shown in FIG. 8 according to any one of the ninth to twelfth aspects, the viewing authentication system 40 further includes a response motion recording part 46 for recording detection results detected by the motion sensor 23 (refer to FIG. 1) of the audio-visual terminal 20 operated by the viewer (refer to FIG. 1) and received by the receiving part 44 as a "response motion history;" a response motion comparing part 47 for comparing the detection result detected last by the motion sensor 23 and detection results except the detection result detected last by the motion sensor 23 in the "response motion history" recorded by the response motion recording part 46; and a viewer authenticating part 48 for outputting a "viewer authentication (viewing authentication system) 106*b*" (refer to FIG. 5) which authenticates the viewer as the correct viewer to whom the program provider of the audio-visual program is supposed to provide the audio-visual program when the detection result detected last by the motion sensor 23 is determined to agree with the other detection results included in the "response motion history" in the light of predetermined criteria based on a result of comparison by the response motion comparing part 47.

For example, the response motion recording part 46 shown in FIG. 8 is, just like the response motion recording part 25 (refer to FIG. 1) of the audio-visual terminal 20 operated by the viewer (refer to FIG. 1) discussed previously, a database-management system for recording the detection result (primary information) detected last by the motion sensor 23 (refer to FIG. 1) of the audio-visual terminal 20 operated by the viewer and received by the receiving part 44 in a response motion history database 52 as a large-capacity storage device (hard disk) connected to the response motion recording part 46. Thus, the response motion history database 52 can record all the detection results (primary information) detected by the motion sensor 23 of the audio-visual terminal 20 operated by the viewer and received by the receiving part 44 as a "response motion history."

For example, the response motion recording part 46 shown in FIG. 8 can, just like the response motion recording part 25 (refer to FIG. 1) of the audio-visual terminal 20 operated by the viewer (refer to FIG. 1) as discussed previously, search and extract pieces of information that satisfy certain search conditions in the "response motion history" (detection results (primary information) detected by the motion sensor 23 (refer to FIG. 1) of the audio-visual terminal 20 operated by the viewer) recorded in the response motion history database 52. Specifically, the response motion recording part 46 searches and extracts other detection results (primary information) made by the same viewer based on the same motion instruction from the "response motion history."

More specifically, a detection result (primary information) detected by the motion sensor 23 (refer to FIG. 1) is received by the receiving part 44 shown in FIG. 8 and undergoes information processing by the received information processing part 45, and is then recorded in the response motion history database 52 as information of "response motion" included in the "motion response information 102" (refer to FIG. 4). Also, as information included in the "motion response information 102," "motion instruction information 101" (refer to FIG. 3), which is information corresponding to the "motion response information 102," is recorded, and as information included in the "motion instruction information 101," information of "viewer ID," "instructed motion," and "instruction ID" is recorded. Thus, the response motion recording part 25 is able to perform a search through the "response motion history" according to the search condition that the "viewer ID" and "instructed motion" are the same and the "instruction ID" is different to search and extract other detection results ("response motion" included in the "motion response information 102") (primary information) made by the same viewer based on an instruction to make the same motion.

For example, the response motion comparing part 47 shown in FIG. 8 compares, just like the response motion comparing part 26 (refer to FIG. 1) of the audio-visual terminal 20 operated by the viewer (refer to FIG. 1) as discussed previously, the detection result detected last by the motion sensor 23 (refer to FIG. 1) (information of "response motion" included in the "motion response information 102" (refer to FIG. 4)) (primary information) and other detection results (information of "response motion" included in the "motion response information 102") (primary information) searched and extracted by the response motion recording part 46. The response motion comparing part 47 can quantitatively recognize the differences (secondary information) between the detection results (primary information) detected by the motion sensor 23 by comparing a plurality of pieces of "motion response information 102" to each other.

For example, the viewer authenticating part 48 shown in FIG. 8 is, just like the viewer authenticating part 27 (refer to FIG. 1) of the audio-visual terminal 20 operated by the viewer (refer to FIG. 1) discussed previously, an authentication device for evaluating the differences (secondary information) between "response motions" (primary information) quantitatively recognized by the response motion comparing part 47 in the light of predetermined criteria decided by the viewing authenticating principal. The viewer authenticating part 48 authenticates the viewer who made the response motion last as the correct viewer to whom the program provider is supposed to provide the audio-visual program when the difference (secondary information) in "response motion" (primary information) between the detection result detected last by the motion sensor 23 (refer to FIG. 1) (the information of "response motion" included in the "motion response information 102" (refer to FIG. 4)) (primary information) and the other detection results (information of "response motion" included in the "motion response information 102") (primary information) searched and extracted by the response motion recording part 46 is determined to be within a reference range decided by the viewing authenticating principal (for example, the "difference in acceleration is 1.2G or smaller at a maximum" based on the "authentication criteria"). When the viewer made a response motion last is authenticated to be the correct viewer, the viewer authenticating part 48 outputs a "viewer authentication (viewing authentication system)

106*b*" (refer to FIG. 5) (tertiary information). Also, the authentication recording part 53 records the output "viewer authentication (viewing authentication system) 106*b*" as information included in the "authentication record 107" (refer to FIG. 5).

With this configuration, the viewing authenticating principal can have the response motion recording part for recording detection results detected by the motion sensor of the audio-visual terminal operated by the viewer and received by the receiving part of the viewing authentication system of the viewing authenticating principal as a response motion history record detection results detected by the motion sensor as a response motion history and search and extract detection results that satisfy certain conditions from the detection results. Also, the response motion comparing part for comparing the detection result detected last by the motion sensor and the detection results in the response motion history recorded by the response motion recording part except the detection result detected last by the motion sensor can quantitatively recognize the difference between the response motion the viewer made last and response motions the viewer made before. Also, the viewer authenticating part for outputting a viewer authentication which authenticates the viewer as the correct viewer to whom the audio-visual program provider is supposed to provide the audio-visual program when the detection result detected last by the motion sensor is determined to agree with other detection results included in the response motion history in the light of predetermined criteria based on the result of comparison by the response motion comparing part can obtain a viewer authentication which authenticates the viewer as the correct viewer to whom the audio-visual program provider is supposed to provide the audio-visual program based on authentication criteria decided by the viewing authenticating principal. Also, viewing authenticating principal can record the viewer authentication as information included in the authentication record by the Authentication recording part of the viewing authentication system. Thus, the viewing authenticating principal can authenticate that the viewer has viewed the audio-visual program based on the viewer authentication.

Also, in a viewing authentication system of the fourteenth aspect, for example, a viewing authentication system 40 shown in FIG. 8 according to any one of the ninth to thirteenth aspect, wherein the motion instruction information creating part 42 is configured to create "touch instruction information" (not shown) unique to the audio-visual program and consisting of information with which the program provider that provides the audio-visual program requests the viewer to make a predetermined touch at times unique to the audio-visual program; and the motion instruction information sending part 43 is configured to send the "touch instruction information" to the audio-visual terminal 20*a* operated by the viewer (refer to FIG. 20); and the receiving part 44 is configured to receive "information about a touch of the viewer" which is obtained from a detection result detected by a touch screen detecting part 35 (refer to FIG. 20) of the audio-visual terminal 20*a* operated by the viewer and which is output from the audio-visual terminal 20*a* and sent back to transmit the fact that the viewer is normally viewing the audio-visual program; and the received information processing part 45 is configured to process the received "information about a touch of the viewer" into "information for use in authenticating that the viewer has viewed the audio-visual program."

For example, the motion instruction information creating part 42 of the viewing authentication system 40 shown in FIG. 8 creates, just like the "motion instruction information 101" (refer to FIG. 3) discussed previously, "touch instruction information" (not shown) unique to each audio-visual program and consisting of information with which the audio-visual program provider requests the viewer to make a predetermined touch at times unique to the audio-visual program. Also, the motion instruction information sending part 43 of the viewing authentication system 40, as in the case of the "motion instruction information 101" discussed previously, sends the "touch instruction information" to the audio-visual terminal 20*a* operated by the viewer (refer to FIG. 20). Also, the receiving part 44 of the viewing authentication system 40 receives, as in the case of the "information about a response motion of the viewer" discussed previously, the "information about a touch of the viewer" obtained from a detection result detected by the touch screen detecting part 35 of the audio-visual terminal 20*a* operated by the viewer, which is sent back to transmit the fact that the viewer is normally viewing the audio-visual program. Also, the received information processing part 45 of the viewing authentication system 40 processes, as in the case of the "information about a response motion of the viewer" discussed previously, the received "information about a touch of the viewer" into "information for use in authenticating that the viewer has viewed the audio-visual program."

With this configuration, the motion instruction information creating part for creating the touch instruction information unique to the audio-visual program and consisting of information with which the audio-visual program provider that provides the audio-visual program requests the viewer to make the predetermined touch at times unique to the audio-visual program enables the viewing authenticating principal to create the touch instruction information requesting the viewer to make the touch. Also, the motion instruction information sending part for sending the touch instruction information to the audio-visual terminal operated by the viewer can send the touch instruction information to the audio-visual terminal operated by the viewer. Also, the receiving part for receiving the information about a touch of the viewer obtained from a detection result detected by the touch screen detecting part of the audio-visual terminal operated by the viewer and which is output from the audio-visual terminal and sent back to transmit the fact that the viewer is normally viewing the audio-visual program can receive the information about a touch of the viewer obtained from a detection result detected by the touch screen detecting part of the audio-visual terminal operated by the viewer. Also, the received information processing part for processing the received information about a touch of the viewer into information for use in authenticating that the viewer has viewed the audio-visual program can process the received information about a touch of the viewer detected by the touch screen detecting part of the audio-visual terminal to obtain information for use in authenticating that the viewer has viewed the audio-visual program. Thus, the viewing authenticating principal can authenticate that the viewer has viewed the audio-visual program with the viewing authentication system.

Also, in a control program of the fifteenth aspect, for example, a control program shown in FIG. 10 for controlling the viewing authentication system 40 (refer to FIG. 8) and authenticating the fact that a viewer of an audio-visual program is normally viewing the audio-visual program, the control program is configured to execute the steps of sending the audio-visual program to an audio-visual terminal 20 operated by the viewer (refer to FIG. 1) in response to a request from the viewer; and creating "motion instruction information 101" (refer to FIG. 3) unique to the audio-visual program which consists of information with which a program provider that provides the audio-visual program requests the viewer to make a predetermined motion at times unique to the audio-visual program; and sending the "motion instruction information 101" to the audio-visual terminal 20 operated by the viewer; and receiving "information about a response motion of the viewer" which is obtained from a detection result detected by a motion sensor 23 (refer to FIG. 1) of the audio-visual terminal 20 and which is output from the audio-visual terminal 20 operated by the viewer and sent back to transmit the fact that the viewer is normally viewing the audio-visual program; and processing the received "information about a response motion of the viewer" into "information for use in authenticating that the viewer has viewed the audio-visual program;" and analyzing the received "information about a response motion of the viewer" to specify the response motion of the viewer; and recording the "information for use in authenticating that the viewer has viewed the audio-visual program" output from the viewing authentication system 40 to authenticate that the viewer has viewed the audio-visual program.

For example, primary steps by which the control program shown in FIG. 10 controls the viewing authentication system 40 (refer to FIG. 8) include the step of sending an audio-visual program recorded in the program database 51 (refer to FIG. 8) to the audio-visual terminal 20 operated by the viewer (refer to FIG. 1), using the program sending part 41 (refer to FIG. 8) in response to a "program sending request 100" from the viewer (step S01). Also, the control program includes the primary step of creating "motion instruction information 101" (refer to FIG. 3) unique to each audio-visual program and consisting of information with which the audio-visual program provider that provides the audio-visual program requests the viewer to make a predetermined motion at times unique to the audio-visual program, using the motion instruction information creating part 42 (refer to FIG. 8) (step S02). Also, the control program includes the primary step of sending the "motion instruction information 101" to the viewer, using the motion instruction information sending part 43 (refer to FIG. 8) (step S03). Also, the control program includes the primary step of receiving the "information about a response motion of the viewer" obtained from a detection result detected by the motion sensor 23 (refer to FIG. 1) of the audio-visual terminal 20, which is output from the audio-visual terminal 20 operated by the viewer and sent back from the viewer, using the receiving part 44 (refer to FIG. 8) (step S04). Also, the control program includes the primary step of processing the received "information about a response motion of the viewer" (primary information, secondary information and tertiary information) obtained from a detection result (primary information) detected by the motion sensor 23 into "information for use in authenticating that the viewer has viewed the audio-visual program (primary information, secondary information and tertiary information) in the light of "authentication criteria" decided by the viewing authenticating principal and outputting it, using the received information processing part 45 (refer to FIG. 8). In this step, the control program includes the step of analyzing the received "information about a response motion of the viewer," using the motion analyzing/specifying part 45a (refer to FIG. 9) of the received information processing part 45 to specify the response motion of the viewer (step S05). Also, the control program includes the primary step of recording the "information for use in authenticating that the viewer has viewed the audio-visual program" output from the viewing authentication system 40, using the authentication recording part 53 (refer to FIG. 8) (step S11).

With this configuration, the control program which properly controls the viewing authentication system of the viewing authenticating principal makes it possible to send the audio-visual program to the audio-visual terminal operated by the viewer by the step of sending an audio-visual program to the audio-visual terminal operated by the viewer in response to a request from the viewer. Also, the control program makes it possible to create the motion instruction information requesting the viewer to make a motion by the step of creating motion instruction information unique to each audio-visual program and consisting of information with which the audio-visual program provider that provides the audio-visual program requests the viewer to make a predetermined motion at times unique to the audio-visual program. Also, the control program makes it possible to send the motion instruction information to the audio-visual terminal operated by the viewer by the step of sending motion instruction information to the audio-visual terminal operated by the viewer. Also, the control program makes it possible to receive information about a response motion of the viewer obtained from a detection result detected by the motion sensor of the audio-visual terminal operated by the viewer by the step of receiving the information about a response motion of the viewer which is obtained from a detection result detected by the motion sensor of the audio-visual terminal operated by the viewer and output from the audio-visual terminal and which is sent back to transmit the fact that the viewer is normally viewing the audio-visual program. Also, the control program makes it possible to obtain an authentication result that authenticates that the viewer has viewed the audio-visual program in the light of the authentication criteria decided by the viewing authenticating principal by the step of processing the received information about a response motion of the viewer into information for use in authenticating that the viewer has viewed the audio-visual program. Also, the control program makes it possible to specify the response motion of the viewer operating the audio-visual terminal to realize the information processing by the received information processing part by specifying the movement of the audio-visual terminal or the response motion of the viewer based on the received detection result detected by the motion sensor by the step of analyzing the received information about a response motion of the viewer to specify the response motion of the viewer. Also, the control program makes it possible to record the information for use in authenticating that the viewer has viewed the audio-visual program as information included in an authentication record recorded by the authentication recording part of the viewing authentication system by the step of recording the information for use in authenticating that the viewer has viewed the audio-visual program output from the viewing authentication system to authenticate that the viewer has viewed the audio-visual program. Thus, the viewing authenticating principal can authenticate that the viewer has viewed the audio-visual program based on the authentication record.

Also, in an audio-visual terminal of the sixteenth aspect, for example, an audio-visual terminal 60 shown in FIG. 11 operated by a viewer of an audio-visual program, the audio-visual terminal 60 includes a reproducing part 61 for reproducing the audio-visual program; a reproduction detecting part 62 for detecting, in the audio-visual program reproduced as a result of a reproduction operation by the viewer, "reproduction authentication points 110" (refer to FIG. 12 and FIGS. 13A-13D) as signals provided in the audio-visual program at predetermined time intervals by a program provider that provides the audio-visual program; a clock 63 for outputting the times when the "reproduction authentication points 110 were detected" by the reproduction detecting part 62; and a sending part 65 for sending, for transmission to a viewing authenticating principal, which authenticates that the viewer is normally viewing the audio-visual program, the detected "reproduction authentication points 110" and the "times when the reproduction authentication points 110 were detected" to a viewing authentication system 80 of the viewing authenticating principal (refer to FIG. 16).

For example, the reproducing part 61 shown in FIG. 11 presents an audio-visual program provided by the program provider to the viewer of the audio-visual program by means of video images and sounds. Also, the reproducing part 61 can provide an audio-visual program transmitted via an information transmission medium selected from broadcast, reproducible recording medium and electrical communication line to the viewer just like the reproducing part 21 (refer to FIG. 1) of the audio-visual terminal 20 (refer to FIG. 1) discussed previously. Also, in the information of the audio-visual program provided by the program provider, "reproduction authentication points 110" (refer to FIG. 12) as signals for defining the program running time of the audio-visual program provided at predetermined time intervals by the program provider at different points on the time axis in the audio-visual program (refer to FIGS. 13A-13D) are provided for the purpose of checking if the viewer is viewing the audio-visual program. Also, the information of the period (physics) at which the "reproduction authentication points 110" are provided is encrypted and recorded in the information of "reproduction authentication point 110" as "period (physics) information," which is information included in the "reproduction authentication point 110," by the viewing authenticating principal.

For example, the reproduction detecting part 62 shown in FIG. 11 detects the "reproduction authentication points 110" (refer to FIG. 12) as signals for defining the program running time of the audio-visual program provided in the audio-visual program at predetermined time intervals by the audio-visual program provider in the information of an audio-visual program reproduced by the reproducing part 61.

For example, the clock 63 shown in FIG. 11 outputs the "times when the reproduction authentication points 110 (refer to FIG. 12 and FIGS. 13A-13D) were detected" by the reproduction detecting part 62. The times output from the clock 63 are recorded in the information of "reproduction authentication point 110" as information of "detection time" (refer to FIG. 12), which is information included in the "reproduction authentication point 110."

For example, the sending part 65 shown in FIG. 11 sends the "reproduction authentication points 110" (refer to FIG. 12 and FIGS. 13A-13D) and the "times when the reproduction authentication points 110 were detected" to the viewing authentication system 80 of the viewing authenticating principal (refer to FIG. 16). Thus, the viewing authenticating principal, which received the "reproduction authentication points 110" and the "times when the reproduction authentication points 110 were detected," can recognize the times when the audio-visual program was reproduced by the audio-visual terminal 60 operated by the viewer and the program reproduction period based on the times when the audio-visual program was reproduced.

With this configuration, the reproducing part for reproducing an audio-visual program of the audio-visual terminal operated by the viewer enables the audio-visual program viewer to reproduce and view an audio-visual program. Also, the reproduction detecting part for detecting the reproduction authentication points as signals provided at predetermined time intervals in the audio-visual program by the audio-visual program provider in the information of the audio-visual program reproduced as a result of a reproduction operation by the viewer can detect the reproduction authentication points. Also, the information of the times when the reproduction authentication points were detected, which is output from the clock for outputting the times when the reproduction authentication points were detected by the reproduction detecting part can be used to obtain a viewing authentication. Also, the sending part for sending, for transmission to the viewing authenticating principal, which authenticates that the viewer is normally viewing the audio-visual program, the detected reproduction authentication points and the times when the reproduction authentication points were detected can send the detected reproduction authentication points and the times when the reproduction authentication points were detected to the viewing authentication system of the viewing authenticating principal. Thus, the audio-visual program viewer can have the viewing authenticating principal authenticate that the viewer has viewed the audio-visual program.

Also, in an audio-visual terminal of the seventeenth aspect, for example, an audio-visual terminal 60 shown in FIG. 11 according to the sixteenth aspect, the audio-visual terminal 60 further includes a viewing analyzing part 66 for analyzing a "reproduction operation history" of the viewer from at least two of the "times when the reproduction authentication points 110 (refer to FIG. 12 and FIGS. 13A-13D) were detected" and outputting the "reproduction operation history;" wherein the sending part 65 is configured to send the "reproduction operation history (audio-visual terminal) 111a" (refer to FIG. 14) output from the viewing analyzing part 66 to the viewing authentication system 80 of the viewing authenticating principal (refer to FIG. 16), for authentication of the viewing.

For example, the viewing analyzing part 66 shown in FIG. 11 analyzes and outputs a "reproduction operation history" as a history of reproduction operation by the viewer on the audio-visual program from at least two of the "times when the reproduction authentication points 110 (refer to FIG. 12 and FIGS. 13A-13D) were detected." The "reproduction authentication points 110" are provided at a regular period (physics) through the program running time (on points 110a shown in FIGS. 13A-13D) by the viewing authenticating principal based on a decision of the program provider, and a program reproduction time ("detection time") (refer to FIG. 12) output from the clock 63 when the viewer viewed the audio-visual program is recorded in each "reproduction authentication point 110."

Thus, the viewing analyzing part 66 can compare the program running time and the program reproduction period with reference to the "period (physics) information" and "detection time" as individual information included in the "reproduction authentication points 110" (refer to FIG. 12). Also, the viewing analyzing part 66 can recognize the speed at which the viewer reproduced the audio-visual program by comparing the program running time and the program reproduction period. As described above, because the viewing analyzing part 66 can recognize the time when specific reproducing parts of the audio-visual program in which the "reproduction authentication points 110" are provided were reproduced as a result of a reproduction operation by the viewer together with the program running time, the viewing analyzing part 66 can calculate the reproduction speeds at which the viewer reproduced the audio-visual program as a "reproduction operation history" by comparing the program running time and the program reproduction period.

Also, the history of reproduction operation by the viewer analyzed by the viewing analyzing part 66 shown in FIG. 11 is output as a "reproduction operation history (audio-visual terminal) 111a" (refer to FIG. 14), for example. Also, the sending part 65 sends the "reproduction operation history (audio-visual terminal) 111*a*" to the viewing authentication system 80 of the viewing authenticating principal (refer to FIG. 16).

With this configuration, the viewing analyzing part of the audio-visual terminal operated by the viewer for analyzing a history of reproduction operation of the viewer from at least two of the times when the reproduction authentication points were detected and outputting the reproduction operation history enables the audio-visual program viewer to output and obtain a reproduction operation history of the viewer. Also, because the sending part of the audio-visual terminal is configured to send the reproduction operation history output from the viewing analyzing part to the viewing authentication system of the viewing authenticating principal for authentication of the viewing, the reproduction operation history can be sent to the viewing authentication system of the viewing authenticating principal. Thus, the audio-visual program viewer can have the viewing authenticating principal authenticate that the viewer has viewed the audio-visual program.

Also, in an audio-visual terminal of the eighteenth aspect, for example, an audio-visual terminal 60 shown in FIG. 11 according to the seventeenth aspect, the audio-visual terminal 60 further includes a viewing authenticating part 67 for outputting a "viewing authentication (audio-visual terminal) 114*a*" (refer to FIG. 14) based on a "reproduction operation history (audio-visual terminal) 111*a*" (refer to FIG. 14) which authenticates that the viewer has viewed the audio-visual program at a reproduction speed within a predetermined range for a predetermined period of time based on the "reproduction operation history 111*a*;" wherein the sending part 65 is also configured to send the "viewing authentication (audio-visual terminal) 114*a*" based on a "reproduction operation history (audio-visual terminal) 111*a*" output from the viewing authenticating part 67 to the viewing authentication system 80 of the viewing authenticating principal (refer to FIG. 16).

For example, the viewing authenticating part 67 shown in FIG. 11 outputs a "viewing authentication (audio-visual terminal) 114*a*" (refer to FIG. 14) based on the "reproduction operation history (audio-visual terminal) 111*a*" which authenticates that viewer has viewed the audio-visual program at a reproduction speed within a predetermined range decided by the viewing authenticating principal (for example, a "reproduction speed equal to or slower than double speed") for a predetermined period of time (for example, "60 minutes or longer") based on a "reproduction operation history (audio-visual terminal) 111*a*" (refer to FIG. 14) output from the viewing analyzing part 66. Also, the sending part 65 sends the "viewing authentication (audio-visual terminal) 114*a*" based on the "reproduction operation history (audio-visual terminal) 111*a*" output from the viewing authenticating part 67 to the viewing authentication system 80 of the viewing authenticating principal (refer to FIG. 16).

With this configuration, the viewing authenticating part of the audio-visual terminal operated by the viewer for outputting a viewing authentication based on a reproduction operation history which authenticates that the viewer has viewed the audio-visual program at a reproduction speed within a predetermined range for a predetermined period of time based on the reproduction operation history enables the audio-visual program viewer to output and obtain a viewing authentication based on a reproduction operation history. Also, because the sending part is configured to send the viewing authentication based on a reproduction operation history output from the viewing authenticating part to the viewing authentication system of the viewing authenticating principal, the viewing authentication based on a reproduction operation history can be sent to the viewing authentication system of the viewing authenticating principal. Thus, the audio-visual program viewer can have the viewing authenticating principal authenticate that the viewer has viewed the audio-visual program based on the viewing authentication based on the reproduction operation history.

Also, in an audio-visual terminal according to any one of the sixteenth to eighteenth aspect, an audio-visual terminal 60 shown in FIG. 11 may be provided as a portable terminal owned by the viewer, for example.

For example, the audio-visual terminal 60 shown in FIG. 11 is constructed small and light by the use of an electronic circuit integration technology in spite of being a sophisticated audio-visual terminal including a reproducing part 61, a reproduction detecting part 62, a clock 63, a recording part 64, a sending part 65, a viewing analyzing part 66, a viewing authenticating part 67 and a microprocessor (Micro Processing Unit) 70 for controlling these devices. Thus, the viewer who operates the audio-visual terminal 60 can easily hold and operate the audio-visual terminal 60 with one hand.

With this configuration, because the audio-visual terminal operated by the viewer is provided as a portable terminal owned by the viewer, the audio-visual program viewer can take many opportunities to view an audio-visual program without being significantly limited by the conditions of the time and place where the audio-visual terminal is used. Especially, when the program provider provides remote education through remote education programs, which the viewer views using the audio-visual terminal, the viewer can take more opportunities to receive the remote education. In addition, because a viewing authentication system of the viewing authenticating principal can objectively authenticate that the viewer as a learner of the remote education program has viewed a remote education program, the viewer and the program provider that provides the remote education program can properly realize the remote education, such as education by correspondence or self-taught education.

Also, in an audio-visual terminal of the nineteenth aspect, for example, an audio-visual terminal 60*a* shown in FIG. 18 according to any one of the sixteenth to eighteenth aspect, constructed by incorporating the functions of the audio-visual terminal 20 (refer to FIG. 1) in the audio-visual terminal 60 operated by the viewer (refer to FIG. 11), the audio-visual terminal 60*a* further includes a motion instructing part 22 (refer to FIG. 1) for instructing, based on "motion instruction information 101" (refer to FIG. 3) unique to the audio-visual program with which a program provider that provides the audio-visual program requests the viewer to make a predetermined motion at times unique to the audio-visual program, the viewer to make the motion; a motion sensor 23 (refer to FIG. 1) for detecting a response motion of the viewer made by the viewer for transmission to the viewing authenticating principal, which authenticates that the viewer is normally viewing the audio-visual program, every time the motion is instructed by the motion instructing part 22; and a coding part 24 (refer to FIG. 1) for coding "information about the response motion of the viewer" obtained from a detection result detected by the motion sensor 23 (refer to FIG. 1) into a signal sendable by the sending part 65 (refer to FIG. 11); and wherein the sending part 65 is configured to send information output from the audio-visual terminal 60*a* to the viewing authentication system 80*a* of the viewing authenticating principal (refer to FIG. 19), for obtaining an authentication of the viewing.

For example, an audio-visual terminal 60*a* shown in FIG. 18 can be constructed by incorporating the functions of the audio-visual terminal 20 (refer to FIG. 1) in the audio-visual terminal 60 (refer to FIG. 11). In this case, when the audio-visual program viewer uses the audio-visual terminal 60a constructed by incorporating the functions of the audio-visual terminal 20 in the audio-visual terminal 60 to reproduce and view an audio-visual program, the viewing authenticating principal can perform strict viewing authentication without frequently requesting the viewer to make a predetermined motion.

Specifically, when the viewer uses the audio-visual terminal 60a shown in FIG. 18, the viewing authenticating principal can authenticate that the viewer is reproducing an audio-visual program with the audio-visual terminal 60a using the "reproduction authentication points 110" (refer to FIG. 12 and FIGS. 13A-13D) without frequently requesting the viewer to make a predetermined motion. Thus, the viewing authenticating principal does not have to request the viewer to make a response motion frequently to perform viewing authentication. For example, when the viewer uses the audio-visual terminal 60a to view an audio-visual program, the viewing authenticating principal can reduce the number of viewing authentications made by requesting the viewer to make a predetermined motion to three or so, one at the beginning of the audio-visual program, one in the middle of the program running time of the audio-visual program and one at the end of the audio-visual program.

On the other hand, when the viewer uses the audio-visual terminal 60a shown in FIG. 18, the viewing authenticating principal can perform stricter viewing authentication than that using only the "reproduction authentication points 110" (refer to FIG. 12 and FIGS. 13A-13D) because the viewing authenticating principal can perform viewing authentication by requesting the viewer to make a predetermined motion in addition to viewing authentication using the "reproduction authentication points 110." In other words, a situation in which the viewer has left the audio-visual terminal on can be detected. While a case where the components or functions of the first aspect are incorporated has been described above, the components or functions of each of the second to seventh aspects may be incorporated.

With this configuration, the viewing authenticating principal can perform strict viewing authentication without frequently requesting the viewer to make a predetermined motion. That is, because the audio-visual terminal 60a shown in FIG. 18 has the functions of the audio-visual terminal 60 (refer to FIG. 11), the viewing authenticating principal can perform viewing authentication momentarily using the "reproduction authentication points 110" (refer to FIG. 12 and FIGS. 13A-13D) even if a motion instruction is not given so frequently. Thus, the viewer does not frequently have to make a response motion, which may distract the viewer from viewing the program to some extent while viewing a program. Also, because the audio-visual terminal 60a has the functions of the audio-visual terminal 20 (refer to FIG. 1), it can authenticate that the viewer did not do a behavior such as leaving the audio-visual terminal on. The audio-visual terminal 60a can provide such a multiplier effect.

Also, in a control program of the twentieth aspect, for example, a control program shown in FIG. 15 for controlling an audio-visual terminal 60 operated by a viewer of an audio-visual program (refer to FIG. 11), the control program is configured to execute the steps of reproducing and presenting the audio-visual program according to an operation of the viewer on the audio-visual terminal 60; and detecting, in the audio-visual program reproduced as a result of a reproduction operation by the viewer, "reproduction authentication points 110" (refer to FIG. 12 and FIGS. 13A-13D) as signals provided in the audio-visual program at predetermined time intervals by the audio-visual program provider that provides the audio-visual program; and outputting the "times when the reproduction authentication points 110 were detected;" and sending, for transmission to a viewing authenticating principal, which authenticates that the viewer is normally viewing the audio-visual program, the detected "reproduction authentication points 110" and the "times when the reproduction authentication points 110 were detected" to a viewing authentication system 80 of the viewing authenticating principal (refer to FIG. 16).

For example, primary steps by which the control program shown in FIG. 15 controls the audio-visual terminal 60 (refer to FIG. 11) include the step of reproducing and presenting an audio-visual program to the viewer, using the reproducing part 61 (refer to FIG. 11) according to an operation of the viewer on the audio-visual terminal 60 (step N01). Also, the control program includes the primary step of detecting the "reproduction authentication points 110" (refer to FIG. 12 and FIGS. 13A-13D) as signals provided in the audio-visual program at a predetermined time interval by the audio-visual program provider that provides the audio-visual program in the audio-visual program reproduced as a result of a reproduction operation by the viewer, using the reproduction detecting part 62 (refer to FIG. 11) (step N02). Also, the control program includes the primary step of outputting the "times when the reproduction authentication points 110 were detected" by the reproduction detecting part 62, using the clock 63 (refer to FIG. 11) (step N03). Also, the control program includes the primary step of sending the "reproduction authentication points 110" detected by the reproduction detecting part 62 and the "times when the reproduction authentication points 110 were detected" by the reproduction detecting part 62, which are output from the clock 63, to the viewing authentication system 80 of the viewing authenticating principal (refer to FIG. 16), using the sending part 65 (refer to FIG. 11) for transmission to the viewing authenticating principal, which authenticates that the viewer is normally viewing the audio-visual program (step N04).

With this configuration, the control program can properly control the audio-visual terminal operated by the audio-visual program viewer, and makes it possible to reproduce and present an audio-visual program to be to the viewer according to an operation by the viewer by the step of reproducing and presenting the audio-visual program according to an operation by the viewer on the audio-visual terminal. Also, the control program makes it possible to detect the reproduction authentication points from the information of the audio-visual program by the step of detecting the reproduction authentication points as signals provided in the audio-visual program at a predetermined time interval by the audio-visual program provider that provides the audio-visual program in the audio-visual program reproduced as a result of a reproduction operation by the viewer. Also, the control program makes it possible to output and use the information of the times when the reproduction authentication points were detected by the step of outputting the times when the reproduction authentication points were detected. Also, the control program makes it possible to send the reproduction authentication points and the times when the reproduction authentication points were detected to the viewing authentication system of the viewing authenticating principal by the step of sending the reproduction authentication points detected and the times when the reproduction authentication points were detected to the viewing authentication system of the viewing authenticating principal for transmission to the viewing authenticating principal, which authenticates that the viewer is normally viewing the audio-visual program. Thus, the control program enables the viewing authenticating principal to authenticate that the viewer has viewed the audio-visual program based on the information of the reproduction authentication points and the information of the times when the reproduction authentication points were detected.

Also, a control program of the twenty-first aspect, for example, a control program (not shown) according to the twentieth aspect for controlling an audio-visual terminal 60*a* shown in FIG. 18 operated by a viewer of an audio-visual program, constructed by incorporating the function of the audio-visual terminal 20 (refer to FIG. 1) in the audio-visual terminal 60 (refer to FIG. 11), the control program is configured to execute the steps of instructing, based on "motion instruction information 101" (refer to FIG. 3) unique to the audio-visual program with which the program provider that provides the audio-visual program requests the viewer to make a predetermined motion at times unique to the audio-visual program, the viewer to make the motion; and detecting a response motion of the viewer made by the viewer for transmission to the viewing authenticating principal, which authenticates that the viewer is normally viewing the audio-visual program, every time the motion is instructed, using a motion sensor 23 (refer to FIG. 1); and cording "information about the response motion of the viewer" obtained from a detection result detected by the motion sensor 23 into a signal sendable; and sending information output from the audio-visual terminal 60*a* to the viewing authentication system 80*a* of the viewing authenticating principal (refer to FIG. 19), for obtaining a viewing authentication.

For example, the audio-visual terminal 60*a* shown in FIG. 18 obtained by incorporating the functions of the audio-visual terminal 20 in the audio-visual terminal 60 can be controlled by performing control operations using a control program (not shown) obtained by incorporating the control operation which is performed by the control program (refer to FIG. 7) for controlling the audio-visual terminal 20 (refer to FIG. 1) in the control program for controlling the audio-visual terminal 60 (refer to FIG. 11) shown in FIG. 15. In this case, when the viewer reproduces and views an audio-visual program with the audio-visual terminal 60*a* controlled by this control program, the viewing authenticating principal can perform strict viewing authentication without frequently requesting the viewer to make a predetermined motion as described previously.

With this configuration, this control program is a program for controlling an audio-visual terminal according to the nineteenth aspect and is configured to execute the steps of instructing the viewer to make a predetermined motion based on motion instruction information unique to the audio-visual program with which the program provider that provides the audio-visual program requests the viewer to make the motion at times unique to the audio-visual program, and detecting a response motion of the viewer which the viewer makes every time the motion is instructed for transmission to a viewing authenticating principal, which authenticates that the viewer is normally viewing the audio-visual program, with a motion sensor, and coding information about the response motion of the viewer obtained from a detection result detected by the motion sensor into a sendable signal, and sending information output from the audio-visual terminal to a viewing authentication system of the viewing authenticating principal, for obtaining a viewing authentication, and therefore enables the viewing authenticating principal to perform strict viewing authentication without frequently requesting the viewer to make a predetermined motion.

Also, in a viewing authentication system of the twenty-second aspect, for example, a viewing authentication system 80 shown in FIG. 16 for authenticating that a viewer of an audio-visual program is normally viewing the audio-visual program, the viewing authentication system 80 includes a reproduction authentication point setting part 81 for providing "reproduction authentication points 110" (refer to FIG. 12 and FIGS. 13A-13D) as signals for defining the program running time of the audio-visual program in the audio-visual program at predetermined time intervals; a program sending part 82 for sending the audio-visual program to an audio-visual terminal 60 operated by the viewer (refer to FIG. 11) in response to a request from the viewer; a receiving part 83 for receiving the "reproduction authentication points 110" as signals provided in the audio-visual program at predetermined time intervals by a program provider that provides the audio-visual program and detected when the viewer reproduces the audio-visual program with the audio-visual terminal 60; a clock 84 for outputting the "times 112 when the reproduction authentication points 110 were received" (refer to FIG. 14) by the receiving part 83; and an authentication recording part 92 for recording the "reproduction authentication points 110" and the "times 112 when the reproduction authentication points 110 were received," for authentication of the viewing.

For example, the viewing authentication system 80 shown in FIG. 16 is, just like the viewing authentication system 40 (refer to FIG. 8) as discussed previously, a dedicated server of the viewing authenticating principal connected to a WAN. Also, the viewing authentication system 80 presents, just like the viewing authentication system 40 as discussed previously, a dedicated "information service web page" (not shown) through which the outline of audio-visual programs and so on can be transmitted to the audio-visual program viewer, and identifies the viewer using the information of both a "viewer ID" (refer to FIG. 12) and a "password" unique to the "viewer ID" (simple viewer authentication information) (not shown) in response to a "program sending request 100" (refer to FIG. 17) sent from the viewer.

For example, the reproduction authentication point setting part 81 shown in FIG. 16 is an information processing device for providing "reproduction authentication points 110" (refer to FIG. 12) for defining the program running time of the audio-visual program at predetermined intervals (refer to FIGS. 13A-13D) in an audio-visual program provided by the audio-visual program provider and recorded in the program database 91. The reproduction authentication point setting part 81 inserts the information of "reproduction authentication points 110" into the information of the audio-visual program in a predetermined program running time of the audio-visual program, and encrypts and records the information of the program running time defined by the "reproduction authentication points 110" provided in the information of "period (physics) information" included in the "reproduction authentication point 110." The audio-visual program in which "reproduction authentication points 110" are provided by the reproduction authentication point setting part 81 is recorded in the program database 91 again.

For example, the program sending part 82 shown in FIG. 16 is, just like the program sending part 41 (refer to FIG. 8) of the viewing authentication system 40 (refer to FIG. 8) discussed previously, a streaming server connected to a WAN for sending an audio-visual program provided by the program provider and recorded in the program database 91 to the audio-visual terminal 60 operated by the viewer (refer to FIG. 11) in response to a "program sending request 100" (refer to FIG. 17) sent from the (correct) viewer identified by means of a "viewer ID" (refer to FIG. 12) and a "password" unique to the "viewer ID" (simple viewer authentication information) (not shown).

For example, the receiving part 83 shown in FIG. 16 receives the information of "reproduction authentication points 110" (refer to FIG. 12 and FIGS. 13A-13D) detected by the reproduction detecting part 62 of the audio-visual terminal 60 when the viewer reproduces the audio-visual program with the audio-visual terminal 60 and sent back to the viewing authentication system 80 by the sending part 65 (refer to FIG. 11) of the audio-visual terminal 60 (refer to FIG. 11). The receiving part 83 is an information communication instrument (high-speed wired information communication instrument (router)) connected to a WAN.

For example, the clock 84 shown in FIG. 16 outputs the "times 112 when the reproduction authentication points 110 (refer to FIG. 12 and FIGS. 13A-13D) were received" (refer to FIG. 14) by the receiving part 83. Because the "times 112 when the reproduction authentication points 110 were received" can be considered to be approximately the times when the audio-visual program was reproduced by the audio-visual terminal 60 operated by the viewer (refer to FIG. 11), the viewing authenticating principal can recognize the times when the audio-visual program was reproduced by the audio-visual terminal 60 operated by the viewer and the period for which the audio-visual program was reproduced based on the reproduction times of the audio-visual program from the "times 112 when the reproduction authentication points 110 were received," which are output from the clock 84.

For example, the authentication recording part 92 shown in FIG. 16 records the information of "reproduction authentication points 110" (refer to FIG. 12 and FIGS. 13A-13D) and the information of the "times 112 when the reproduction authentication points 110 were received" by the receiving part 83 (refer to FIG. 14), which are output from the clock 84, as information included in the "authentication record 115" (refer to FIG. 14).

With this configuration, the viewing authenticating principal can provide reproduction authentication points for defining the program running time of the audio-visual program in the audio-visual program at predetermined time intervals with the reproduction authentication point setting part, which is included in a viewing authentication system of the viewing authenticating principal for authenticating that the audio-visual program viewer is normally viewing the audio-visual program, for providing reproduction authentication points as signals for defining program running times of the audio-visual program in the audio-visual program at predetermined time intervals. Also, the program sending part for sending an audio-visual program to the audio-visual terminal operated by the viewer in response to a request from the viewer can send an audio-visual program to the audio-visual terminal operated by the viewer to present the audio-visual program to the viewer. Also, the receiving part for receiving reproduction authentication points as signals provided in the audio-visual program at predetermined time intervals by the program provider that provides the audio-visual program and detected when the viewer reproduces the audio-visual program with the audio-visual terminal can receive the reproduction authentication points sent back from the audio-visual terminal operated by the viewer. Also, the clock for outputting the times when the reproduction authentication points were received by the receiving part can output the information of the times when the reproduction authentication points were received for authentication purpose. Also, the authentication recording part for recording the reproduction authentication points and the times when the reproduction authentication points were received for authentication of the viewing can record the reproduction authentication points and the times when the reproduction authentication points were received as information included in the authentication record. Thus, the viewing authenticating principal can authenticate the viewer's viewing of the audio-visual program based on the authentication record.

Also, in a viewing authentication system of the twenty-third aspect, for example, a viewing authentication system 80 shown in FIG. 16 according to the twenty-second aspect, wherein the receiving part 83 is also configured to receive the "reproduction authentication points 110" (refer to FIG. 12 and FIGS. 13A-13D) and the "times when the reproduction authentication points 110 were detected" ("detection time") (refer to FIG. 12) by the audio-visual terminal 60, which are recorded by the audio-visual terminal 60 operated by the viewer (refer to FIG. 11), and the authentication recording part 92 is also configured to record the "reproduction authentication points 110" and the "times when the reproduction authentication points 110 were detected" ("detection time") by the audio-visual terminal 60, which are recorded by the audio-visual terminal 60.

For example, the receiving part 83 shown in FIG. 16 also receives the "reproduction authentication points 110" (refer to FIG. 12 and FIGS. 13A-13D) and the "times when the reproduction authentication points 110 were detected" ("detection time") (refer to FIG. 12), which are output form the clock 63 (refer to FIG. 11) of the audio-visual terminal 60 and recorded by the audio-visual terminal 60 operated by the viewer (refer to FIG. 11). Also, the authentication recording part 92 records the "reproduction authentication points 110" and the "times when the reproduction authentication points 110 were detected" ("detection time"), which are recorded by the recording part 64 (refer to FIG. 11) of the audio-visual terminal 60, as information included in the "authentication record 115" (refer to FIG. 14).

For example, the audio-visual terminal 60 shown in FIG. 11 may be used in a communication environment which does not allow high-speed information communication. The audio-visual terminal 60 operated by the viewer in a communication environment, which does not allow high-speed information communication reproduces an audio-visual program via a broadcast or reproducible recording medium. The audio-visual terminal 60 records the "reproduction authentication points 110" (refer to FIG. 12 and FIGS. 13A-13D) and the "times when the reproduction authentication points 110 were detected" ("detection time") (refer to FIG. 12), which are output from the clock 63 of the audio-visual terminal 60, in the recording part 64 of the audio-visual terminal 60. The audio-visual terminal 60 can send the "reproduction authentication points 110" and the "times when the reproduction authentication points 110 were detected" ("detection time"), which have been recorded in the recording part 64 to the viewing authentication system 80 (refer to FIG. 16), to obtain viewing authentication by the viewing authenticating principal when connected to a high-speed electrical communication network after the audio-visual program has been reproduced.

With this configuration, because the receiving part of the viewing authentication system of the viewing authenticating principal is also configured to receive the reproduction authentication points and the times when the reproduction authentication points were detected, which have been recorded by the audio-visual terminal operated by the viewer, the viewing authenticating principal can recognize the times when the viewer reproduced the audio-visual program with the audio-visual terminal and the period for which the audio-visual program was reproduced by receiving the reproduction authentication points and the times when the reproduction authentication points were detected, which have been recorded in the recording part of the audio-visual terminal, even when the viewer cannot connect the audio-visual terminal to a high-speed electrical communication network to view an audio-visual program. Also, because the authentication recording part is configured to record the reproduction authentication points and the times when the reproduction authentication points were detected, which have been recorded by the audio-visual terminal, the viewing authenticating principal can record the reproduction authentication points and the times when the reproduction authentication points were detected as information included in the authentication record. Thus, the viewing authenticating principal can authenticate the viewer's viewing of the audio-visual program based on the authentication record.

Also, in a viewing authentication system of the twenty-fourth aspect, for example, a viewing authentication system 80 shown in FIG. 16 according to the twenty-second aspect, the viewing authentication system 80 includes a viewing analyzing part 85 for analyzing and outputting a history of reproduction operation of the viewer from at least two of the "times 112 when the reproduction authentication points 110 (refer to FIG. 12 and FIGS. 13A-13D) were received" (refer to FIG. 14); wherein the authentication recording part 92 is also configured to record the "reproduction operation history (viewing authentication system) 111*b*" (refer to FIG. 14) based on "reception times 112" output from the viewing analyzing part 85.

For example, the viewing analyzing part 85 shown in FIG. 16 analyzes and outputs a "reproduction operation history (viewing authentication system) 111*b*" (refer to FIG. 14) based on "reception times 112" from at least two of the "times 112 when the reproduction authentication points 110 (refer to FIG. 12 and FIGS. 13A-13D) were received" by the receiving part 83, which are output from the clock 84 (refer to FIG. 14). Also, the authentication recording part 92 records the "reproduction operation history (viewing authentication system) 111*b*" based on "reception times 112" output from the viewing analyzing part 85 as information included in the "authentication record 115" (refer to FIG. 14).

With this configuration, the viewing authenticating principal can obtain a reproduction operation history based on reception times with the viewing analyzing part included in the viewing authentication system of the viewing authenticating principal for analyzing and outputting a reproduction operation history of the viewer from at least two of the times when the reproduction authentication points were received. Also, because the authentication recording part records the reproduction operation history based on reception times output from the viewing analyzing part, the viewing authenticating principal can record the reproduction operation history based on reception times as information included in the authentication record. Thus, the viewing authenticating principal can authenticate the viewer's viewing of the audio-visual program based on the authentication record.

Also, in a viewing authentication system of the twenty-fifth aspect, for example, a viewing authentication system 80 shown in FIG. 16 according to the twenty-third aspect, the viewing authentication system 80 includes a viewing analyzing part 85 for analyzing and outputting a history of reproducing operation operated by the viewer from at least two of the "reproduction authentication points 110" (refer to FIG. 12 and FIGS. 13A-13D) and the "times when the reproduction authentication points 110 were detected" by the audio-visual terminal 60, which are recorded ("recorded time 113") (refer to FIG. 14) by the audio-visual terminal 60 operated by the viewer (refer to FIG. 11); wherein the authentication recording part 92 is also configured to record the "reproduction operation history (viewing authentication system) 111*c*" (refer to FIG. 14) based on "recorded times 113" output from the viewing analyzing part 85.

For example, the viewing analyzing part 85 shown in FIG. 16 analyzes and outputs a reproduction operation history of the viewer ("reproduction operation history (viewing authentication system) 111*c*" (refer to FIG. 14)) from at least two of the "reproduction authentication points 110" (refer to FIG. 12 and FIGS. 13A-13D) and the "times when the reproduction authentication points 110 were detected" by the audio-visual terminal 60 ("recorded times 113") (refer to FIG. 14), which are output from the clock 63 (refer to FIG. 11) of the audio-visual terminal 60 operated by the viewer (refer to FIG. 11). Thus, as described previously, even when a viewer who has viewed an audio-visual program is in a communication environment that does not allow high-speed information communication sends later the "reproduction authentication points 110" and the "times when the reproduction authentication points 110 were detected," which have been recorded ("recorded times 113") in the recording part 64 of the audio-visual terminal 60, the viewing analyzing part 85 can analyze and output a "reproduction operation history (viewing authentication system) 111*c*."

For example, the viewing analyzing part 85 shown in FIG. 16 performs an analysis based on the times output from the clock 63 (refer to FIG. 11) and recorded ("recorded times 113") (refer to FIG. 14) in the recording part 64 (refer to FIG. 11) of the audio-visual terminal 60 (refer to FIG. 11) and outputs a "reproduction operation history (viewing authentication system) 111*c*" (refer to FIG. 14) based on "recorded times 113." Also, the authentication recording part 92 records the "reproduction operation history (viewing authentication system) 111*c*" as information included in the "authentication record 115" (refer to FIG. 14).

With this configuration, the viewing authenticating principal can obtain a reproduction operation history based on the recorded times with the viewing analyzing part included in the viewing authentication system of the viewing authenticating principal for analyzing and outputting a reproduction operation history of the viewer from at least two of the reproduction authentication points and the times when the reproduction authentication points were detected, which have been recorded by the audio-visual terminal operated by the viewer. Also, because the authentication recording part records the reproduction operation history based on the recorded times, output from the viewing analyzing part, the viewing authenticating principal can record the reproduction operation history based on the recorded times as information included in the authentication record. Thus, the viewing authenticating principal can authenticate that the viewer has viewed the audio-visual program based on the authentication record.

Also, in a viewing authentication system of the twenty-sixth aspect, for example, a viewing authentication system 80 shown in FIG. 16 according to the twenty-fourth or twenty-fifth aspect, the viewing authentication system 80 includes a viewing authenticating part 86 for outputting a "viewing authentication (viewing authentication system) 114*b*" (refer to FIG. 14) based on the "reproduction operation history 111" (refer to FIG. 14) which authenticates that viewer has viewed the audio-visual program at a reproduction speed within a predetermined range for a predetermined period of time based on the "reproduction operation history 111;" wherein the authentication recording part 92 is also configured to record the "viewing authentication (viewing authentication system) 114b" based on the "reproduction operation history 111" output from the viewing authenticating part 86.

For example, the viewing authenticating part 86 shown in FIG. 16 authenticates that viewer has viewed the audio-visual program at a reproduction speed within a predetermined range decided by the viewing authenticating principal (for example, a "reproduction speed equal to or slower than double speed") for a predetermined period of time (for example, "60 minutes or longer") based on a "reproduction operation history 111" (refer to FIG. 14) output from the viewing analyzing part 85. Also, the authentication recording part 92 records the "viewing authentication (viewing authentication system) 114b" (refer to FIG. 14) based on a "reproduction operation history 111" output from the viewing authenticating part 86 as information of the "authentication record 115" (refer to FIG. 14).

With this configuration, the viewing authenticating part of the viewing authentication system of the viewing authenticating principal for outputting a viewing authentication based on a reproduction operation history which authenticates that the viewer has viewed the audio-visual program at a reproduction speed within a predetermined range for a predetermined period of time based on the reproduction operation history enables the viewing authenticating principal to obtain a viewing authentication based on a reproduction operation history. Also, because the authentication recording part is configured to record the viewing authentication based on a reproduction operation history output from the viewing authenticating part, the viewing authenticating principal can record the viewing authentication based on a reproduction operation history as information included in the authentication record. Thus, the viewing authenticating principal can authenticate that the viewer has viewed the audio-visual program based on the authentication record.

Also, in a viewing authentication system of the twenty-seventh aspect, for example, a viewing authentication system 80a shown in FIG. 19 according to any one of the twenty-second to twenty-sixth aspect, for authenticating the fact that the viewer of the audio-visual program is normally viewing the audio-visual program, constructed by incorporating the functions of the viewing authentication system 40 (refer to FIG. 8) in the viewing authentication system 80 (refer to FIG. 16), the viewing authentication system 80a includes a motion instruction information creating part 42 (refer to FIG. 8) for creating "motion instruction information 101" (refer to FIG. 3) unique to the audio-visual program which consists of information with which a program provider that provides the audio-visual program requests the viewer to make a predetermined motion at times unique to the audio-visual program; a motion instruction information sending part 43 (refer to FIG. 8) for sending the "motion instruction information 101" to the audio-visual terminal 60a (refer to FIG. 18) operated by the viewer; and a received information processing part 45 (refer to FIG. 8) for processing the received "information about a response motion of the viewer" into "information for use in authenticating that the viewer has viewed the audio-visual program;" and wherein the received information processing part 45 has a motion analyzing/specifying part 45a (refer to FIG. 9) for analyzing the received "information about a response motion of the viewer" to specify the response motion of the viewer; and the receiving part 44 (refer to FIG. 8) is configured to receive the "information about a response motion of the viewer" which is obtained from a detection result detected by a motion sensor 23 (refer to FIG. 1) of the audio-visual terminal 60a and which is output from the audio-visual terminal 60a operated by the viewer and sent back to transmit the fact that the viewer is normally viewing the audio-visual program; and the authentication recording part 92 (refer to FIG. 16) is configured to record the "information for use in authenticating that the viewer has viewed the audio-visual program" output from the viewing authentication system 80a to authenticate that the viewer has viewed the audio-visual program.

For example, a viewing authentication system 80a shown in FIG. 19 can be constructed by incorporating the functions of the viewing authentication system 40 (refer to FIG. 8) in the viewing authentication system 80 (refer to FIG. 16). In this case, the viewing authentication system 80a enables the viewing authenticating principal to perform strict viewing authentication without frequently requesting the viewer to make a predetermined motion by authenticating that the viewer has viewed the audio-visual program as described previously. While a case where the components or functions of the ninth aspect are incorporated has been described above, the components or functions of each of the tenth to thirteenth aspects may be incorporated.

With this configuration, the viewing authentication system according to any one of the twenty-second to twenty-sixth aspect, which includes a motion instruction information creating part for creating motion instruction information unique to the audio-visual program which consists of information with which a program provider that provides the audio-visual program requests the viewer to make a predetermined motion at times unique to the audio-visual program, a motion instruction information sending part for sending the motion instruction information to the audio-visual terminal operated by the viewer, and a received information processing part for processing the received information about a response motion of the viewer into information for use in authenticating that the viewer has viewed the audio-visual program, in which the received information processing part has a motion analyzing/specifying part for analyzing the received information about a response motion of the viewer to specify the response motion of the viewer, in which the receiving part is configured to receive information about a response motion of the viewer which is obtained from a detection result detected by a motion sensor of the audio-visual terminal and which is output from the audio-visual terminal operated by the viewer and sent back to transmit the fact that the viewer is normally viewing the audio-visual program, and in which the authentication recording part is configured to record the information for use in authenticating that the viewer has viewed the audio-visual program, which is output from the viewing authentication system, to authenticate the viewing, enables the viewing authenticating principal to perform strict viewing authentication without frequently requesting the viewer to make a predetermined motion.

Also, in a control program of the twenty-eighth aspect, for example, a control program shown in FIG. 17 for controlling the viewing authentication system 80 shown in FIG. 16 and authenticating that a viewer of an audio-visual program is normally viewing the audio-visual program, the control program is configured to execute the steps of providing "reproduction authentication points 110" (refer to FIG. 12 and FIGS. 13A-13D) as signals for defining the program running time of the audio-visual program in the audio-visual program at predetermined time intervals; and sending the audio-visual program to an audio-visual terminal 60 operated by the viewer in response to a request from the audio-visual terminal 60 (refer to FIG. 11); and receiving the "reproduction authentication points 110" as signals provided in the audio-visual program at predetermined time intervals by a program provider that provides the audio-visual program and detected when the viewer reproduces the audio-visual program with the audio-visual terminal 60, from the audio-visual terminal 60 operated by the viewer; and outputting the "times 112 when the reproduction authentication points 110 were received" (refer to FIG. 14); and recording the "reproduction authentication points 110" and the "times 112 when the reproduction authentication points 110 were received," for authentication of the viewing.

For example, primary steps by which the control program shown in FIG. 17 controls the viewing authentication system 80 (refer to FIG. 16) include the step of providing "reproduction authentication points 110" (refer to FIG. 12 and FIGS. 13A-13D) as signals for defining the program running time of the audio-visual program at predetermined time intervals in an audio-visual program, using the reproduction authentication point setting part 81 (refer to FIG. 16) based on "reproduction authentication point setting information 116" decided by the viewing authenticating principal (step T01). Also, the control program includes the primary step of sending the audio-visual program to the audio-visual terminal 60 operated by the viewer (refer to FIG. 11), using the program sending part 82 (refer to FIG. 16) (step T02). Also, the control program includes the primary step of receiving the "reproduction authentication points 110" as signals for defining the program running time provided by the program provider that provides the audio-visual program in the audio-visual program at predetermined time intervals detected when the viewer reproduces the audio-visual program with the audio-visual terminal 60, from the audio-visual terminal 60 operated by the viewer, using the receiving part 83 (refer to FIG. 16) (step T03). Also, the control program includes the primary step of outputting the "times 112 when the reproduction authentication points 110 were received" (refer to FIG. 14) by the receiving part 83, using the clock 84 (refer to FIG. 16) (step T04). Also, the control program includes the primary step of recording the "reproduction authentication points 110" and the "times 112 when the reproduction authentication points 110 were received" by the receiving part 83, using the authentication recording part 92 (refer to FIG. 16) of the viewing authentication system 80 (step T07).

With this configuration, the control program controls the viewing authentication system to make it possible to add the information of reproduction authentication points to the information of the audio-visual program at predetermined time intervals decided by the audio-visual program provider by the step of providing the reproduction authentication points as signals for defining the program running time of the audio-visual program in the audio-visual program at predetermined time intervals. Also, the control program makes it possible to send the audio-visual program to the audio-visual terminal by the step of sending the audio-visual program to the audio-visual terminal in response to the audio-visual terminal operated by the viewer. Also, the control program makes it possible to receive the reproduction authentication points from the audio-visual terminal by the step of receiving reproduction authentication points as signals provided in the audio-visual program at predetermined time intervals by the program provider that provides the audio-visual program and detected when the viewer reproduces the audio-visual program with the audio-visual terminal, from the audio-visual terminal operated by the viewer. Also, the control program makes it possible to output the information of the times when the reproduction authentication points were received by the step of outputting the times when the reproduction authentication points were received. Also, the control program makes it possible to record the reproduction authentication points and the times when the reproduction authentication points were received as information included in the authentication record by the step of recording the reproduction authentication points and the times when the reproduction authentication points were received, for authentication of the viewing. Thus, the viewing authenticating principal can authenticate the viewer's viewing of the audio-visual program based on the authentication record.

Also, in a control program of the twenty-ninth aspect, for example, a control program (not shown) according to the twenty-eighth aspect for controlling the viewing authentication system 80a (refer to FIG. 19) constructed by incorporating the function of the viewing authentication system 40 (refer to FIG. 8) in the viewing authentication system 80 (refer to FIG. 16) and authenticating that the viewer of the audio-visual program is normally viewing the audio-visual program, obtained by incorporating the operations (steps) for controlling the viewing authentication system 40 performed by the control program (refer to FIG. 10) in the control program shown in FIG. 17 for controlling the viewing authentication system 80, the control program is configured to execute further steps of creating "motion instruction information 101" (refer to FIG. 3) unique to the audio-visual program which consists of information with which the program provider that provides the audio-visual program requests the viewer to make a predetermined motion at times unique to the audio-visual program; and sending the "motion instruction information 101" to the audio-visual terminal 60a operated by the viewer (refer to FIG. 18); and receiving "information about a response motion of the viewer" which is obtained from a detection result detected by a motion sensor 23 (refer to FIG. 18) of the audio-visual terminal 60a and which is output from the audio-visual terminal 60a operated by the viewer and sent back to transmit the fact that the viewer is normally viewing the audio-visual program; and processing the received "information about a response motion of the viewer" into "information for use in authenticating that the viewer has viewed the audio-visual program;" and analyzing the received "information about a response motion of the viewer" to specify the response motion of the viewer; and recording the "information for use in authenticating that the viewer has viewed the audio-visual program" output from the viewing authentication system 80a to authenticate that the viewer has viewed the audio-visual program.

For example, the viewing authentication system 80a (refer to FIG. 19) constructed by incorporating the functions of the viewing authentication system 40 in the viewing authentication system 80 can be controlled by means of a control program (not shown) obtained by incorporating the control operation of the control program (refer to FIG. 10) performs to control the viewing authentication system 40 (refer to FIG. 8) in the control program for controlling the viewing authentication system 80 (refer to FIG. 16) shown in FIG. 17. In this case, the viewing authenticating principal can perform strict viewing authentication with the viewing authentication system 80a controlled by this control program without frequently requesting the viewer to make a predetermined motion as described previously.

With this configuration, this control program, which is a program for controlling a viewing authentication system according to the twenty-seventh aspect, is configured to execute the steps of creating motion instruction information unique to the audio-visual program which consists of information with which a program provider that provides the audio-visual program requests the viewer to make a predetermined motion at times unique to the audio-visual program, and sending the motion instruction information to the audio-visual terminal operated by the viewer, and receiving information about a response motion of the viewer which is obtained from a detection result detected by a motion sensor of the audio-visual terminal and which is output from the audio-visual terminal operated by the viewer and sent back to transmit the fact that the viewer is normally viewing the audio-visual program, and processing the received information about a response motion of the viewer into information for use in authenticating that the viewer has viewed the audio-visual program, and analyzing the received information about a response motion of the viewer to specify the response motion of the viewer, and recording the information for use in authenticating that the viewer has viewed the audio-visual program, which is output from the viewing authentication system, to authenticate the viewing, and therefore enables the viewing authenticating principal to perform strict viewing authentication without frequently requesting the viewer to make a predetermined motion.

As described in the foregoing, according to the present invention, it is possible to provide audio-visual terminal and viewing authentication system suitable for authenticating that the viewer has viewed an audio-visual program, especially for viewing authentication in remote education, and a program for controlling these devices.

The basic Japanese Patent Application No. 2010-096472 and No. 2010-096473 filed on Apr. 19, 2010 and No. 2010-288665 filed on Dec. 24, 2010 are hereby incorporated in its entirety by reference into the present application. The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description. The applicant has no intention to give to public any disclosed embodiments. Among the disclosed changes and modifications, those which may not literally fall within the scope of the present claims constitute, therefore, a part of the present invention in the sense of doctrine of equivalents.

BRIEF DESCRIPTION OF THE DRAWINGS

FIG. 14 is an explanatory view illustrating information included in authentication record according to the third embodiment of the present invention.

DETAILED DESCRIPTION OF THE PREFERRED EMBODIMENT

An embodiment of the invention will be hereinafter described in reference to the drawings.

First Embodiment

Figure 1:
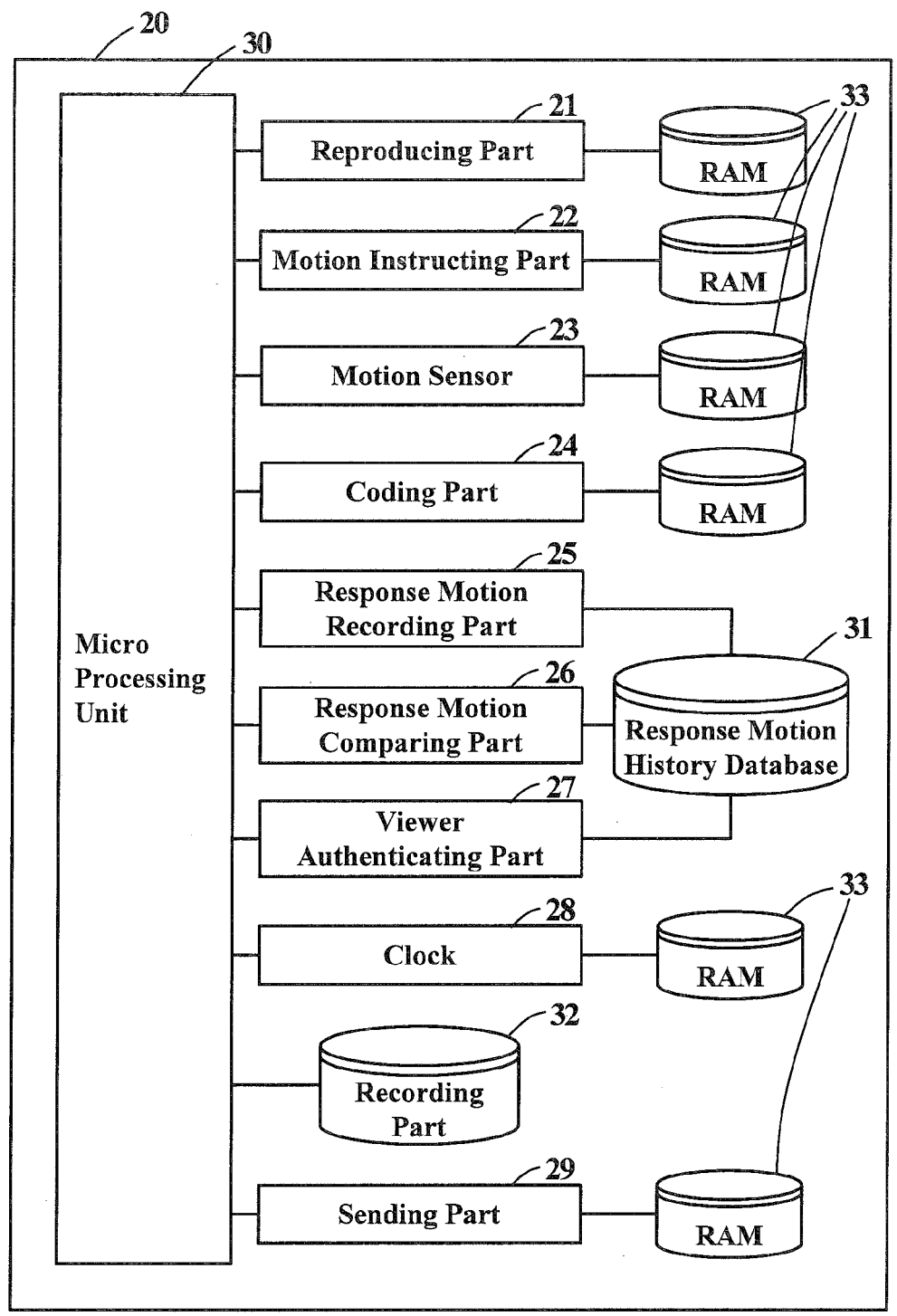
FIG. 1 is a block diagram illustrating an example of the construction of the audio-visual terminal according to a first embodiment of the present invention.

An audio-visual terminal 20 according to a first embodiment of the present invention shown in FIG. 1 is provided as a portable terminal (refer to FIGS. 6A-6C) which an audio-visual program viewer can easily hold and operate with one hand. It is needless to say that the audio-visual terminal 20 according to this embodiment may be provided as a cellular phone, smartphone, PDA (Personal Digital Assistant), notebook computer or desktop computer.

FIG. 1 is a block diagram illustrating an example of the basic construction of the audio-visual terminal 20 according to the first embodiment of the present invention. The audio-visual terminal 20 includes a reproducing part 21, a motion instructing part 22, a motion sensor 23, a coding part 24, a response motion recording part 25, a response motion comparing part 26, a viewer authenticating part 27, a clock 28, a sending part 29, a response motion history database 31, and a recording part 32. The audio-visual terminal 20 also includes a microprocessor (Micro Processing Unit) 30 as a control device for controlling the audio-visual terminal 20. Each of the reproducing part 21, the motion instructing part 22, the motion sensor 23, the coding part 24, the clock 28 and the sending part 29 is provided with a random access memory (RAM) 33 for assisting its function. The details of the function of each device of the audio-visual terminal 20 are described in sequence below.

Figures 2, 3:
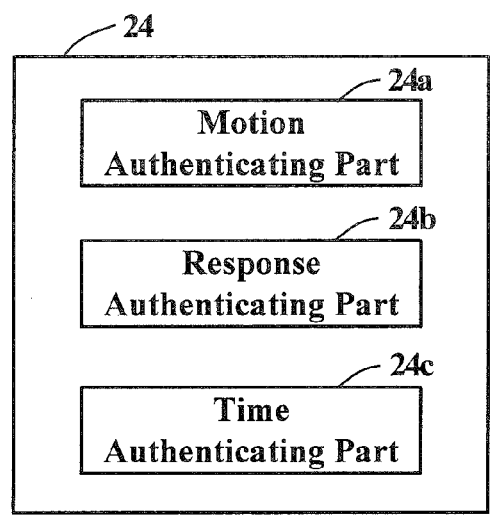
FIG. 2 is a block diagram illustrating an example of the configuration of a coding part of the audio-visual terminal according to the first embodiment of the present invention.
FIG. 3 is an explanatory view illustrating information included in motion instruction information according to the first embodiment of the present invention.

FIG. 2 is a block diagram (detailed diagram) illustrating a motion authenticating part 24a, a response authenticating part 24b, and a time authenticating part 24c as authentication devices of the coding part 24 included in the audio-visual terminal 20 (refer to FIG. 1). The details of the function of each authentication device of the coding part 24 are described in sequence below.

Referring first to FIG. 1, the details of each device included in the audio-visual terminal 20 and the function of each device are described. The reproducing part 21 included in the audio-visual terminal 20 shown in FIG. 1 is an audio-visual reproduction device which can present an audio-visual program provided by an audio-visual program provider to a viewer by means of video images and sounds. The reproducing part 21 has a tuner (not shown) and can receive and reproduce a broadcast audio-visual program. The reproducing part 21 also has a multimedia player (not shown) which can read and reproduce information of an audio-visual program recorded in a reproducible recording medium. The reproducing part 21 also has an information communication instrument (wireless LAN communication instrument (router)) (not shown) which can reproduce an audio-visual program sendable through an electrical communication line by information communication through the electrical communication line. The reproducing part 21 may have any one of the tuner, multimedia player and information communication instrument (wireless LAN communication instrument (router)) to reproduce an audio-visual program.

The reproducing part 21 shown in FIG. 1 has a liquid crystal display screen (refer to FIGS. 6A-6C) and an air-conduction loudspeaker (not shown). Alternatively, the reproducing part 21 may have a plasma display screen for higher visibility, or may have an organic electroluminescence display screen to eliminate the need for a backlight that is necessary in a liquid crystal display screen for further weight reduction. Alternatively, the reproducing part 21 may have a bone-conduction loudspeaker so that the viewer can hear ambient sounds while viewing an audio-visual program. Alternatively, the reproducing part 21 may present an audio-visual program to the viewer by means of either video images or sounds.

The information communication instrument (wireless LAN communication instrument (router)) (not shown) of the reproducing part 21 shown in FIG. 1 is configured to be connectable to a public wireless LAN (not shown) for information communication. Thus, the reproducing part 21 having the information communication instrument (wireless LAN communication instrument (router)) can reproduce and present an audio-visual program that can be sent by streaming (streaming distribution) via a WAN by a viewing authentication system 40 of a viewing authenticating principal (refer to FIG. 8) to the viewer by performing information communication.

Alternatively, the reproducing part 21 shown in FIG. 1 may have a wireless communication instrument for a cellular phone so that it can receive streaming data (streaming distribution) through packet communication via radio waves for cellular phones to reproduce an audio-visual program. In this case, the audio-visual program viewer can take more opportunities to view an audio-visual program. Alternatively, the reproducing part 21 may be configured to be able to perform progressive download-based information communication so that the information of an audio-visual program can be recorded in the recording part 32 of the audio-visual terminal 20 and the audio-visual program can be repeatedly viewed as needed after the audio-visual program has been reproduced by the reproducing part 21 and viewed by the viewer.

The information communication instrument (wireless LAN communication instrument (router)) (not shown) of the reproducing part 21 shown in FIG. 1 is configured to be able to receive information of "motion instruction information 101" (refer to FIG. 3) together with the information of an audio-visual program from the viewing authentication system 40 of the viewing authenticating principal (refer to FIG. 8) when performing information communication.

In some cases, the information communication instrument (wireless LAN communication instrument (router)) (not shown) of the reproducing part 21 shown in FIG. 1 may be in an information communication environment in which it cannot be connected to a public wireless LAN (not shown). For such cases, the reproducing part 21 is configured to be able to receive and reproduce an audio-visual program broadcast via a broadcast communication satellite (not shown) using a tuner (not shown) included in the reproducing part 21. Alternatively, the tuner of the reproducing part 21 may be configured to receive and reproduce an audio-visual program broadcast via a terrestrial broadcasting network (not shown). Alternatively, the tuner of the reproducing part 21 may be configured to receive and reproduce an audio-visual program broadcast via a cable-broadcasting network (not shown). Alternatively, the tuner of the reproducing part 21 may be configured to receive and reproduce an audio-visual program broadcast via analog broadcasting.

When the tuner (not shown) of the reproducing part 21 receives a broadcast of an audio-visual program, the tuner of the reproducing part 21 is configured to be able to simultaneously receive the "motion instruction information 101" (refer to FIG. 3) created by the viewing authentication system 40 of the viewing authenticating principal (refer to FIG. 8) and broadcast by a broadcasting facility and read information therefrom.

The multimedia player (not shown) of the reproducing part 21 shown in FIG. 1 is configured to be able to read the information of an audio-visual program recorded in a reproducible recording media and reproduce the audio-visual program. Thus, the reproducing part 21 can reproduce an audio-visual program recorded in an electromagnetically or optically reproducible recording medium. The multimedia player of the reproducing part 21 can read and reproduce information recorded in, for example, a CD-R (Compact Disc Recordable), DVD (Digital Versatile Disc), Magneto-Optical disc or ROM (Read-Only Memory). The multimedia player of the reproducing part 21 may be configured to be able to play reproducible recording media according to any standard.

In this embodiment, the recording medium that can be played by the multimedia player (not shown) of the reproducing part 21 shown in FIG. 1 includes the information of "motion instruction information 101" (refer to FIG. 3) created and recorded in advance by the viewing authenticating principal in addition to the information of an audio-visual program. Thus, the multimedia player of the reproducing part 21 can read and use the information of "motion instruction information 101" (refer to FIG. 3) together with the information of an audio-visual program from the reproducible recording medium.

While the information which is recorded in a reproducible recording medium and reproduced by the multimedia player (not shown) of the reproducing part 21 shown in FIG. 1 is recorded in the form of digital signals in this embodiment, the information which is recorded in a reproducible recording medium and reproduced by the multimedia player of the reproducing part 21 may be recorded in the form of analog signals.

Referring to FIG. 3, "motion instruction information 101" is described here. FIG. 3 is an explanatory view illustrating information included in "motion instruction information 101" according to the first embodiment of the present invention. The "motion instruction information 101" is information which is subjected to information communication between the viewing authentication system 40 (refer to FIG. 8) and the audio-visual terminal 20 (refer to FIG. 1) as information with which the audio-visual program provider requests the viewer to make a predetermined motion at times unique to each audio-visual program. The "motion instruction information 101" is constituted of a combination of a plurality of pieces of information that makes up the "motion instruction information 101." The "motion instruction information 101" may consist of other types of information than those shown in FIG. 3.

The "program ID" included in the "motion instruction information 101" shown in FIG. 3 is described. The "program ID" is information attached to each audio-visual program to identify the audio-visual program to be viewed by the viewer. The "program ID" is information given by the viewing authenticating principal to distinguish one audio-visual program out of audio-visual programs provided by the viewing authenticating principal.

The "instruction ID" included in the "motion instruction information 101" shown in FIG. 3 is information given by the viewing authenticating principal to individually identify pieces of "motion instruction information 101" which are created at times unique to each audio-visual program. The "instruction ID" is made up of the total number of pieces of "motion instruction information 101" given in one audio-visual program and an ascending serial number, starting from 1 for the first piece, which is assigned to every piece of "motion instruction information 101" in one audio-visual program.

Specifically, when the total number of pieces of "motion instruction information 101" given in an audio-visual program is 20, for example, "1/20" is assigned as the "instruction ID" to the piece of "motion instruction information 101" that is created first in the audio-visual program. However, the "program ID" and the "instruction ID" may not be separately provided as different information as they are in this embodiment. Information corresponding to the information of "program ID" for identifying an audio-visual program may be added to the information of "instruction ID" so that the audio-visual program and each motion instruction can be individually identified simultaneously only by the information of "instruction ID" including both the information for use in identifying the audio-visual program and the information for use in identifying each motion instruction.

The "viewer ID" included in the "motion instruction information 101" shown in FIG. 3 is information unique to the viewer which is issued by the viewing authenticating principal to the correct viewer to whom the audio-visual program provider is supposed to provide an audio-visual program as described in detail later. In this embodiment, the "viewer ID" is issued by the viewing authenticating principal, together with a "password" (simple viewer authentication information) (not shown) unique to the "viewer ID." In this embodiment, the "viewer ID" and the "password" (simple viewer authentication information) unique to the "viewer ID" are both made up of text string information consisting of twenty alphabets and numbers. The form of information of the "viewer ID" and the "password" is not limited to a text string consisting of twenty alphabets and numbers and may be arbitrarily decided by the viewing authenticating principal.

The "sending time" included in the "motion instruction information 101" shown in FIG. 3 is information in which the time when the viewing authentication system 40 of the viewing authenticating principal (refer to FIG. 8), which is descried in detail later, sent each piece of "motion instruction information 101" to the viewer is recorded. As described in detail later, the "sending time" is information in which is recorded the time when a motion instruction information sending part 43 (refer to FIG. 8) sent each piece of "motion instruction information 101" to the audio-visual terminal 20 operated by the viewer (refer to FIG. 1), which is output from a clock 49 (refer to FIG. 8) which outputs the times when the viewing authentication system 40 performs a control operation. As described in detail later, the "sending time" is the time which the viewing authentication system 40 can use to determine the "period of time taken to communicate with the viewer" (secondary information).

The "instruction time" included in the "motion instruction information 101" shown in FIG. 3 is information in which is recorded the time when the motion instructing part 22 (refer to FIG. 1) instructed the viewer to make a motion, which is output from the clock 28 (refer to FIG. 1) of the audio-visual terminal 20 (refer to FIG. 1), which is described in detail later. Thus, when the motion instruction information sending part 43 (refer to FIG. 8) of the viewing authentication system 40 (refer to FIG. 8) sends the "motion instruction information 101," the "motion instruction information 101" is sent with nothing recorded as the information of "instruction time" (blank). The "instruction time" is provided as the time in which recorded is the time when the motion instructing part 22 instructed the viewer to make a motion, which is output from the clock 28 which outputs the times when the audio-visual terminal 20 performs a control operation, after the audio-visual terminal 20 operated by the viewer receives the "motion instruction information 101" from the viewing authentication system 40. As described in detail later, the "instruction time" is the time which the viewing authentication system 40 can use to determine the "period of time taken by the viewer to respond" (secondary information).

The information of "instructed motion" included in the "motion instruction information 101" shown in FIG. 3 is information indicating a predetermined motion the viewing authenticating principal requests the viewer to make. The information of "instructed motion" may be provided to instruct the viewer to shake the audio-visual terminal 20 operated by the viewer (refer to FIG. 1) regardless of the way of shaking (movement) by, for example, giving the viewer information saying "Please shake" (refer to FIGS. 6A-6C) to instruct the viewer to make the motion.

Alternatively, the information of "instructed motion" included in the "motion instruction information 101" shown in FIG. 3 may designate detailed information about a motion in which the audio-visual terminal 20 operated by the viewer (refer to FIG. 1) should be moved in a three-dimensional space more quantitatively to specify and instruct a motion as information of time-series values of acceleration and angular acceleration in each degree of freedom in a three-axis six-degree-of-freedom orthogonal coordinate system expressed using a specifically designated three-axis six-degree-of-freedom orthogonal coordinate system. Alternatively, the information of "instructed motion" may instruct the viewer to make the same motion as the viewer made before again by showing information of a motion made by the viewer before and recorded in the viewing authentication system 40 (refer to FIG. 8) or the audio-visual terminal 20 to the viewer to instruct the viewer to do so.

The information of "authentication criteria" included in the "motion instruction information 101" shown in FIG. 3 first designates by what information acquisition method and under what conditions the response motion which the viewer makes according to the motion instructed by the information of "instructed motion" is detected to obtain a detection result (primary information) based on the information of "authentication criteria" decided by the viewing authenticating principal. It also designates by what information processing the detected detection result (primary information) is converted into information (secondary information) as information indicated in an index of (numerically indicating) the response motion of the viewer. Also, information about on what determination criteria the information indicated in an index of the response motion of the viewer (secondary information) is authenticated to obtain an authentication result (tertiary information) is recorded by the viewing authenticating principal. The audio-visual terminal 20 (refer to FIG. 1) and the viewing authentication system 40 (refer to FIG. 8) are configured to evaluate and authenticate the response motion of the viewer based on the information of "authentication criteria" included in the "motion instruction information 101."

Here, referring again to FIG. 1, a specific method for instructing the viewer to make a motion using the "motion instruction information 101" (refer to FIG. 3) is described. The motion instructing part 22 shown in FIG. 1 is an interface device which instructs the viewer to make a motion based on the "motion instruction information 101" (refer to FIG. 3).

The motion instructing part 22 shown in FIG. 1 receives the "motion instruction information 101" (refer to FIG. 3) from the reproducing part 21 having an information communication function. Alternatively, the motion instructing part 22 may have its own information communication function to perform information communication without the reproducing part 21 so that the motion instructing part 22 can obtain the "motion instruction information 101" directly from the viewing authentication system 40 of the viewing authenticating principal (refer to FIG. 8).

The motion instructing part 22 shown in FIG. 1 is configured to be able to display a character string simply indicating a motion instruction "Please shake" by which the audio-visual program provider requests the viewer to shake the audio-visual terminal 20 the viewer is holding and operating with one hand, for example, in a certain area of the liquid crystal display screen (refer to FIGS. 6A-6C) of the reproducing part 21 based on the "motion instruction information 101" (refer to FIG. 3). Alternatively, a character string designating a more specific motion, such as "Please shake up and down" may be displayed based on the information of the "motion instruction information 101."

When the motion instructing part 22 shown in FIG. 1 instructs the viewer to make a more complex motion, it may instruct the viewer to make a motion by showing a visual motion model by means of animation (not shown) in a certain area of the liquid crystal display screen (refer to FIGS. 6A-6C) of the reproducing part 21. The model motion that is shown by means of animation in a certain area of the liquid crystal display screen of the reproducing part 21 by the motion instructing part 22 may show the model of the path along which the audio-visual terminal 20 should be moved and the speed at which the audio-visual terminal 20 should be moved in a three-dimensional space, for example, by means of animation. With this configuration, because the viewer can intuitively understand the complex response motion to be made and can make a response motion simply by imitating the animation, the viewer is less likely to be distracted from viewing the audio-visual program. When the motion instructing part 22 shows the viewer a model motion by means of animation, a notification sound may be output from the air-conduction loudspeaker (not shown) of the reproducing part 21 for one second, for example, to alert the viewer.

Because what is required of the motion instructing part 22 shown in FIG. 1 is to be able to instruct the viewer to make a motion, the motion instructing part 22 may have a visual display device for providing a motion instruction, such as a flasher which blinks on and off a predetermined number of times to transmit a command code for instructing the viewer to make a predetermined motion. Alternatively, the motion instructing part 22 may have an auditory display device for providing a motion instruction, such as a loudspeaker device for instructing the viewer to make a motion through spoken language. Alternatively, the motion instructing part 22 may have a haptic display device for providing a motion instruction, such as a vibration motor which vibrates a predetermined number of times to transmit a command code for instructing the viewer to make a predetermined motion. Instead of displaying a motion instruction on the reproducing part 21 using the motion instructing part 22, a performer in the audio-visual program may halt the progress of the audio-visual program for a while and instruct the viewer to make a motion in the audio-visual program. With this configuration, because the progress of the audio-visual program can be halted when a motion instruction is provided, it is possible to prevent a motion instruction and a response motion of the viewer from overlapping with the progress of the audio-visual program.

The motion sensor 23 shown in FIG. 1 is a detection device for detecting a response motion made by the viewer. The viewer make a response motion to be transmitted to the viewing authenticating principal, which authenticates that the viewer is normally viewing the audio-visual program, according to an instruction from the motion instructing part 22. The motion sensor 23 in this embodiment has a three-axis six-degree-of-freedom acceleration sensor (not shown) fixedly provided in the audio-visual terminal 20. The three-axis six-degree-of-freedom acceleration sensor is fixed in the vicinity of the center of gravity of the audio-visual terminal 20. The viewer can hold and operate the audio-visual terminal 20 with one hand. Thus, the three-axis six-degree-of-freedom acceleration sensor can indirectly detect a response motion of the viewer by detecting the movement of the audio-visual terminal 20 in a three-dimensional space.

In another embodiment, the motion sensor 23 shown in FIG. 1 may have a three-axis three-degree-of-freedom acceleration sensor instead of the three-axis six-degree-of-freedom acceleration sensor (not shown). The three degrees of freedom which the acceleration sensor detects may be provided so that accelerations on orthogonal coordinate axes in front-back, right-left and up-down directions can be detected or angular accelerations in the pitch, roll and yaw directions can be detected. When the degrees of freedom to be detected by the acceleration sensor are limited to three, the acceleration sensor can be simplified in structure.

Especially, because the motion instruction from the portable terminal to the viewer viewing the audio-visual program is "Please shake from side to side", "Please shake up and down" or simply "Please shake" in many cases even when a response motion of the viewer is detected by the three-axis six-degree-of-freedom acceleration sensor (not shown) of the motion sensor 23 shown in FIG. 1, viewing authentication can be properly performed even if the viewing authenticating principal limits the degrees of freedom for the detection for use in judgment for viewing authentication to two degrees of freedom in right-left and up-down directions among the degrees of freedom with which the three-axis six-degree-of-freedom acceleration sensor can detect a response motion of the viewer in the "authentication criteria" decided by the viewing authenticating principal. It is, therefore, considered that the detection of a response motion of the viewer by the acceleration sensor can be sufficiently achieved with three degrees of freedom on orthogonal coordinate axes including the degree of freedom in the front-back direction in addition to the above degrees of freedom.

A response motion of the viewer in response to an instruction to make a more complex motion, such as "Please shake in a figure-of-eight motion" could be detected with a three-axis three-degree-of-freedom acceleration sensor. Because what is required is that the response motion of the viewer can be compared to the motion instructed by the "motion instruction information 101" (refer to FIG. 3), the response motion of the viewer does not necessarily have to be detected in six degrees of freedom (six channels) as in the case of the three-axis six-degree-of-freedom acceleration sensor (not shown) of the motion sensor 23 shown in FIG. 1. Ultimately, even when the detection by an acceleration sensor with one degree of freedom (one channel) is used as a detection result (primary information), the response motion of the viewer can be compared to the instructed motion.

In this embodiment, the viewing authenticating principal can decide the conditions under which the response motion of the viewer detected by the three-axis six-degree-of-freedom acceleration sensor (not shown) of the motion sensor 23 shown in FIG. 1 is extracted as a detection result (primary information) in "authentication criteria" decided by the viewing authenticating principal. For example, because the response motion of the viewer in response to an instruction "Please shake from side to side" or "Please shake up and down" for example, is usually a rotational motion about the viewer's wrist or elbow, quick and appropriate coding (digitizing) can be achieved without unnecessary signal acquisition and information processing when detections with four degrees of freedom (four channels) including rotation in the yaw direction and rotation in the pitch direction in addition to the right-left and up-down directions in the detections of the response motion of the viewer detected by the three-axis six-degree-of-freedom acceleration sensor of the motion sensor 23 are adopted as a detection result and the information about the remaining two degrees of freedom (two channels) is not included in the detection result (primary information) (is not acquired as a signal).

Alternatively, the three-axis six-degree-of-freedom acceleration sensor (not shown) of the motion sensor 23 shown in FIG. 1 may be fixedly provided in a controller which is connected to the main body of the audio-visual terminal 20 by an electric wire and which the viewer uses to operate the audio-visual terminal 20. When a part of the audio-visual terminal is constituted as a separate controller connected to the main body thereof by an electric wire as described above, the response motion of the viewer can be suitably coded (digitized) as information of a motion with multiple degrees of freedom via a three-axis six-degree-of-freedom acceleration sensor of the motion sensor 23 fixed to the controller, which the viewer can hold and operate with one hand, even when the main body of the audio-visual terminal 20 cannot be moved freely as in the case of a desktop computer.

The three-axis six-degree-of-freedom acceleration sensor (not shown) of the motion sensor 23 shown in FIG. 1 is configured to be able to detect acceleration and angular acceleration divided into six degrees of freedom (accelerations in the front-back, right-left and up-down directions and angular accelerations in the pitch, roll and yaw directions) in a three-dimensional space. The three-axis six-degree-of-freedom acceleration sensor constantly outputs the detection of each degree of freedom. The three-axis six-degree-of-freedom acceleration sensor is constructed small using the MEMS (Micro-Electro-Mechanical Systems) technology. Preferably, the three-axis six-degree-of-freedom acceleration sensor is an acceleration/angular acceleration sensor obtained by integrally molding a plurality of capacitance-type acceleration detection circuits with a resin into a semiconductor package.

Alternatively, the accelerations and angular accelerations may be separately detected by a plurality of acceleration sensors packaged individually, or only either the accelerations or angular accelerations may be detected. Alternatively, an optical angular acceleration meter using a mirror or optical fibers, which can detect angular accelerations more precisely to measure an optical path difference of laser light may be used. Alternatively, a less expensive mechanical acceleration meter may be used without the use of the MEMS technology.

Also, the motion sensor 23 shown in FIG. 1 has an auxiliary camera (not shown) fixed to the audio-visual terminal 20 in addition to the three-axis six-degree-of-freedom acceleration sensor (not shown). By capturing the response motion of the viewer with the camera of the motion sensor 23, the response motion of the viewer can be detected. In this case, the response motion of the viewer can be detected by performing an image analysis on the video image of the response motion of the viewer captured with the camera. What is required of the detection device of the motion sensor 23 is to be able to detect a response motion (motion) of the viewer. Thus, the detection device of the motion sensor 23 may be a well-known displacement meter, such as an optical displacement meter or ultrasonic displacement meter, instead of a camera. Also, the motion sensor 23 may be configured to detect a response motion of the viewer only with a three-axis six-degree-of-freedom acceleration sensor (not shown) without a camera (not shown), or the motion sensor 23 may have only a camera (not shown).

An advantage of the use of a (three-axis six-degree-of-freedom) acceleration sensor as means for detecting a response motion of the viewer is that an acceleration sensor, for example, for game machines can be used in the audio-visual terminal 20 shown in FIG. 1. An advantage of the use of a camera as means for detecting a response motion of the viewer is that the audio-visual terminal 20 in this embodiment can be implemented by adding software for motion detection to a photographic camera provided on the audio-visual terminal 20.

Figure 8:
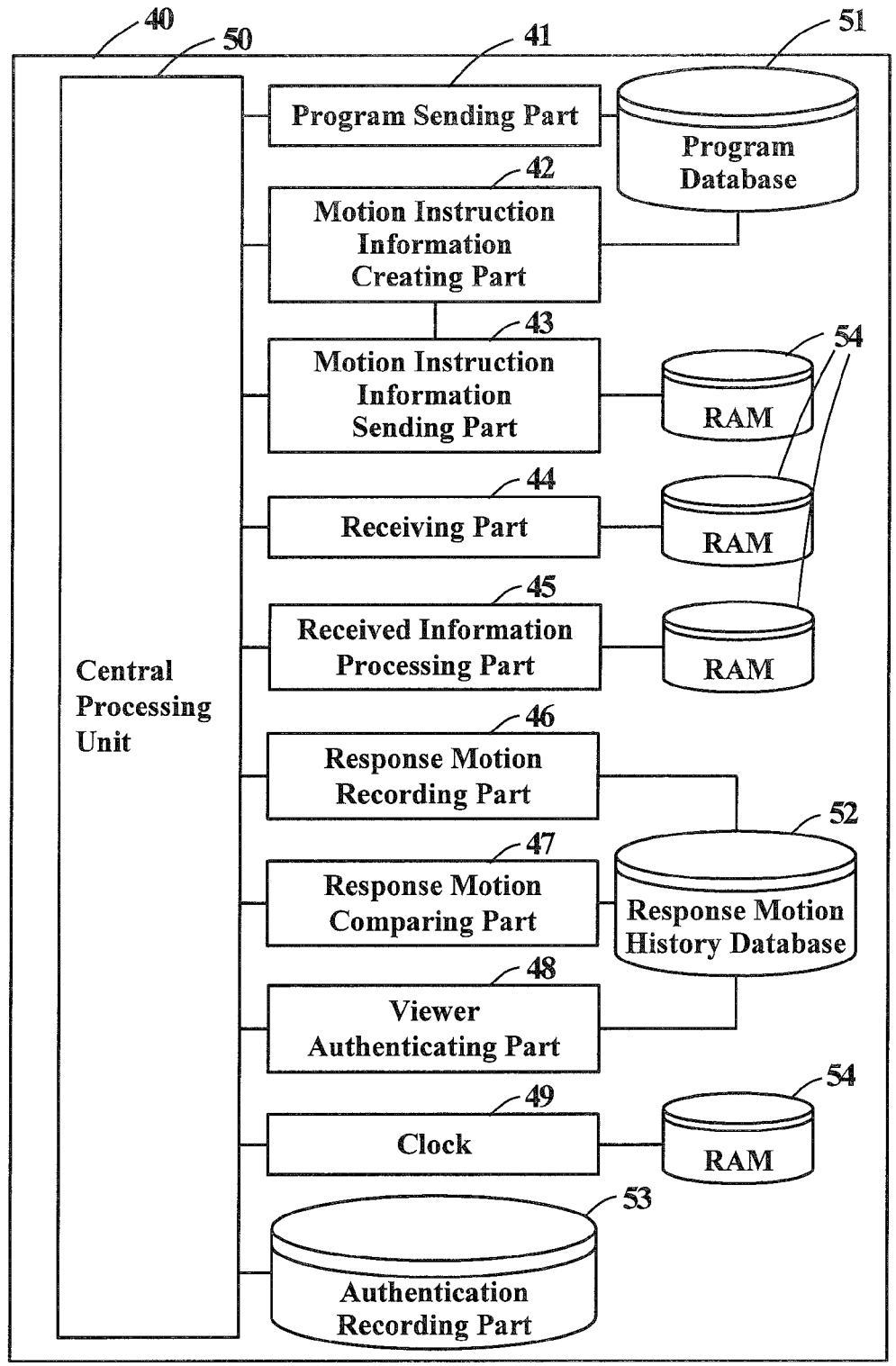
FIG. 8 is a block diagram illustrating an example of the construction of a viewing authentication system according to a second embodiment of the present invention.

The sending part 29 shown in FIG. 1 is further configured to send the information output from the audio-visual terminal 20 to the viewing authentication system 40 of the viewing authenticating principal (refer to FIG. 8). Specifically, the sending part 29 is an information communication instrument (wireless LAN communication instrument (router)) (not shown) connectable to a public wireless LAN (not shown) for information communication.

Because what is required of the sending part 29 is to be able to perform information communication with the viewing authentication system 40 of the viewing authenticating principal (refer to FIG. 8), the sending part 29 may be connectable to a LAN connected to a WAN by a wire communication cable for information communication with the viewing authentication system 40. Alternatively, the sending part 29 may be directly connectable to a WAN in a wireless or wired manner for information communication with the viewing authentication system 40. Alternatively, the sending part 29 may be connectable to the same LAN with the viewing authentication system 40 in a wireless or wired manner for information communication with the viewing authentication system 40. Alternatively, the sending part 29 may be directly connectable to the viewing authentication system 40 in a wireless or wired manner for information communication. Alternatively, the sending part 29 may perform information communication using radio waves for cellular phones.

While the sending part 29 is configured to perform information communication using HTTP (Hypertext Transfer Protocol), the sending part 29 may employ encryption using SSL (Secure Sockets Layer) (HTTPS). Alternatively, the sending part 29 may perform communication by means of electronic mail using SMTP (Simple Mail Transfer Protocol). The sending part 29 may employ an information communication method according to any standard (protocol).

Also, the coding part 24 shown in FIG. 1 is an information processing device for coding "information about the response motion of the viewer" (primary information, secondary information and tertiary information) obtained from a detection result (primary information) detected by the motion sensor 23 into a signal sendable by the sending part 29. The coding part 24 creates a detection result (primary information), which is obtained as a result of extraction of useful signals (information) from a detection from the motion sensor 23 based on the "authentication criteria" decided by the viewing authenticating principal, and information (primary information, secondary information and tertiary information) about the response motion of the viewer obtained from the detection result (primary information), codes these pieces of information into signals sendable by the sending part 29, and delivers the signals to the sending part 29.

For example, the coding part 24 shown in FIG. 1 first codes the response motion of the viewer detected by the motion sensor 23 into a detection signal (primary information) which is useful for viewing authentication based on the "authentication criteria" decided by the viewing authenticating principal. Then, the coding part 24 creates an index value as secondary information by indexing (numerical conversion of) the information about the response motion of the viewer based on the "authentication criteria" decided by the viewing authenticating principal. Also, the coding part 24 creates an authentication result as tertiary information by making an authenticity judgment on the index value as secondary information based on the "authentication criteria." Finally, the coding part 24 codes all the pieces of information (primary information, secondary information and tertiary information) that the coding part 24 has into signals sendable by the sending part 29 and delivers the signals to the sending part 29.

Specifically, the coding part 24 shown in FIG. 1 can code a response motion of the viewer detected by the three-axis six-degree-of-freedom acceleration sensor (not shown) of the motion sensor 23 by acquiring (sorting out) necessary signals (information) based on the "authentication criteria" to create a detection result (primary information). The coding part 24 acquires (codes) analog output voltage signal information from the detection from the three-axis six-degree-of-freedom acceleration sensor (not shown) for an appropriate period of time (for three minutes, for example) after the motion instructing part 22 instructs the viewer to make a motion. At this time, because the period of time for which the analog output voltage signal information is acquired is exactly the period of time for which the response motion of the viewer is waited for, the coding part 24 can properly code the response motion of the viewer into signals depending on the motion the viewer is instructed to make based on the "authentication criteria." The "authentication criteria" have been transmitted to the audio-visual terminal 20 as information of "authentication criteria" included in the "motion instruction information 101" (refer to FIG. 3) discussed previously.

Also, the coding part 24 shown in FIG. 1 can sort out necessary information by using a band-pass filter (not shown) or the like or by changing the sampling rate for information acquisition in coding to create analog output voltage signals from a detection of the response motion of the viewer detected by the three-axis six-degree-of-freedom acceleration sensor (not shown) of the motion sensor 23. The threshold between noise and signal of a motion of the viewer that can be determined to be valid by the viewing authenticating principal included in a detection from the three-axis six-degree-of-freedom acceleration sensor (not shown) can be appropriately decided by the coding part 24 depending on the motion instructed to the viewer based on the "authentication criteria" decided by the viewing authenticating principal. At this time, the noise signal is separated and excluded from the response motion of the viewer based on the threshold of the signal filter.

Next, the analog signals are converted into digital signals by an analog/digital conversion circuit (not shown) of the coding part 24 at an appropriate sampling rate. The coding part 24 is configured to decide the sampling rate appropriately depending on the motion instructed to the viewer based on the "authentication criteria" so that the response motion of the viewer can be properly acquired.

The detection result (primary information) obtained as described above is coded into a signal by the coding part 24 based on the "authentication criteria" decided by the viewing authenticating principal and according to appropriate conditions depending on the motion instructed to the viewer. The detection result (primary information) coded by the cording part 24 is sent to the viewing authentication system 40 of the viewing authenticating principal (refer to FIG. 8) by the sending part 29.

The coding in the coding part 24 may involve coding for information communication. The viewing authenticating principal can obtain the information of the response motion of the viewer by receiving the detection result (primary information) from the sending part 29. The viewing authenticating principal also can authenticate that the viewer has viewed the audio-visual program by sequentially processing and authenticating detection results (primary information) in the light of the "authentication criteria" with the viewing authentication system 40 (refer to FIG. 8) based on the detection results (primary information) coded into signals by the coding part 24.

Also, the coding part 24 shown in FIG. 1 can create secondary information, which is information obtained by indexing (numerical conversion of) the information about the response motion of the viewer based on the "authentication criteria" decided by the viewing authenticating principal, by processing the detection result (primary information) using, for example, a numerical analysis in the light of the "authentication criteria" decided by the viewing authenticating principal. For example, when the "authentication criteria" decided by the viewing authenticating principal require "the difference between the paths of the response motion and the instructed motion to be 7 mm or less at a maximum," the coding part 24 can create information (secondary information) of "the maximum value of the difference between the paths of the response motion and the instructed motion," which is information derived from the detection result (primary information), by processing the detection result (primary information) coded appropriately by means of a numerical analysis as described above.

Specifically, when "information of the path of the movement (on an orthogonal coordinate axes) of the audio-visual terminal 20" as information about the response motion of the viewer is obtained by performing a numerical analysis on the "information (digital signal information) of acceleration of the movement of the audio-visual terminal 20 acquired chronologically" (primary information) as a detection result detected by the three-axis six-degree-of-freedom acceleration sensor (not shown) of the motion sensor 23 shown in FIG. 1, information of velocity of the response motion of the viewer (velocity of the movement of the audio-visual terminal 20) can be obtained by performing a numerical analysis to integrate the "information (digital signal information) of acceleration of the movement of the audio-visual terminal 20 in the degrees of freedom on the three axes in the orthogonal coordinate system detected by the three-axis six-degree-of-freedom acceleration sensor and acquired chronologically" (primary information) as the detection result once with respect to time. Also, information of the path (on the orthogonal coordinate axes) of the response motion of the viewer (information of the path of the movement or displacement (on the orthogonal coordinate axes) of the audio-visual terminal 20) can be obtained by performing a numerical analysis to integrate the "information (digital signal information) of acceleration of the movement of the audio-visual terminal 20 acquired chronologically" (primary information) as the detection result twice with respect to time.

In a similar way, when information about the response motion of the viewer (information of the path of the movement (about the orthogonal coordinate axes) of the audio-visual terminal 20) is obtained by performing a numerical analysis on the "information (digital signal information) of angular acceleration of the movement of the audio-visual terminal 20 acquired chronologically" (primary information) as a detection result detected by the three-axis six-degree-of-freedom acceleration sensor (not shown) of the motion sensor 23 shown in FIG. 1, information of angular velocity of the response motion of the viewer (angular velocity of the movement of the audio-visual terminal 20) can be obtained by performing a numerical analysis to integrate the "information (digital signal information) of angular acceleration of the movement of the audio-visual terminal 20 in the degrees of freedom about the three axes in the orthogonal coordinate system detected by the three-axis six-degree-of-freedom acceleration sensor and acquired chronologically" (primary information) as the detection result once with respect to time. Also, information of the path (about the orthogonal coordinate axes) of the response motion of the viewer (information of the path of the movement or rotational angle (about the orthogonal coordinate axes) of the audio-visual terminal 20) can be obtained by performing a numerical analysis to integrate the "information (digital signal information) of angular acceleration of the movement of the audio-visual terminal 20 acquired chronologically" (primary information) as the detection result twice with respect to time.

As described above, because the coding part 24 shown in FIG. 1 can process the information (digital signal information) (primary information) of acceleration of a response motion of the viewer (movement of the audio-visual terminal 20) detected by the three-axis six-degree-of-freedom acceleration sensor (not shown) of the motion sensor 23 into information of movement in an arbitrary dimension by means of a numerical analysis, the information of the response motion of the viewer (movement of the audio-visual terminal 20) can be coded into information of movement expressed quantitatively by digital signal information in an arbitrary dimension based on the "authentication criteria" decided by the viewing authenticating principal.

Also, the coding part 24 shown in FIG. 1 is configured to be able to quantitatively calculate the maximum value of the difference between the path of the response motion of the viewer (movement of the audio-visual terminal 20) obtained as a result of these numerical analyses and the path of the instructed motion (secondary information). To compare the response motion of the viewer (movement of the audio-visual terminal 20) in the dimension of movement path (unit: mm) can be considered as a comparison method which allows the viewing authenticating principal to intuitively understand and compare the difference in movement (difference in path) compared to the case where the response motion of the viewer (movement of the audio-visual terminal 20) is compared in each of dimensions of acceleration (unit: $m/s^2$), angular acceleration (unit: $rad/s^2$), velocity (unit: m/s) and angular velocity (unit: rad/s). Therefore, this can be considered to be a comparison method by which an index value indicated in an index of (numerically indicating) the response motion of the viewer appropriately can be obtained.

Also, it is desirable for the coding part 24 shown in FIG. 1 to code (digitize) the response motion of the viewer (movement of the audio-visual terminal 20) in the dimension of path for consistency of dimension of information with the information of the response motion of the viewer in the case where a response motion of the viewer is detected by a camera (not shown) of the motion sensor 23, which is described in detail later (when a response motion of the viewer is detected by a camera (not shown) of the motion sensor 23, the response motion of the viewer is first detected in the dimension of path). Thus, to obtain the information of acceleration of the response motion of the viewer (movement of the audio-visual terminal 20) detected by the three-axis six-degree-of-freedom acceleration sensor (not shown) of the motion sensor 23 as information in the dimension of path (unit: mm) by means of a numerical analysis is considered to be highly beneficial as a method for indexing (numerical conversion of) the response motion of the viewer. However, the response motion of the viewer (movement of the audio-visual terminal 20) detected by the three-axis six-degree-of-freedom acceleration sensor (not shown) of the motion sensor 23 may be directly compared without such a numerical analysis in each of the dimensions of acceleration, angular acceleration, velocity and angular velocity.

As a result of comparing the difference between the analyzed path of the response motion of the viewer (movement of the audio-visual terminal 20) and the path of the motion instructed by the motion instructing part 22, the coding part 24 shown in FIG. 1 calculates the maximum value of the difference between the path of the response motion of the viewer (movement of the audio-visual terminal 20) and the path of the motion instructed by the motion instructing part 22 as an index value (secondary information), such as "5 mm,"

based on the "authentication criteria." Also, the coding part 24 codes the created index value (secondary information) based on the "authentication criteria" into a signal sendable by the sending part 29 and delivers the signal to the sending part 29. The sending part 29 sends the index value (secondary information) based on the "authentication criteria" to the viewing authenticating principal. Thus, the viewing authenticating principal can obtain the index value (secondary information) obtained by indexing (numerical conversion of) the information of the response motion of the viewer based on the "authentication criteria." The viewing authenticating principal can authenticate that the viewer has viewed the audio-visual program by making an authenticity judgment based on the "authentication criteria" with the viewing authentication system 40 (refer to FIG. 8) based on the index value (secondary information) obtained by indexing the response motion of the viewer based on the "authentication criteria."

Also, the coding part 24 shown in FIG. 1 is configured to be able to independently make an authenticity judgment by judging the index value obtained by indexing (numerical conversion) based on the "authentication criteria" (for example, the information that "the maximum value of the difference between the path of the response motion of the viewer and the path of the instructed motion is 5 mm") (secondary information) in the light of the "authentication criteria" decided by the viewing authenticating principal. The result of the authenticity judgment made by the coding part 24 (tertiary information) can be coded by the coding part 24 so that the sending part 29 can send it as authentication information (tertiary information) that "the coding part 24 determines that the viewer has made a response motion properly," for example. The authentication information as tertiary information output from the audio-visual terminal 20 is also sent to the viewing authentication system 40 of the viewing authenticating principal (refer to FIG. 8) by the sending part 29.

In the coding by the coding part 24 shown in FIG. 1, a detection result (primary information) useful for viewing authentication is first created by selecting (acquiring) necessary signals (information) out of the signals (information) of the response motion of the viewer detected by the motion sensor 23 based on the "authentication criteria" and coded, for example. Then, the coding part 24 creates secondary information, which is an index value indicated in an index of (numerically indicating) the response motion of the viewer, from the information of the detection result (primary information) by indexing (numerical conversion of) the response motion of the viewer based on the "authentication criteria" decided by the viewing authenticating principal. In addition, the coding part 24 creates an authentication result as tertiary information from the secondary information, which is an index value indicated in an index of the response motion of the viewer, by making an authenticity judgment based on the "authentication criteria." As described above, the coding part 24 can derivatively create and code the information for use in authenticating the viewer's viewing of the audio-visual program from signals (information) of the response motion of the viewer detected by the motion sensor 23 by repeating information processing based on the "authentication criteria" decided by the viewing authenticating principal.

The analog output voltage signals (primary information) as a detection result from the three-axis six-degree-of-freedom acceleration sensor (not shown) of the motion sensor 23 shown in FIG. 1 may be subjected to differential-integral processing by an operational amplifier so that the response motion of the viewer (movement of the audio-visual terminal 20) can be analyzed without being converted from analog output voltage signal information. Also, the analog output voltage signal information (secondary information) analyzed by an operational amplifier may be converted into digital output voltage signal information using an analog/digital conversion circuit (not shown).

Also, the motion sensor 23 shown in FIG. 1 has an camera (not shown) which is configured to fix to the audio-visual terminal 20 in addition to the three-axis six-degree-of-freedom acceleration sensor (not shown), as auxiliary. Thus, the coding part 24 can detect a response motion of the viewer with the camera of the motion sensor 23, and obtain information about the response motion of the viewer by performing an image analysis on the video image captured by the camera of the motion sensor 23.

Specifically, the coding part 24 shown in FIG. 1 is configured to decide a characteristic point (for example, the position of a palm of the viewer) for use in detecting the response motion of the viewer in the video image (detection) captured by the camera (not shown) for detecting the response motion of the viewer. The coding part 24 is configured to continuously extract the characteristic point from each of a series of images that make up the video image and acquires the information obtained by continuously tracking the extracted characteristic points as a detection result (primary information). As described above, the coding part 24 is configured to be able to acquire information of the response motion of the viewer (for example, the viewer's motion of waving) from a video image (detection) of the response motion of the viewer captured by the camera of the motion sensor 23 as information (detection result) (primary information) of the movement of the viewer relative to the camera (for example, information of the path of the movement of the viewer's palm).

Alternatively, in another embodiment, the coding part 24 shown in FIG. 1 may be configured to decide a characteristic point on something other than the viewer, such as scenery, in a video image (detection) captured by the camera (not shown). In this case, information of the path of the movement of the camera relative to a three-dimensional space (scenery) can be acquired as a detection result (primary information) by chronologically tracking the detected characteristic point. Alternatively, the coding part 24 may be configured to acquire information of an response motion of the viewer holding and operating the audio-visual terminal 20 to which the camera is fixed with one hand (for example, the rotational angle of the viewer's lower arm about the elbow (angle through which the viewer's arm is swung)) as a detection result (primary information) by performing a coordinate transformation with respect to an arbitrary origin without deciding the information of the path of the movement of the camera relative to the three-dimensional space (scenery) as a detection result (primary information).

In yet another embodiment, the coding part 24 shown in FIG. 1 may be configured to decide two characteristic points in a video image (detection) of scenery captured by the camera (not shown) so as to acquire the information of the path of the response motion of the viewer as information of a more three-dimensional movement (detection result) (primary information). For example, a case is taken as an example in which two characteristic points in each of a series of images that make up a video image (detection) of scenery are analyzed as making both parallel and rotational movements with time with a distance therebetween maintained. In this case, the arm of the viewer, who is holding and operating the audio-visual terminal 20 to which the camera is fixed, is regarded as making both parallel and rotational movements relative to the captured scenery (three-dimensional space) in a capturing plane perpendicular to the direction of the optical axis of the camera, and information of the path of the response motion of the viewer (detection result) (primary information) can be acquired.

Also, a case is taken as an example in which two characteristic points are analyzed as moving toward or away from each other in each of a series of images that make up a video image (detection) of scenery. In this case, the coding part 24 shown in FIG. 1 regards the camera and the arm of the viewer, who is holding and operating the audio-visual terminal 20 to which the camera is fixed, are moving backward or forward along the optical axis of the camera (not shown) and can acquire information of the path of the response motion of the viewer (detection result) (primary information).

Because what is required of the coding part 24 shown in FIG. 1 is to be able to acquire a detection result (primary information) of a response motion of the viewer as a movement relative to the camera (not shown), a response motion of the viewer may be detected by an image analysis on a video image (detection) of the response motion of the viewer captured by a camera fixed to the audio-visual terminal 20 completely fixed in a three-dimensional space (for example, camera fixed to a desktop computer). In this case, the fixed camera can be regarded as a part of the audio-visual terminal, and the response motion of the viewer is the viewer's waving motion, for example.

When information of a response motion of the viewer (movement of the audio-visual terminal 20) is analyzed by an image analysis on a video image (detection) captured by a camera (not shown) fixed to the audio-visual terminal 20 shown in FIG. 1, it is possible, as in the case of the three-axis six-degree-of-freedom acceleration sensor (not shown) discussed previously, to acquire information of velocity or angular velocity of the response motion of the viewer (movement of the audio-visual terminal 20) by performing a numerical analysis to differentiate the information (digital signal information) of displacement (on an orthogonal coordinate axes) or rotational angle (about the orthogonal coordinate axes) (primary information) of a characteristic point between successive images captured at a certain time interval defined by the frame rate (capturing speed) in the video image (detection) captured by the camera once with respect to time, or information of acceleration or angular acceleration of the response motion of the viewer (movement of the audio-visual terminal 20) by performing a numerical analysis to differentiate the information (digital signal information) of displacement (on the orthogonal coordinate axes) or rotational angle (about the orthogonal coordinate axes) (primary information) of the characteristic point twice with respect to time.

Figure 4:
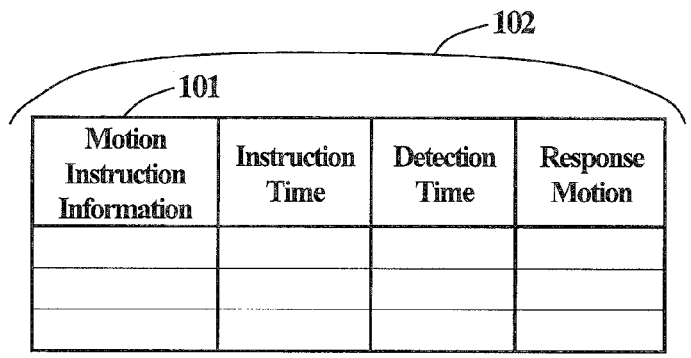
FIG. 4 is an explanatory view illustrating information included in motion response information according to the first embodiment of the present invention.

Referring next to FIG. 4, "motion response information 102" which the coding part 24 (refer to FIG. 1) creates is described. In this embodiment, the "information about a response motion of the viewer" obtained by the coding part 24 from a detection result detected by the motion sensor 23 (refer to FIG. 1) is created as "motion response information 102," for example. The "motion response information 102" includes the information of "motion instruction information 101" (refer to FIG. 3), described previously, as constituent information. Thus, the information included in the "motion instruction information 101," that is, the "program ID," "instruction ID," "viewer ID," "sending time," "instruction time," "instructed motion" and "authentication criteria," is included as constituent information of the "motion response information 102."

In the "detection time" included in the "motion response information 102" shown in FIG. 4, the time when a response motion of the viewer was detected by the motion sensor 23 (refer to FIG. 1), which is output from the clock 28 (refer to FIG. 1) of the audio-visual terminal 20 (refer to FIG. 1), is recorded. The "detection time" which is output from the clock 28, which outputs the times when the audio-visual terminal 20, which is described in detail later, performs a control operation, can be used to determine the "period of time taken by the viewer to respond" (secondary information) in conjunction with the "instruction time," the time when the motion instructing part 22 (refer to FIG. 1) instructs the viewer to make a motion, which is also output from the clock 28, included in the "motion instruction information 101" (refer to FIG. 3) discussed previously.

The detection result (primary information) detected by the three-axis six-degree-of-freedom acceleration sensor (not shown) of the motion sensor 23 (refer to FIG. 1) and coded by the coding part 24 (refer to FIG. 1) is recorded in the information of "response motion" included in the "motion response information 102" shown in FIG. 4 as digital signal information. The information (detection result) (primary information) of the movement of the characteristic point detected by an auxiliary camera (not shown) of the motion sensor 23 and extracted as a result of image processing by the coding part 24 is also recorded in the information of "response motion." While the information of "instruction time" included in the "motion response information 102" shown in FIG. 4 is information included in the "motion instruction information 101" (refer to FIG. 3), it is shown separately from the "motion instruction information 101" for easy understanding of information included in the "motion response information 102." Alternatively, the "motion response information 102" may consist of other types of information than those shown in FIG. 4.

Referring now to FIG. 2 again, the detailed configuration of the coding part 24 is described. The coding part 24 shown in FIG. 1 and FIG. 2 has a motion authenticating part 24a, a response authenticating part 24b and a time authenticating part 24c which output specific authentication information (tertiary information). In this embodiment, these dedicated authenticating parts of the coding part 24 are configured to output a specific and concrete authenticity judgment (tertiary information) based on each of specific "authentication criteria" decided by the viewing authenticating principal. Also, the authentication information (tertiary information) output from these dedicated authenticating parts is sent to the viewing authentication system 40 of the viewing authenticating principal (refer to FIG. 8) by the sending part 29 (refer to FIG. 1), and recorded as information included in an "authentication record 107" (refer to FIG. 5) in an authentication recording part 53 (refer to FIG. 8) of the viewing authentication system 40 by the viewing authenticating principal as described in detail later.

The coding part 24 shown in FIG. 2 has a motion authenticating part 24a for authenticating that a response motion of the viewer detected by the motion sensor 23 (refer to FIG. 1) and the motion instructed to the viewer by the motion instructing part 22 (refer to FIG. 1) agree with each other in the light of predetermined criteria decided by the viewing authenticating principal. In this embodiment, the motion authenticating part 24a of the coding part 24 is configured to output a "motion authentication (audio-visual terminal) 103a" (refer to FIG. 5) (tertiary information) when the response motion of the viewer (primary information) detected by the three-axis six-degree-of-freedom acceleration sensor (not shown) of the motion sensor 23 and the motion instructed to the viewer by the motion instructing part 22 are authenticated to agree with each other in the light of predetermined criteria (for example, "authentication criteria" requiring "the difference in acceleration to be 1.2 G or lower at a maximum in order for the motions to be determined to agree with each other") decided by the viewing authenticating principal.

First, the coding part 24 shown in FIG. 2 is configured to acquire a response motion of the viewer detected by the motion sensor 23 (refer to FIG. 1) as a detection result (primary information) according to the "authentication criteria." Also, the motion authenticating part 24a of the coding part 24 is configured to create secondary information indicated in an index of (numerically indicating) the information of the response motion of the viewer according to the "authentication criteria" decided by the viewing authenticating principal with reference to the information of "authentication criteria" included in the "motion instruction information 101" (refer to FIG. 3). Specifically, the motion authenticating part 24a first creates the response motion of the viewer (movement of the audio-visual terminal 20 (refer to FIG. 1)) as information of acceleration acquired chronologically in a three-dimensional space in an orthogonal coordinate system based on the detection result (primary information). On the other hand, the information of the motion instructed by the motion instructing part 22 (refer to FIG. 1) is recorded also as information of acceleration presented chronologically by the viewing authenticating principal in the "instructed motion" included in the "motion instruction information 101."

The motion authenticating part 24a shown in FIG. 2 is configured to calculate the "maximum value of the difference in acceleration" between the information of acceleration of the response motion of the viewer (movement of the audio-visual terminal 20 (refer to FIG. 1)) acquired chronologically and the information of acceleration presented chronologically and indicating the movement of the "instructed motion" (secondary information). The motion authenticating part 24a can specifically calculate that the accelerations compared according to the "authentication criteria" have "a difference of 0.6 G at a maximum" (secondary information), for example. Also, the motion authenticating part 24a can authenticate the secondary information indicated in an index of (numerically indicating) the response motion of the viewer by making an authenticity judgment based on the "authentication criteria" (for example, "authentication criteria" requiring "the difference between accelerations compared chronologically to each other to be 1.2 G or lower at a maximum"). The content of the information of authentication result (tertiary information) output from the motion authenticating part 24a is that "the motion authenticating part 24a determines that the response motion of the viewer agrees with the instructed motion," for example.

The motion authenticating part 24a is configured to output a "motion authentication (audio-visual terminal) 103a" (refer to FIG. 5) (tertiary information) when the motion authenticating part 24a shown in FIG. 2 determines that the response motion of the viewer agree with the motion instructed to the viewer by the motion instructing part 22 (refer to FIG. 1). The motion authenticating part 24a is configured to provide the viewer with a notice by means of video image and sound (for example, display a message saying "Authenticated" (refer to FIGS. 6A-6C) and emit a notification sound to the viewer) with the reproducing part 21 (refer to FIG. 1) when the motion authenticating part 24a outputs a "motion authentication (audio-visual terminal) 103a" (tertiary information) in order to inform the viewer that the motion authentication has been given by the motion authenticating part 24a. Thus, the viewer can recognize the motion authentication by the motion authenticating part 24a and finish the response motion to concentrate on viewing the audio-visual program again.

Also, the coding part 24 shown in FIG. 2 has a response authenticating part 24b in addition to the motion authenticating part 24a. The response authenticating part 24b is configured to output a "viewing authentication (audio-visual terminal) 105a" (refer to FIG. 5) (tertiary information) based on a "motion response rate" when a "motion response rate" (secondary information) comparing the total number of pieces of "motion instruction information 101" (refer to FIG. 3) and the total number of detections of the response motion of the viewer detected by the three-axis six-degree-of-freedom acceleration sensor (not shown) of the motion sensor 23 satisfies predetermined criteria decided by the viewing authenticating principal (for example, "authentication criteria" requiring "the motion response rate to be equal to or higher than 80% for viewing authentication are given").

The response authenticating part 24b shown in FIG. 2 is configured, just like the motion authenticating part 24a discussed above, to acquire information of the total number of detections of the response motion of the viewer (detection result) (primary information) from the three-axis six-degree-of-freedom acceleration sensor (not shown) of the motion sensor 23 (refer to FIG. 1) based on the "authentication criteria" included in the "motion instruction information 101" (refer to FIG. 3). Also, the response authenticating part 24b is configured to refer to the "total number of pieces of motion instruction information 101" recorded in the information of "instruction ID" included in the "motion instruction information 101" by the viewing authenticating principal. Specifically, the response authenticating part 24b is configured to refer to the "total number of pieces of motion instruction information 101" in the information of "instruction ID" as information included in the "motion instruction information 101", which is given by the viewing authenticating principal as information indicating '(identification number (ascending serial number starting from 1) of the piece of "motion instruction information 101" to be sent)/(total number of pieces of "motion instruction information 101" to be sent (=20)),' such as "1/20." Thus, the response authenticating part 24b can create an "motion response rate" comparing the total number of detections of the response motion of the viewer from the motion sensor 23 and the "total number of pieces of motion instruction information 101" as secondary information indicated in an index of (numerically indicating) the response motions of the viewer based on the "authentication criteria."

For example, suppose that the total number of pieces of "motion response information 102" (refer to FIG. 4) created as a result of detection of response motions of the viewer by the three-axis six-degree-of-freedom acceleration sensor (not shown) of the motion sensor 23 (refer to FIG. 1) of the audio-visual terminal 20 (refer to FIG. 1) (the number of detections of response motion from the motion sensor 23) through one audio-visual program is found to be 19 as a result of an authenticity judgment made by the response authenticating part 24b shown in FIG. 2. In this case, the response authenticating part 24b can calculate the "motion response rate" (secondary information) as 95% by the mathematical expression: 19 (the number of detections of response motion from the motion sensor 23)/20 (the total number of pieces of "motion instruction information 101"). Also, when "authentication criteria" requiring the "motion response rate" to be 80% or higher for viewing authentication are given in the information of "authentication criteria" included in the "motion instruction information 101" (refer to FIG. 3) by the viewing authenticating principal, for example, the response authenticating part 24b can authenticate that the responses of the viewer satisfy the condition for viewing authentication based on a "motion response rate" (secondary information).

The response authenticating part 24b is configured to output a "viewing authentication (audio-visual terminal) 105a" (refer to FIG. 5) (tertiary information) based on a "motion response rate" when the response authenticating part 24b shown in FIG. 2 performs an authenticating based on a "motion response rate" (secondary information). The response authenticating part 24b is configured to provide the viewer with a notice by means of video image and sound (for example, display a message saying "Authenticated" (refer to FIGS. 6A-6C) and emit a notification sound to the viewer) with the reproducing part 21 (refer to FIG. 1) when the response authenticating part 24b outputs a "viewing authentication (audio-visual terminal) 105a" based on a "motion response rate" (tertiary information) in order to inform the viewer that the response authentication has been given by the response authenticating part 24b. Thus, the viewer can recognize the viewing authentication by the response authenticating part 24b and finish the response motion to concentrate on viewing the audio-visual program again.

Also, the coding part 24 shown in FIG. 2 has a time authenticating part 24c in addition to the motion authenticating part 24a and the response authenticating part 24b. The audio-visual terminal 20 has a clock 28 (refer to FIG. 1) for outputting the times when the audio-visual terminal 20 (refer to FIG. 1) performs a control operation. The clock 28 is configured to be able to output all the times when the audio-visual terminal 20 performs a control operation. The time authenticating part 24c of the coding part 24 outputs a "time authentication (audio-visual terminal) 104a" based on a "period of time taken by the viewer to respond" (refer to FIG. 5) (tertiary information) which determines that the "period of time taken by the viewer to respond" (secondary information) to be appropriate when the time when the response motion of the viewer was detected by the motion sensor 23 (refer to FIG. 1), which is output from the clock 28, is within a predetermined time range decided by the viewing authenticating principal from the time when a motion was instructed to the viewer by the motion instructing part 22 (refer to FIG. 1), which is output from the clock 28, (for example, the "period of time taken by the viewer to respond" is within a time range of a predetermined value (for example, three minutes) based on the "authentication criteria").

The time when the motion sensor 23 (refer to FIG. 1) detected a response motion of the viewer, which is output from the clock 28 (refer to FIG. 1), in an authenticity judgment by the time authenticating part 24c shown in FIG. 2 is recorded as a "detection time" included in the "motion response information 102" (refer to FIG. 4). Also, the time when the motion instructing part 22 (refer to FIG. 1) instructed the viewer to make a motion, which is also output from the clock 28, is recorded as an "instruction time" included in the "motion instruction information 101" (refer to FIG. 3). Based on a detection of a response motion of the viewer by the motion sensor 23, the time authenticating part 24c acquires a detection of the response motion of the viewer by the motion sensor 23 as a detection result ("response motion" included in the "motion response information 102") (primary information) based on the "authentication criteria." Also, the time authenticating part 24c creates "motion response information 102" including the information of the "detection time" output from the clock 28 as constituent information. Also, the "motion instruction information 101" is recorded in the information included in the "motion response information 102." Thus, the time authenticating part 24c creates the "period of time taken by the viewer to respond" (for example, "1 minute"), that is, the period of time between the "instruction time" and the "detection time," as secondary information indicated in an index of (numerically indicating) the response motion of the viewer, based on the "authentication criteria" decided by the viewing authenticating principal.

Also, the time authenticating part 24c shown in FIG. 2 evaluates the secondary information indicated in an index of (numerically indicating) the response motion of the viewer in the light of the information of "authentication criteria." The information of "authentication criteria" is given as information of "authentication criteria" included in the "motion instruction information 101" (refer to FIG. 3) by the viewing authenticating principal. When the "period of time taken by the viewer to respond" (secondary information) is within a predetermined time range based on the "authentication criteria" (for example, within "three minutes" when the "authentication criteria" requires the "period of time taken by the viewer to respond" to be "within three minutes" in order to be determined to be appropriate), the time authenticating part 24c determines that the "period of time taken by the viewer to respond" (secondary information) is appropriate. When the "period of time taken by the viewer to respond" is determined to be appropriate, the time authenticating part 24c outputs a "time authentication (audio-visual terminal) 104a" based on a "period of time taken by the viewer to respond" (refer to FIG. 5) (tertiary information). The time authenticating part 24c is configured to provide the viewer with a notice by means of video image and sound (for example, display a message saying "Authenticated" (refer to FIGS. 6A-6C) and emit a notification sound to the viewer) with the reproducing part 21 (refer to FIG. 1) when the time authenticating part 24c outputs a "time authentication (audio-visual terminal) 104a" based on a "period of time taken by the viewer to respond" (tertiary information) in order to inform the viewer that the time authentication has been given by the time authenticating part 24c. Thus, the viewer can recognize the time authentication by the time authenticating part 24c and finish the response motion to concentrate on viewing the audio-visual program again.

Also, the coding part 24 shown in FIG. 2 is configured to create "information about a response motion of the viewer" based on the authentication results (tertiary information) output from the motion authenticating part 24a, the response authenticating part 24b and the time authenticating part 24c. For example, the coding part 24 can also create authentication information (tertiary information) indicating that "all the motion, response and time authenticating parts determine that the "authentication criteria" are satisfied." Also, the coding part 24 can create information indicating that "the authentication criteria for authentication by the response authenticating part 24b are not satisfied," for example. In addition, the coding part 24 can perform statistical authentication (tertiary information) by further taking the statistics based on the information of the authentication results (tertiary information). As described above, the coding part 24 can create and code the "information about a response motion of the viewer" obtained from a detection result detected by the motion sensor 23 (refer to FIG. 1) into a signal sendable by the sending part 29 (refer to FIG. 1) based on the "authentication criteria."

The information (primary information, secondary information and tertiary information) coded by the coding part 24 shown in FIG. 2 can be sent to the viewing authentication system 40 of the viewing authenticating principal (refer to FIG. 8) by the sending part 29 (refer to FIG. 1). Thus, when the audio-visual terminal 20 (refer to FIG. 1) includes the coding part 24 and the motion authenticating part 24a, the response authenticating part 24b and the time authenticating part 24c shown in this embodiment, the viewing authentication system 40 may not include an information processing device or authentication device having the same functions. However, the viewing authentication system 40 may include an information processing device or authentication device having the same functions and may be configured to perform information processing or authentication operation independently to check the information processing or authentication operation by the audio-visual terminal 20. Alternatively, the audio-visual terminal 20 may be configured not to create the authentication results (tertiary information) and but to send only a detection result (primary information) detected by the motion sensor 23 (refer to FIG. 1), for example, to the viewing authentication system 40 so that the viewing authentication system 40 may perform the subsequent information processing (creation of secondary information and tertiary information).

Referring now to FIG. 1, a viewer authenticating is described. The response motion recording part 25 shown in FIG. 1 is a database-management system for recording pieces of "motion response information 102" (refer to FIG. 4) output from the cording part 24 into the response motion history database (DB) 31, which is a large-capacity storage device (hard disk/memory) connected to the response motion recording part 25. Thus, the response motion history database 31 can record each detection result detected by the motion sensor 23 (information of "response motion" included in the "motion response information 102") and created as the "motion response information 102" by the coding part 24 in a "response motion history." The "motion response information 102" is information based on the detection results detected by the motion sensor 23. Alternatively, because what is required is that each detection result (primary information) detected by the motion sensor 23 can be recorded in the response motion recording part 25, the response motion recording part 25 may be configured to record each detection result detected by the motion sensor 23 without any change. Also, the response motion recording part 25 and the response motion history database 31 may be provided as a unitary database device.

The response motion recording part 25 shown in FIG. 1 can search and extract pieces information that satisfy certain search conditions in the "response motion history" (the "motion response information 102" (refer to FIG. 4)) recorded in the response motion history database 31. Specifically, the response motion recording part 25 is configured to be able to search and extract other detection results (pieces of "response motion" included in the "motion response information 102") made by the same viewer based on the same motion instruction from the "response motion history."

Each detection result detected by the motion sensor 23 shown in FIG. 1 (primary information) is processed by the cording part 24 and recorded in the response motion history database 31 as information of the "response motion" included in the "motion response information 102" (refer to FIG. 4). As information included in the "motion response information 102," the "motion instruction information 101" (refer to FIG. 3), which is information corresponding to the "motion response information 102," is recorded. As information included in the "motion instruction information 101," the information of "viewer ID," "instructed motion" and "instruction ID" is recorded. Thus, the response motion recording part 25 is able to perform a search through the "response motion history" according to the search condition that the "viewer ID" and "instructed motion" are the same and the "instruction ID" is different to search and extract other detection results ("response motion" included in the "motion response information 102") (primary information) made by the same viewer based on an instruction to make the same motion.

The response motion comparing part 26 shown in FIG. 1 is configured to compare the detection result (information of "response motion" included in the "motion response information 102" (refer to FIG. 4)) detected last by the motion sensor 23 and the other detection results (information of "response motion" included in the "motion response information 102") searched and extracted by the response motion recording part 25. The response motion comparing part 26 is able to recognize quantitatively the "differences between the detection results" detected by the motion sensor 23 (secondary information) by comparing a plurality of pieces of "response motion" included in the "motion response information 102" each other.

The response motion comparing part 26 shown in FIG. 1 is configured to compare pieces of "motion response information 102" (refer to FIG. 4) on a one-to-one basis. Also, the response motion comparing part 26 is configured to be able to calculate, for example, the average value or median value of "response motions" included in a multiplicity of pieces of "motion response information 102" by a statistical method. Also, the response motion comparing part 26 is configured to be able to compare the average value of the "response motions" included in a multiplicity of pieces of "motion response information 102" calculated by a statistical method to a "response motion" included in one piece of "motion response information 102." Alternatively, the response motion comparing part 26 may be configured to be able to compare another statistical value, such as the median value of "response motions" included in a multiplicity of pieces of "motion response information 102," to one "response motion" included in one piece of "motion response information 102." In this embodiment, the response motion comparing part 26 is configured to quantitatively compare the detection result detected last by the motion sensor 23 ("response motion" included in the "motion response information 102") and the average value of all the other detection results of motion ("response motion" included in the "motion response information 102") made by the same viewer based on the same motion instruction, which are searched and extracted by the response motion recording part 25, and output a "difference in response motion" (secondary information).

It is advantageous to use the average value (or a statistical value) of all the detection results ("response motion" included in the "motion response information 102") except the detection result detected last as the other detection result to be compared to the detection result ("response motion" included in the "motion response information 102" (refer to FIG. 4)) detected last. In this case, even if an abnormal motion is included in the detection results, for example, the target of comparison as a reference does not vary significantly and a stable comparison can be made. Alternatively, one typical detection result ("response motion" included in the "motion response information 102") among the detection results in the past may be used as the target of comparison as a reference. For example, the first detection result ("response motion" included in the "motion response information 102") may be used as the target of comparison as a reference. In this way, it is possible to authenticate whether or not the viewer at the start of viewing is the same as the current viewer. In addition, the average value of several, such as three or five, detection results may be used as the target of comparison as a reference. In this way, it is possible to authenticate whether or not the viewer at the start of viewing is the same as the current viewer using a stable value obtained by averaging the detection results as the target of comparison as a reference even if an abnormal motion is included in the several motions.

Also, the viewer authenticating part 27 shown in FIG. 1 is an authentication device for evaluating the "differences between response motions" quantitatively recognized by the response motion comparing part 26 (secondary information) in the light of predetermined criteria ("authentication criteria" (refer to FIG. 3)) decided by the viewing authenticating principal. The viewer authenticating part 27 authenticates the viewer who made the response motion relating to the detection result detected last by the motion sensor 23 as the correct viewer to whom the audio-visual program provider is supposed to provide the audio-visual program when the difference (secondary information) between the detection result detected last by the motion sensor 23 (information of "response motion" included in the "motion response information 102" (refer to FIG. 4)) (primary information) and the average value of the other detection results searched and extracted by the response motion recording part 25 (information of "response motion" included in the "motion response information 102") (primary information) is within a reference range decided by the viewing authenticating principal (for example, within reference range of "the difference of acceleration is 1.2G or lower at a maximum" when the "authentication criteria" requiring "the difference of acceleration to be 1.2G or lower at a maximum in order for the viewer to be determined to the correct viewer"). When the viewer made a response motion last is authenticated to be the correct viewer, the viewer authenticating part 27 outputs a "viewer authentication (audio-visual terminal) 106a" (refer to FIG. 5) (tertiary information). The output "viewer authentication (audio-visual terminal) 106a" (tertiary information) is sent to the viewing authentication system 40 of the viewing authenticating principal (refer to FIG. 8) by the sending part 29.

A "response motion" made by the viewer and used to authenticate the viewer as the correct viewer by the viewer authenticating part 27 shown in FIG. 1 is redundant information including information of involuntary motions of the viewer. Thus, it is considered that the "response motion" made by the viewer is a "response motion" which can be reproduced only by the correct viewer and the information of the "response motion" is information suitable as authentication key information used to identify the correct viewer. When the audio-visual terminal 20 and the viewing authentication system 40 (refer to FIG. 8) in this embodiment are used, the audio-visual program viewer can instantaneously create redundant information of a "response motion" made by the (correct) viewer with the motion sensor 23 and send it to the viewing authentication system 40 of the viewing authenticating principal (refer to FIG. 8) without being distracted from viewing the audio-visual program. Also, when the viewing authentication system 40 is used, the viewing authenticating principal can strictly authenticate the viewer viewing the audio-visual program as the correct viewer. The viewer authenticating part 27 may perform the viewer authentication on every motion requested to the viewer by properly deciding the motion requested to the viewer. In this case, the authentication may be performed by tallying (analyzing) the authentication results (tertiary information) by a statistical method using the coding part 24 based on "authentication criteria" decided by the viewing authenticating principal so that an appropriate motion by which the viewer can be identified.

Also, when the audio-visual terminal 20 shown in FIG. 1 includes the response motion recording part 25, the response motion comparing part 26, the viewer authenticating part 27 and the response motion history database 31 shown in this embodiment, the viewing authentication system 40 (refer to FIG. 8) may not include an information processing device or authentication device having the same functions. However, the viewing authentication system 40 may include an information processing device or authentication device having the same functions and may be configured to perform information processing or authentication operation independently to check the information processing or authentication operation by the audio-visual terminal 20.

The sending part 29 in this embodiment shown in FIG. 1 is configured to be able to determine the communication speed of the public wireless LAN (not shown) to which the audio-visual terminal 20 is connected by a communication trial. When the sending part 29 determines that the audio-visual terminal 20 is in a communication environment in which the audio-visual terminal 20 can perform information communication at high speed, the sending part 29 does not have to take the total amount of information communication between the audio-visual terminal 20 and the viewing authentication system 40 (refer to FIG. 8) into account. Thus, the sending part 29 can perform high-speed, large-capacity bidirectional (interactive) information communication to send the "motion response information 102" (refer to FIG. 4) and so on to the viewing authentication system 40 even when the viewer is viewing an audio-visual program through streaming (streaming distribution).

On the other hand, the sending part 29 may be configured to function as follows when the sending part 29 shown in FIG. 1 determines that the audio-visual terminal 20 is in a communication environment in which the audio-visual terminal 20 cannot perform high-speed, large-capacity bidirectional (interactive) information communication via the public wireless LAN (not shown) to which it is connected. First, the sending part 29 avoids information communication with the viewing authentication system 40 (refer to FIG. 8) while the viewer is viewing an audio-visual program (via a broadcast or reproducible recording medium). The sending part 29 is also configured to send all the information such as the "motion response information 102" (refer to FIG. 4) stored in the recording part 32 of the audio-visual terminal 20 at a time to the viewing authentication system 40 when connection to a communication environment in which the audio-visual terminal 20 operated by the viewer can perform high-speed information communication is established after the viewer has viewed the audio-visual program and the sending part 29 determines that the information communication speed is sufficiently high. In this way, even if the audio-visual terminal 20 is in a communication environment which does not allow high-speed, large-capacity bidirectional (interactive) information communication via the public wireless LAN (not shown) to which the audio-visual terminal 20 is connected, the audio-visual terminal 20 (and the viewing authentication system 40) makes (make) it possible that the viewing authenticating principal can authenticate that the viewer has viewed an audio-visual program.

Here, a predetermined motion that the viewing authenticating principal instructs the viewer to make is described. To detect a response motion of the viewer suitably with the motion sensor 23 shown in FIG. 1, the predetermined motion requested and instructed by the audio-visual program provider is desirably an appropriate motion. In this embodiment, the predetermined motion is provided as a motion decided and instructed independently by the audio-visual program provider. However, as long as an appropriate motion is instructed, a motion decided and instructed to the viewer by a viewing authenticating principal authorized by the program provider may be used. Also, when the predetermined motion is properly selected, the predetermined motion may be decided by the correct viewer. In this case, the audio-visual program viewer (correct viewer) first selects and decides an appropriate motion by him- or herself. For example, the correct viewer actually make the motion and transmit the motion to the viewing authentication system 40 of the viewing authenticating principal (refer to FIG. 8) via the audio-visual terminal 20. When the viewing authenticating principal determines the motion selected and decided by the correct viewer as an appropriate motion, the motion selected and decided by the correct viewer may be registered in the viewing authentication system 40.

For example, first, the audio-visual program provider (viewing authenticating principal) instructs the viewer to make a motion while providing the audio-visual program. In this embodiment, the audio-visual program provider does not instruct a specific motion, such as "Please shake from side to side" but instruct the viewer to make some sort of "motion." In this case, the "predetermined motion" is the motion the correct viewer has transmitted in advance to the viewing authenticating principal. The viewing authenticating principal compares the motion made and sent by the correct viewer according to the motion instruction and the motion registered in advance for authentication purpose. With this configuration, the correct viewer can be reliably identified because the "predetermined motion" is a motion decided by the correct viewer. Also, the registered motion includes a specific "habit" of the correct viewer who decided the motion and therefore is highly effective in preventing "impersonation." Here, the audio-visual program provider that provides the audio-visual program may be same as the viewing authenticating principal.

Also, the predetermined motion may not be decided in advance and may be a motion extracted and decided at random by the viewing authenticating principal using an automatic decision program involving a table of random digits from a plurality of motions selected in advance by the audio-visual program provider. Because the information about the predetermined motion is used as authentication key information necessary for the viewing authenticating principal to authenticate that the audio-visual program viewer has viewed an audio-visual program, the predetermined motion can be unlimitedly redundant.

In the viewing authentication by the viewing authenticating principal, the viewing authenticating principal receives the "motion response information 102" (refer to FIG. 4) sent back from the audio-visual program viewer (viewer of the audio-visual program) with the viewing authentication system (refer to FIG. 8), and refers to the information of "response motion" included in the "motion response information 102." Desirably, the predetermined motion is designated so that only the response motion that the viewer voluntarily made can be clearly distinguished from noise signals and extracted from the information of "response motion" when the viewing authenticating principal refers to the information of "response motion." The information of detection signals indicating the response motion of the viewer detected by the motion sensor 23 shown in FIG. 1 often includes viewer's involuntary noise movements or superposition of noise signals. For example, the viewer may view an audio-visual program while walking in a running shaky train. Thus, it is preferred to decide the characteristics of the motion requested to the viewer, such as path, amplitude, magnitude of acceleration and frequency, so that the viewing authenticating principal can clearly distinguish a response motion of the viewer from noise movements or noise signals.

To distinguish a response motion from noise signals clearly, the use of a combination of detections in the right-left direction and yawing direction, or detections in the up-down direction and pitching direction among the detections in each of degrees of freedom (channels) detected by the three-axis six-degree-of-freedom acceleration sensor (not shown) of the motion sensor 23 shown in FIG. 1 is especially preferred. These correspond to motions of "Please shake from side to side" and "Please shake up and down" respectively, and a response motion of the viewer is a compound motion around the wrist or elbow of the viewer, who translates and rotates the audio-visual terminal 20 held by the viewer with one hand. Such a motion can be easily distinguished from the movement of a running shaky train. In that sense, a movement of rolling the audio-visual terminal 20 may be requested but the two combinations described above are better because a movement of rolling the audio-visual terminal 20 makes it difficult to see the screen of the audio-visual terminal 20.

When a response motion of the viewer is detected by a camera (not shown) of the motion sensor 23 (refer to FIG. 1) to obtain a detection result (primary information), it is preferred to decide the magnitude and speed of the motion to be instructed to the viewer in view of the optical characteristics of the camera (not shown), such as focal length, exposure, depth of field and frame rate, so that the response motion of the viewer can be captured, in the light of capturing conditions, as a clear video image with correct exposure and without blur which can undergo image processing later.

Figure 5:
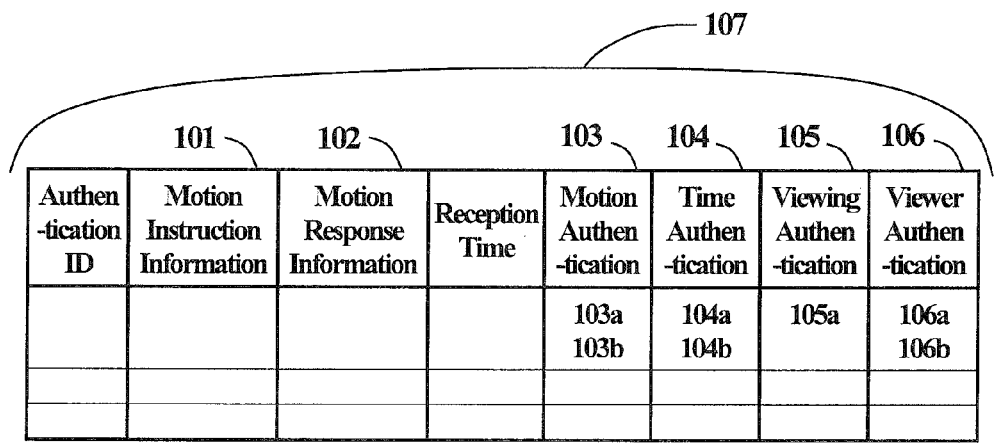
FIG. 5 is an explanatory view illustrating information included in authentication record according to the first embodiment of the present invention.

Referring now to FIG. 5, the information that is sent from the audio-visual terminal 20 (refer to FIG. 1) to the viewing authentication system 40 (refer to FIG. 8) is described. The information sent by the sending part 29 (refer to FIG. 1) of the audio-visual terminal 20 to the viewing authentication system 40 is recorded as an "authentication record 107" by the authentication recording part 53 (refer to FIG. 8) of the viewing authentication system 40. In the "authentication record 107," the information of "motion instruction information 101," "motion response information 102," "reception time," "motion authentication 103," "time authentication 104," "viewing authentication 105," and "viewer authentication 106" is recorded.

As for the information of "authentication ID" included in the "authentication record 107" shown in FIG. 5, an "authentication ID" is attached to each piece of "motion response information 102" (refer to FIG. 4) sent back from the audio-visual terminal 20 operated by the viewer (refer to FIG. 1) prior to authentication recording. Because the viewing authenticating principal make an authenticity judgment on each piece of the "motion response information 102" sent back from the viewer, it can be said that the "authentication ID" is provided for each of authenticity judgment made by the viewing authenticating principal. The viewing authenticating principal can authenticate the viewer's viewing of an audio-visual program by a comparative judgment between the motion instruction (the "motion instruction information 101" (refer to FIG. 3)) to the viewer and the response motion of the viewer (the "motion response information 102") collected with respect to each "authentication ID."

In the information of "motion instruction information 101" included in the "authentication record 107" shown in FIG. 5, the viewing authentication system 40 (refer to FIG. 8) is configured to record the "motion instruction information 101" (refer to FIG. 3) included in the "motion response information 102" (refer to FIG. 4) sent back from the audio-visual terminal 20 operated by the viewer (refer to FIG. 1). Based on the information recorded in the "motion instruction information 101," the viewing authenticating principal can recognize the time when the motion instructing part 22 (refer to FIG. 1)

instructed the viewer to make a motion ("instruction time" (refer to FIG. 3) included in the "motion response information 102"), for example.

Also, in the information of "motion response information 102" included in the "authentication record 107" shown in FIG. 5, the viewing authentication system 40 (refer to FIG. 8) is configured to record the "motion response information 102" (refer to FIG. 4) sent back from the audio-visual terminal 20 operated by the viewer (refer to FIG. 1). Based on the information recorded in the "motion response information 102," the viewing authenticating principal can recognize the time when the motion sensor 23 (refer to FIG. 1) detected the response motion of the viewer ("detection time" (refer to FIG. 4) included in the "motion response information 102"), for example. Thus, the viewing authentication system 40 can obtain the "period of time taken by the viewer to respond" as information (secondary information) that can be a useful index value that the viewing authenticating principal can use to make an authenticity judgment from the "instruction time" (refer to FIG. 3) included in the "motion instruction information 101" (refer to FIG. 3) and the "detection time" included in the "motion response information 102."

In the information of "reception time" included in the "authentication record 107" shown in FIG. 5, the time when the "motion response information 102" (refer to FIG. 4) sent back from the audio-visual terminal 20 operated by the viewer (refer to FIG. 1) was received, which is output from the clock 49 (refer to FIG. 8) of the viewing authentication system 40 (refer to FIG. 8), is recorded. Also, in the information of "sending time" (refer to FIG. 3) included in the "motion instruction information 101" (refer to FIG. 4) included in the "motion response information 102," the time when the motion instruction information sending part 43 (refer to FIG. 8) sent the "motion instruction information 101" to the viewer, which is output from the clock 49 of the viewing authentication system 40, is recorded. Thus, the viewing authentication system 40 can obtain the "period of time taken to communicate with the viewer" as information (secondary information) that can be a useful index value that the viewing authenticating principal can use to make an authenticity judgment from the "sending time" included in the "motion instruction information 101" and the "reception time" included in the "authentication record 107."

Also, in the information of "motion authentication 103" included in the "authentication record 107" shown in FIG. 5, the viewing authentication system 40 (refer to FIG. 8) is configured to record the "motion authentication (audio-visual terminal) 103a" (tertiary information) output from the motion authenticating part 24a (refer to FIG. 2) of the coding part 24 (refer to FIG. 1) of the audio-visual terminal 20 and sent back from the audio-visual terminal 20 operated by the viewer (refer to FIG. 1). Thus, the viewing authentication system 40 can recognize the fact that the motion authenticating part 24a of the coding part 24 included in the audio-visual terminal 20 has authenticated the response motion of the viewer.

Also, in the information of "time authentication 104" included in the "authentication record 107" shown in FIG. 5, the viewing authentication system 40 (refer to FIG. 8) is configured to record the "time authentication (audio-visual terminal) 104a" based on "period of time taken by the viewer to respond" (tertiary information) output from the time authenticating part 24c (refer to FIG. 2) of the coding part 24 (refer to FIG. 1) of the audio-visual terminal 20 and sent back from the audio-visual terminal 20 operated by the viewer (refer to FIG. 1). Thus, the viewing authentication system 40 can recognize the fact that the time authenticating part 24c of the coding part 24 included in the audio-visual terminal 20 has authenticated the "period of time taken by the viewer to respond."

Also, in the information of "viewing authentication 105" included in the "authentication record 107" shown in FIG. 5, the viewing authentication system 40 (refer to FIG. 8) is configured to record the "viewing authentication (audio-visual terminal) 105a" based on a "motion response rate" (tertiary information) output from the response authenticating part 24b (refer to FIG. 2) of the coding part 24 (refer to FIG. 1) of the audio-visual terminal 20 and sent back from the audio-visual terminal 20 operated by the viewer (refer to FIG. 1). Thus, the viewing authentication system 40 can recognize the fact that the response authenticating part 24b of the coding part 24 included in the audio-visual terminal 20 has authenticated the "motion response rate."

Also, in the information of "viewer authentication 106" included in the "authentication record 107" shown in FIG. 5, the viewing authentication system 40 (refer to FIG. 8) is configured to record the "viewer authentication (audio-visual terminal) 106a" (tertiary information) output from the viewer authenticating part 27 (refer to FIG. 1) of the audio-visual terminal 20 and sent back from the audio-visual terminal 20 operated by the viewer (refer to FIG. 1). Thus, the viewing authentication system 40 can recognize the fact that the viewer authenticating part 27 included in the audio-visual terminal 20 has authenticated the correct viewer. However, the "authentication record 107" may consist of other types of information than those shown in FIG. 5.

Figure 6A:
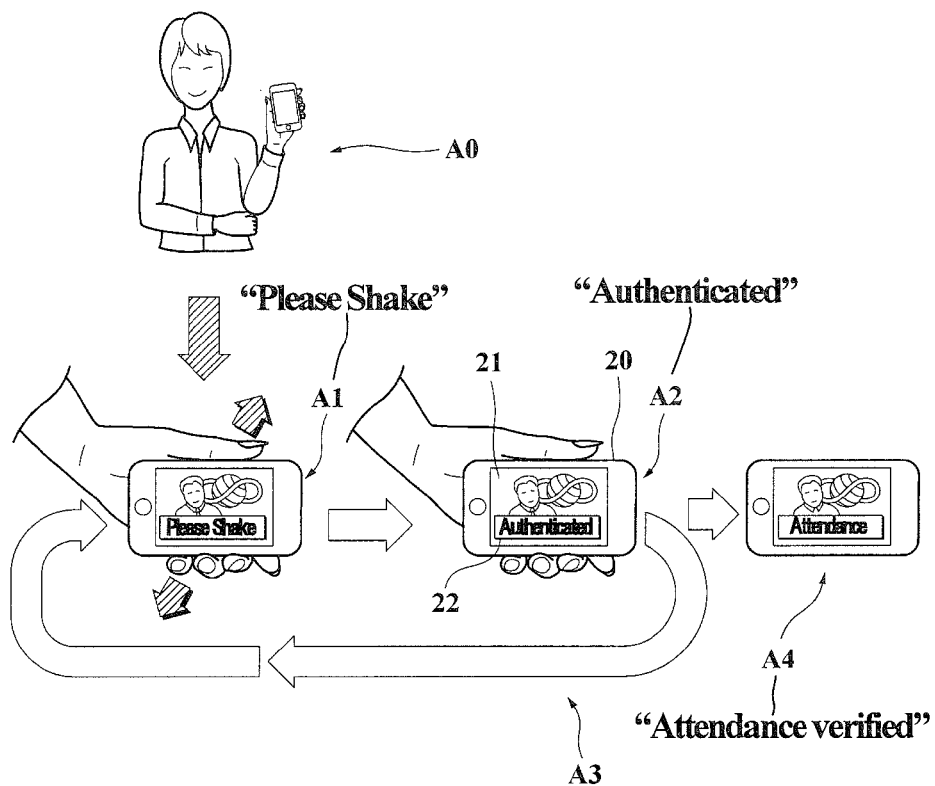
FIGS. 6A-6C are explanatory views illustrating a response motion of the viewer operating the audio-visual terminal according to the first embodiment of the present invention.
Figure 6B:
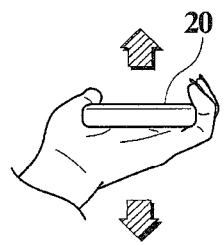
Figure 6C:
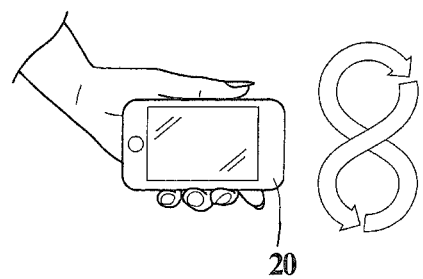

Referring now to FIGS. 6A-6C, an example of the response motion of a viewer who operates the audio-visual terminal according to the first embodiment of the present invention, such as a cellular phone in which every elements shown in FIG. 1 are incorporated, is described. FIG. 6A shows an outline of the effect of a response motion of a viewer (A0). In FIG. 6A, the motion instructing part 22 of the audio-visual terminal 20 is provided in a strip-like configuration at a lower part of the liquid crystal display screen of the reproducing part 21. The viewer (A0) learns by watching the screen of the audio-visual terminal 20. When an authentication point in the audio-visual program is reached, the viewer (A0) shakes the audio-visual terminal 20 according to a motion instruction. In this example, a motion instruction "Please shake" is displayed in the strip-like motion instructing part 22 (A1). When the viewer (A0) shakes the audio-visual terminal 20 according to the motion instruction, the response motion of the viewer (A0) is detected by the motion sensor 23 (refer to FIG. 1) of the audio-visual terminal 20. Then, a motion authenticating part 24a (refer to FIG. 2) of the coding part 24 (refer to FIG. 1) authenticates the response motion of the viewer (A0). When the response motion of the viewer (A0) is authenticated by the coding part 24, a message "Authenticated" is displayed as illustrated on the liquid crystal display screen of the reproducing part 21 of the audio-visual terminal 20 (A2). When the audio-visual program includes another authentication point, the audio-visual terminal 20 returns to the initial state (A3). Then, the next authentication point is reached, a motion instruction "Please shake" is displayed (A1). When the response authenticating part 24b (refer to FIG. 2) of the coding part 24 performs viewing authentication based on a "motion response rate," a message "Attendance verified" is displayed as illustrated on the liquid crystal display screen (A4) when the viewer (A0) is authenticated as having viewed (attended) the audio-visual program (remote education program).

As described previously, the predetermined motion must be decided such that the viewing authenticating principal can clearly distinguish a response motion of the viewer. As long as this condition is satisfied, the predetermined motion may be a motion of simply shaking the audio-visual terminal 20, which the viewer holds and operates with one hand, as shown in FIG. 6A, for example. For example, the motion may be "a motion of shaking at an acceleration of 3 G (three times the gravitational acceleration on the earth) or greater" once in the up-down direction or right-left direction of the liquid crystal display screen in a plane parallel to the liquid crystal display screen of the reproducing part 21 of the audio-visual terminal 20 which is reproducing and displaying the video image of the audio-visual program. Alternatively, the motion may be a series of motions in which a plurality of such motions are combined chronologically. Alternatively, when a motion of gently shaking the audio-visual terminal 20 parallel to the line of sight of the viewer as shown in FIG. 6B is instructed, a favorable motion which does not significantly distract the viewer from view the audio-visual program can be instructed.

In this embodiment, an opportunity in which a complex motion is requested to the viewer is provided approximately three times in a 90-minute audio-visual program to check whether the audio-visual program viewer is the correct viewer. At this time, a motion of drawing a predetermined character string in a three-dimensional space with the audio-visual terminal 20 as shown in FIG. 6C is requested by the viewing authenticating principal. For example, a motion of drawing a letter "B" is requested. Alternatively, a motion of drawing a symbol (such as the symbol shown in FIG. 6C: infinity) or a plurality of figures (such as circles, triangles or squares) may be requested. In this case, even if the predetermined motion instruction is an instruction requesting the same motion, different viewers make different response motions in response to the same motion instruction. In other words, the viewer's habit tends to appear and the viewer can be identified easily. When the response motion is a motion involving a characteristic unique to each viewer, the viewing authenticating principal can catch the characteristic of the motion included in the response motion with the motion sensor 23 (refer to FIG. 1).

Therefore, the viewer authenticating part 27 (refer to FIG. 1) of the audio-visual terminal 20 shown in FIG. 6C or a viewer authenticating part 48 (refer to FIG. 8), which is described in detail later, of the viewing authentication system 40 (refer to FIG. 8) is configured to detect a response motion of the viewer with the motion sensor 23 (refer to FIG. 1) and record (register) the response motion of the viewer in the response motion recording part 25 (refer to FIG. 1) or a response motion recording part 46 (refer to FIG. 8) of the viewing authentication system 40 so that it can perform viewer authentication to identify the correct viewer based on a response motion the viewer will make later. Thus, it is possible to authenticate that the viewer who made the response motion is the correct viewer to whom the audio-visual program provider is supposed to provide the audio-visual program.

Figure 7:
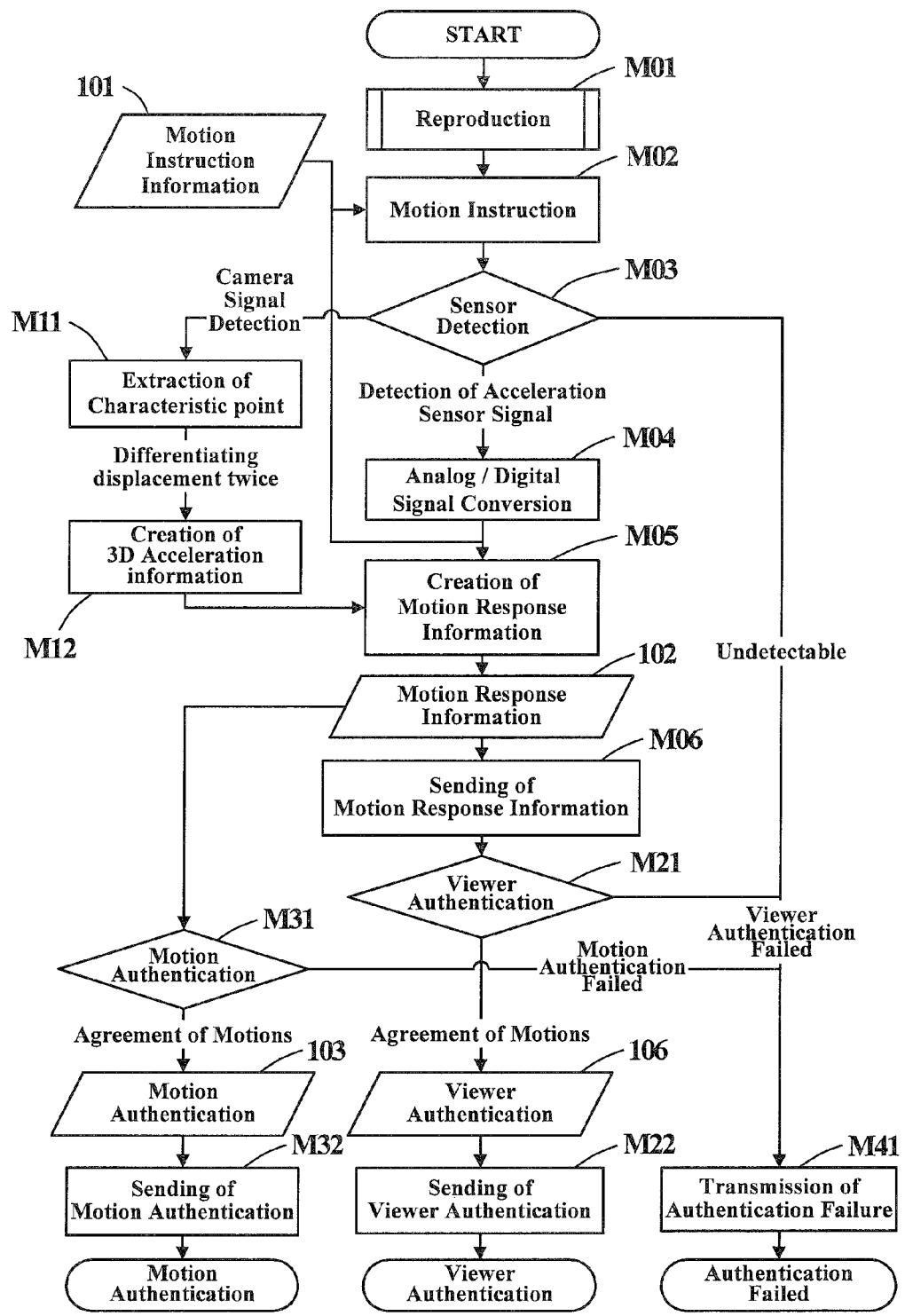
FIG. 7 is a flowchart illustrating an example of execution steps of a control program for controlling the audio-visual terminal according to the first embodiment of the present invention.

Referring now to FIG. 7, a control program for controlling the audio-visual terminal 20 (refer to FIG. 1) is described. The microprocessor (Micro Processing Unit) 30 (refer to FIG. 1) of the audio-visual terminal 20 is configured to execute steps according to the control program for controlling the audio-visual terminal 20 in the order shown in a flowchart shown in FIG. 7 illustrating an execution procedure of the program for controlling the audio-visual terminal 20. Because the details of the functions of the reproducing part 21, the motion instructing part 22, the motion sensor 23, the coding part 24, the response motion recording part 25, the response motion comparing part 26, the viewer authenticating part 27, the clock 28, the sending part 29, the response motion history database 31 and the recording part 32 (refer to FIG. 1) have been already described, redundant description is omitted.

The control program shown in FIG. 7 reproduces an audio-visual program, using the reproducing part 21 (refer to FIG. 1), first (step M01). Then, the control program instructs a motion to the viewer based on "motion instruction information 101" (refer to FIG. 3) unique to the audio-visual program with which a program provider that provides the audio-visual program requests the viewer to make a predetermined motion at times unique to the audio-visual program, using the motion instructing part 22 (refer to FIG. 1) (step M02). Next, the control program checks a detection of a response motion of the viewer (change in input voltage value) by the three-axis six-degree-of-freedom acceleration sensor (not shown) of the motion sensor 23 (refer to FIG. 1), using the coding part 24 (refer to FIG. 1). At this time, when a detection (change in input voltage) is confirmed, the control program acquires an appropriate detection result (primary information) from the detection of the response motion of the viewer by the three-axis six-degree-of-freedom acceleration sensor of the motion sensor 23 according to the information of "authentication criteria" included in the "motion instruction information 101," using the coding part 24 (step M03). In addition, the control program creates "motion response information 102" (refer to FIG. 4) from the acquired detection result (primary information) based on the information of "authentication criteria" included in the "motion instruction information 101" by, for example, an analog/digital signal conversion (differential and integral calculus by a numerical analysis when necessary), using the coding part 24 (step M04, step M05). Finally, the control program sends the "motion response information 102" to the viewing authentication system 40 of the viewing authenticating principal (refer to FIG. 8), using the sending part 29 (refer to FIG. 1) (step M06).

The execution control operation in the audio-visual terminal 20 (refer to FIG. 1) shown in FIG. 7 is configured to include supplementary control steps in addition to the primary execution steps described above. This control program is configured to execute a supplementary step of coding (digitizing) the response motion of the viewer by performing an image analysis on a video image captured by a camera (not shown) of the motion sensor 23 of the audio-visual terminal 20 in addition to the coding (digitizing) of the response motion of the viewer using the three-axis six-degree-of-freedom acceleration sensor (not shown) of the motion sensor 23 (refer to FIG. 1) of the audio-visual terminal 20. In this case, the control program determines whether or not there is a detection of a video image captured by the camera of the motion sensor 23, using the coding part 24 (refer to FIG. 1) (step M03), first. Then, the control program continuously extracts characteristic points for use in detecting the response motion of the viewer decided in the video image (detection) captured by the camera (while the positions of both eyes of the viewer are used as the characteristic points in this case, another characteristic point may be extracted if the characteristic point which is distinct from the viewpoint of image processing) from each of a series of images that make up the video image, using the coding part 24 to acquire a detection result (primary information) (step M11).

Next, the control program creates information (three-dimensional acceleration information) of the response motion of the viewer (movement of the audio-visual terminal 20) acquired chronologically by performing a numerical analysis to differentiate the information of displacement of the detected characteristic points (positions of both eyes of the viewer) twice with respect to time, using the coding part 24

(refer to FIG. 1) based on the detection result (primary information) (step M12). Then, the control program creates "motion response information 102" (refer to FIG. 4) from the information (three-dimensional acceleration information) of the response motion of the viewer (movement of the audio-visual terminal 20) acquired chronologically (step M05).

With the control program shown in FIG. 7, both the information (information of acceleration) of the response motion of the viewer obtained by the three-axis six-degree-of-freedom acceleration sensor (not shown) of the motion sensor 23 (refer to FIG. 1) and the information (information of acceleration) of the response motion of the viewer obtained by the auxiliary camera (not shown) of the motion sensor 23 can be obtained as information of "response motion" included in the "motion response information 102" (refer to FIG. 4). Thus, by comparing the two pieces of information (information of acceleration) of the response motion of the viewer obtained by the three-axis six-degree-of-freedom acceleration sensor and the camera to each other, the accuracy of the detections of the response motion of the viewer by the motion sensor 23 can be mutually verified. Alternatively, the average value of the information of acceleration based on the detection result (primary information) from the three-axis six-degree-of-freedom acceleration sensor and the information of acceleration based on the detection result (primary information) from the camera may be decided as the information (information of acceleration) of the response motion of the viewer. Alternatively, either one of the detection results (primary information) (information of acceleration) may be corrected with the other detection result (primary information) (information of acceleration).

A case has been described where a numerical analysis is performed to differentiate the information (detection result) (primary information) of displacement of characteristic points detected by a camera (not shown) of the motion sensor 23 (refer to FIG. 1) of the audio-visual terminal 20 (refer to FIG. 1) twice with respect to time to obtain information (three-dimensional acceleration information) of the response motion of the viewer in the control program shown in FIG. 7. Contrary to this, a numerical analysis may be performed to integrate the detection result (three-dimensional acceleration information) (primary information) detected by the three-axis six-degree-of-freedom acceleration sensor twice with respect to time without performing a numerical analysis on the information (detection result) (primary information) of displacement of characteristic points detected by the camera to leave it to be information in the dimension of displacement so that the detection result detected by the three-axis six-degree-of-freedom acceleration sensor can be compared, as information in the dimension of displacement, to the detection result (primary information) detected by the camera.

Also, in the control program shown in FIG. 7, the audio-visual terminal 20 (refer to FIG. 1) is configured to authenticate that the viewer is the correct viewer to whom the audio-visual program provider is supposed to provide the audio-visual program using the response motion recording part 25, the response motion comparing part 26, the viewer authenticating part 27 and the response motion history database 31 (refer to FIG. 1) based on the "motion response information 102" (refer to FIG. 4) (step M21). Also, when a "viewer authentication (audio-visual terminal) 106a" (refer to FIG. 5) (tertiary information) is output from the viewer authenticating part 27, the control program sends the "viewer authentication (audio-visual terminal) 106a" (tertiary information) to the viewing authentication system 40 of the viewing authenticating principal (refer to FIG. 8), using the sending part 29 (refer to FIG. 1) (step M22).

Also, in the control program shown in FIG. 7, the audio-visual terminal 20 (refer to FIG. 1) is configured to authenticate that the detection result (primary information) of the response motion of the viewer detected by the motion sensor 23 (refer to FIG. 1) and the motion instructed to the viewer by the motion instructing part 22 (refer to FIG. 1) agree with each other, using the motion authenticating part 24a (refer to FIG. 2) of the coding part 24 (refer to FIG. 1) (step M31). Also, when a "motion authentication (audio-visual terminal) 103a" (refer to FIG. 5) (tertiary information) is output from the motion authenticating part 24a of the coding part 24, the control program sends the "motion authentication (audio-visual terminal) 103a" (tertiary information) to the viewing authentication system 40 of the viewing authenticating principal (refer to FIG. 8), using the sending part 29 (refer to FIG. 1) (step M32). Because the authentications using the response authenticating part 24b (refer to FIG. 2) and the time authenticating part 24c (refer to FIG. 2) of the coding part 24 are similar to the authentication operation in the motion authenticating part 24a, their illustration and description is omitted.

Also, in the control program shown in FIG. 7, when the acquisition of a detection result (primary information) using the coding part 24 (refer to FIG. 1) (step M03), the viewer authentication using the viewer authenticating part 27 (refer to FIG. 1) (step M21), or motion authentication using the motion authenticating part 24a (refer to FIG. 2) of the coding part 24 (step M31) was unsuccessful, the coding part 24 is configured to further create information (tertiary information) indicating that the authentication was unsuccessful and send it to the viewing authentication system 40 of the viewing authenticating principal (refer to FIG. 8) (step M41). The program described above may further include various supplementary steps.

Second Embodiment

Description is next made of an example of configuration of the viewing authentication system 40 according to a second embodiment of the present invention with reference to FIG. 8. The viewing authentication system 40 includes a program sending part 41, a motion instruction information creating part 42, a motion instruction information sending part 43, a receiving part 44, a received information processing part 45, a response motion recording part 46, a response motion comparing part 47, a viewer authenticating part 48, a clock 49, a program database 51, a response motion history database 52, and an authentication recording part 53. The viewing authentication system 40 also includes a central processing unit (CPU) 50 as a control device for controlling the viewing authentication system 40. Each of the motion instruction information sending part 43, the receiving part 44, the received information processing part 45 and the clock 49 is provided with a random access memory (RAM) 54 for assisting its function. The details of the function of each device of the viewing authentication system 40 are described in sequence below.

The viewing authentication system 40 in this embodiment shown in FIG. 8 is a dedicated server of the viewing authenticating principal connected to a WAN. The program sending part 41 of the viewing authentication system 40 is what is called a streaming server which sends an audio-visual program recorded in the program database 51 to the reproducing part 21 of the audio-visual terminal 20 through the WAN based on a "program sending request 100" (refer to FIG. 10) sent from the reproducing part 21 (refer to FIG. 1) of the audio-visual terminal 20 operated by the audio-visual program viewer (refer to FIG. 1). The description of the method of communication between the viewing authentication system 40 and the audio-visual terminal 20 and so on is omitted to avoid redundant description.

The viewing authentication system 40 shown in FIG. 8 also has a function as a web page server which offers a dedicated "information service web page" (not shown) to an unspecified number of visitors through the WAN (not shown) by HTTP communication. The dedicated "information service web page" offered by the viewing authentication system 40 can provide the viewers (learners) who view (take) the audio-visual programs (remote education programs) with information useful to take (view) the audio-visual programs as remote education programs (information about the outline of the remote education programs, books for reference, and so on). The dedicated "information service web page" offered by the viewing authentication system 40 is created using HTML language. Thus, each of the learners (viewers) taking the remote education programs (audio-visual programs) can obtain information about remote education programs (audio-visual programs) which he or she can take (view) by operating a web browser (not shown) of the audio-visual terminal 20 (refer to FIG. 1) operated by the learner (viewer) to visit the dedicated "information service web page" offered by the viewing authentication system 40. Also, each of the learners (viewers) taking the remote education programs (audio-visual programs) can select remote education programs (audio-visual programs) which he or she should take and send a "program sending request 100" (refer to FIG. 10) to the viewing authentication system 40 via the dedicated "information service web page." The dedicated "information service web page" may be created using another markup language such as XML language (Extensible Markup Language).

When a "program sending request 100" (refer to FIG. 10) is sent from a learner (viewer), the viewing authentication system 40 shown in FIG. 8 authenticates whether or not the learner (viewer) who sent the "program sending request 100" is the correct learner (viewer) to whom the program provider of the remote education program (audio-visual program) is supposed to provide the remote education program (audio-visual program) in a simple manner. The viewing authentication system 40 presents a dedicated "information service web page" (simple viewer authentication page) to authenticate the learner (viewer) in a simple manner and requests the learner (viewer) who sent the "program sending request 100" to input both a "viewer ID" (refer to FIG. 3) and a "password" unique to the "viewer ID" (simple viewer authentication information) (not shown) into appropriate entry fields in the dedicated "information service web page" (simple viewer authentication page).

The "viewer ID" (refer to FIG. 3) and the "password" unique to the "viewer ID" (simple viewer authentication information) (not shown) have been previously issued to the correct learner (viewer) to whom the program provider of the remote education program (audio-visual programs) is supposed to provide the remote education program (audio-visual program) by the viewing authenticating principal. The "viewer ID" and the "password" (simple viewer authentication information) unique to the "viewer ID" are both made up of text string information consisting of twenty alphabets and numbers. The form of information of the "viewer ID" and the "password" is not limited to a text string consisting of twenty alphabets and numbers and may be decided as appropriate.

The program sending part 41 shown in FIG. 8 is configured to send a remote education program (audio-visual program) provided by the program provider only when the learner (viewer) correctly inputs the information of both the "viewer ID" (refer to FIG. 3) and the "password" unique to the "viewer ID" (simple viewer authentication information) (not shown) in appropriate entry fields in the dedicated "information service web page" offered by the viewing authentication system 40 via the audio-visual terminal 20 operated by the learner (viewer) (refer to FIG. 1).

Also, for example, the motion instruction information creating part 42 shown in FIG. 8 creates "motion instruction information 101" (refer to FIG. 3) unique to each audio-visual program and consisting of information with which the audio-visual program provider that provides the audio-visual program requests the viewer to make a predetermined motion at times unique to the audio-visual program. The motion instruction information creating part 42 is configured to create the "motion instruction information 101" at times unique to the audio-visual program with reference to the information indicating the times unique to the audio-visual program decided by the audio-visual program provider and recorded in the program database 51 connected to the motion instruction information creating part 42. Specifically, the motion instruction information creating part 42 creates the "motion instruction information 101" because trigger information commanding the motion instruction information creating part 42 to create "motion instruction information 101" at times (program running times) decided by the program provider is included in the information of each audio-visual program recorded in the program database 51 and provided by the program provider. Alternatively, a statistical method or a random decision method using random numbers may be used to decide when the motion instruction information creating part 42 creates the "motion instruction information 101" for the purpose of directing the viewer's attention to the audio-visual program.

The motion instruction information creating part 42 shown in FIG. 8 is configured to attach information of a "program ID" unique to each audio-visual program to each piece of the "motion instruction information 101" (refer to FIG. 3). Also, the motion instruction information creating part 42 is configured to attach information of a unique "instruction ID" to each piece of the "motion instruction information 101." The information of "instruction ID" is an identification number consisting of an ascending serial number starting from 1 which is assigned to each piece of the "motion instruction information 101." Also, the information of "instruction ID" includes information of the total number of pieces "motion instruction information 101" provided in one audio-visual program. The information of "instruction ID" is given as "1/20," for example, as described previously. Also, the motion instruction information creating part 42 is configured to attach the information of "viewer ID" unique to the correct viewer to each piece of "motion instruction information 101." The fact that the viewer is the correct viewer to whom the information of "viewer ID" can be assigned has been confirmed using a password (not shown) input in the dedicated "information service web page" (simple viewer authentication page) of the viewing authentication system 40 as described previously. The "motion instruction information 101" is created with the information of "sending time" and the information of the "instruction time" being blank because the times when the motion instruction information sending part 43 and the motion instructing part 22 (refer to FIG. 1) of the audio-visual terminal 20 (refer to FIG. 1) performed their respective operation are recorded therein later as described previously.

Also, the motion instruction information creating part 42 shown in FIG. 8 is configured to create a quantitative instruction about a motion that the viewer should make based on the "authentication criteria" decided by the viewing authenticating principal (for example, "a motion of shaking the audio-visual terminal 20 up and down once at an acceleration of 3 G or higher in a three-dimensional space in an orthogonal coordinate system") based on a qualitative motion instruction about a predetermined motion decided by the program provider and recorded in the program database 51 (for example, "to instruct the viewer to make a motion of shaking the audio-visual terminal 20 up and down only once relative to the display screen of the audio-visual terminal 20 operated by the viewer (refer to FIG. 1) for displaying an audio-visual program"). At this time, the "authentication criteria" decided by the viewing authenticating principal are decided so that the response motion of the viewer can be obtained as a detection result (primary information) without being interfered with by noise movements or noise signals. Also, the information of the motion instruction created quantitatively by the motion instruction information creating part 42 is recorded in the information of "instructed motion" included in the "motion instruction information 101" (refer to FIG. 3) by the motion instruction information creating part 42.

At this time, an animation (not shown) as described previously may be also created as a sample of a specific motion to be presented to the viewer through the motion instructing part 22 (refer to FIG. 1) of the audio-visual terminal 20 (refer to FIG. 1) and recorded in the information of "instructed motion" by the motion instruction information creating part 42 shown in FIG. 8. Alternatively, the quantitative motion instruction and an animation as a sample of the motion may be created by the motion instructing part 22 of the audio-visual terminal 20 discussed previously instead of the motion instruction information creating part 42. Because what is necessary is that these functions are fulfilled by the viewing authentication system 40 and the audio-visual terminal 20 in conjunction with each other, the viewing authentication system 40 and the audio-visual terminal 20 may divide these functions between them as appropriate.

Also, the motion instruction information sending part 43 shown in FIG. 8 is an information communication device for sending the "motion instruction information 101" (refer to FIG. 3) to the audio-visual terminal 20 operated by the viewer (refer to FIG. 1) at times unique to the audio-visual program. Specifically, the motion instruction information sending part 43 is a high-speed wired information communication instrument (router) connected to a WAN. The motion instruction information sending part 43 sends the "motion instruction information 101" created by and delivered from the motion instruction information creating part 42 to the audio-visual terminal 20 operated by the viewer at times unique to the audio-visual program. At this time, the time when the motion instruction information sending part 43 sends the "motion instruction information 101" to the audio-visual terminal 20, which is output from the clock 49 of the viewing authentication system 40, is recorded in the information of "sending time" included in the "motion instruction information 101." In this embodiment, the time when the motion instruction information sending part 43 sent the "motion instruction information 101" to the audio-visual terminal 20, which is output from the clock 49, is recorded by the clock 49 as information of "sending time" included in the "motion instruction information 101." Alternatively, the motion instruction information creating part 42 may record the time when the motion instruction information creating part 42 delivers the "motion instruction information 101" to the motion instruction information sending part 43, which is output from the clock 49, in the information of "sending time" included in the "motion instruction information 101."

Also, the receiving part 44 shown in FIG. 8 is an information communication device for receiving the "information about a response motion of the viewer" that is obtained from a detection result detected by the motion sensor 23 (refer to FIG. 1) and output from the audio-visual terminal 20 (refer to FIG. 1). Here, the "information about a response motion of the viewer" obtained from a detection result detected by the motion sensor 23, which is output from the audio-visual terminal 20 and received by the receiving part 44, is information which the viewer or the audio-visual terminal 20 sends back to the viewing authentication system 40 with the sending part 29 (refer to FIG. 1) of the audio-visual terminal 20 operated by the viewer to transmit the fact that the viewer is normally viewing the audio-visual program. Specifically, the receiving part 44 is, just like the motion instruction information sending part 43, a high-speed wired information communication instrument (router) connected to a WAN.

Also, the received information processing part 45 shown in FIG. 8 is an information processing device for creating "information about a response motion of the viewer" (secondary information and tertiary information) which is obtained from a detection result (primary information) detected by the motion sensor 23 (refer to FIG. 1) of the audio-visual terminal 20 operated by the viewer (refer to FIG. 1) and received by the receiving part 44. The received information processing part 45 is configured to create "information indicated in an index of (numerically indicating) a response motion of the viewer" (secondary information) from the detection result (primary information) received by the receiving part 44 based on the "authentication criteria." Also, the received information processing part 45 is configured to create "information for use in authenticating the viewer's viewing of an audio-visual program" (tertiary information) from the "information indicated in an index of a response motion of the viewer" (secondary information) created based on the "authentication criteria" based on the "authentication criteria."

Also, the authentication recording part 53 shown in FIG. 8 is a database device for collecting and recording information that the viewing authenticating principal uses as a basis to authenticate the viewer's viewing of an audio-visual program as "authentication record 107" (refer to FIG. 5). The authentication recording part 53 is configured to collect and record the "information for use in authenticating that the viewer has viewed an audio-visual program" (primary information, secondary information and tertiary information) output from the viewing authentication system 40 and the audio-visual terminal 20 (refer to FIG. 1) as information included in the "authentication record 107" to authenticate the viewer's viewing of the audio-visual program.

Figure 9:
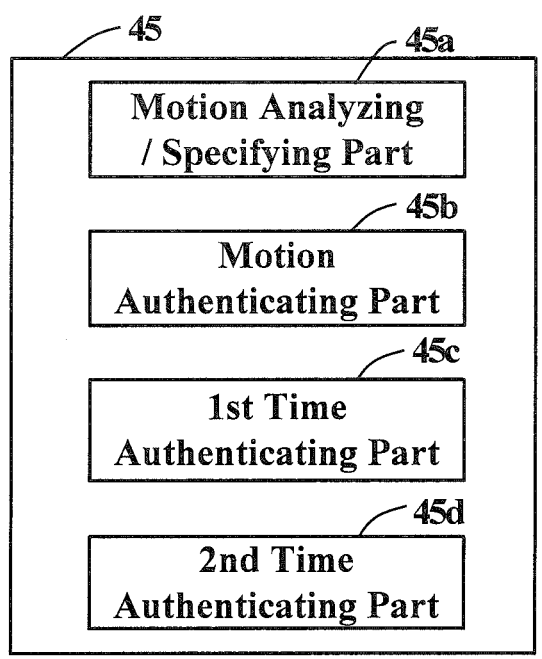
FIG. 9 is a block diagram illustrating an example of the configuration of a received information processing part of the viewing authentication system according to the second embodiment of the present invention.

Referring now to FIG. 9, information processing parts of the received information processing part 45 are described. The received information processing part 45 has a motion analyzing/specifying part 45a as an information processing part of the received information processing part 45. The motion analyzing/specifying part 45a of the received information processing part 45 is configured to analyze the detection result (primary information) detected by the motion sensor 23 (refer to FIG. 1), which is output from the audio-visual terminal 20 operated by the viewer (refer to FIG. 1) and received by the receiving part 44 (refer to FIG. 8), to specify response motion of the viewer (movement of the audio-visual terminal 20 in a three-dimensional space). The motion analyzing/specifying part 45a of the received information processing part 45 is configured to perform a numerical analysis to specify response motion of the viewer (movement of the audio-visual terminal 20 in a three-dimensional space) from the detection result (primary information) in each of dimensions of acceleration, angular acceleration, velocity, angular velocity, displacement (on the three orthogonal coordinate axes) and displacement (about the three orthogonal coordinate axes). That is, the motion analyzing/specifying part 45a of the received information processing part 45 is configured to perform information processing which is similar to the information processing from the analog/digital signal conversion to differential and integral calculus by means of a numerical analysis which the coding part 24 (refer to FIG. 1) of the audio-visual terminal 20 performs to analyze the response motion of the viewer (movement of the audio-visual terminal 20). However, when the information processing is performed by the motion analyzing/specifying part 45a of the received information processing part 45, the coding part 24 of the audio-visual terminal 20 does not have to perform similar information processing.

As described previously, the viewing authentication system 40 (refer to FIG. 8) and the audio-visual terminal 20 (refer to FIG. 1) may be configured to divide functions between them so as to perform the information processing to create the "information about a response motion of the viewer" (primary information, secondary information and tertiary information) that can be obtained from a detection result (primary information) detected by the motion sensor 23 (refer to FIG. 1) from the detection result (primary information) based on the "authentication criteria" decided by the viewing authenticating principal in conjunction with each other. Thus, when either one of the viewing authentication system 40 and the audio-visual terminal 20 has a necessary information processing function, the other does not have to have a similar information processing function. However, the viewing authentication system 40 and the audio-visual terminal 20 may be configured to perform similar information processing for mutual verification of the information processing.

Also, the received information processing part 45 shown in FIG. 9 has a motion authenticating part 45b as an information processing part of the received information processing part 45. The motion authenticating part 45b of the received information processing part 45 is configured to authenticate that the response motion of the viewer obtained from a detection result detected by the motion sensor 23 (refer to FIG. 1) of the audio-visual terminal 20 (refer to FIG. 1) and the motion instructed to the viewer by the "motion instruction information 101" (refer to FIG. 3) and sent by the motion instruction information sending part 42 (refer to FIG. 8) of the viewing authentication system 40 (refer to FIG. 8) agree with each other in the light of predetermined criteria ("authentication criteria"). The motion authenticating part 45b of the received information processing part 45 outputs a "motion authentication (viewing authentication system) 103b" (refer to FIG. 5) (tertiary information) when the response motion of the viewer (primary information) obtained from a detection result detected by the motion sensor 23 (refer to FIG. 1) and the motion instructed to the viewer by the "motion instruction information 101" are authenticated to agree with each other in the light of predetermined criteria (for example, "authentication criteria" requiring "the difference of acceleration to be 1.2 G or lower at a maximum in order for the motions to be determined to agree with each other") decided by the viewing authenticating principal.

The "motion authentication (viewing authentication system) 103b" (refer to FIG. 5) (tertiary information) output from the motion authenticating part 45b of the received information processing part 45 shown in FIG. 9 is collected and recorded as information included in the "authentication record 107" (refer to FIG. 5) by the authentication recording part 53 (refer to FIG. 8). Thus, the viewing authenticating principal can authenticate the viewer's viewing of the audio-visual program based on the "motion authentication (viewing authentication system) 103b" (tertiary information).

It can be said that the motion authentication by the motion authenticating part 45b of the received information processing part 45 shown in FIG. 9 and the motion authentication by the motion authenticating part 24a (refer to FIG. 1) of the coding part 24 (refer to FIG. 1) of the audio-visual terminal 20 (refer to FIG. 1) are similar information processing. Thus, when the received information processing part 45 of the viewing authentication system 40 (refer to FIG. 8) has the motion authenticating part 45b, the motion authenticating part 24a of the coding part 24 of the audio-visual terminal 20 is unnecessary. However, the viewing authentication system 40 and the audio-visual terminal 20 may be configured to perform similar information processing for mutual verification of the information processing.

Also, the received information processing part 45 shown in FIG. 9 is configured to have a first time authenticating part 45c. The viewing authentication system 40 (refer to FIG. 8) is also configured to have the clock 49 (refer to FIG. 8) for outputting the times when the viewing authentication system 40 performs a control operation. The first time authenticating part 45c of the received information processing part 45 of the viewing authentication system 40 is configured to authenticate that the "period of time taken to communicate with the viewer" (secondary information) from the time when the motion instruction information sending part 43 (refer to FIG. 8) sent the "motion instruction information 101" (refer to FIG. 3) ("sending time"), which is output from the clock 49, to the time when the "information about a response motion of the viewer" obtained from the detection result detected by the motion sensor 23 (refer to FIG. 1) of the audio-visual terminal 20 and sent from the audio-visual terminal 20 (refer to FIG. 1) was received by the receiving part 44 (refer to FIG. 8) ("reception time"), which is also output from the clock 49, is within a predetermined time range decided by the viewing authenticating principal (for example, within "five minutes" when the "authentication criteria" requires the "period of time taken to communicate with the viewer" to be within "five minutes" in order to be determined to be appropriate).

The first time authenticating part 45c of the received information processing part 45 shown in FIG. 9 is configured to determine the "period of time taken to communicate with the viewer" (secondary information) to be appropriate and output a "time authentication (viewing authentication system) 104b" based on a "period of time taken to communicate with the viewer" (refer to FIG. 5) (tertiary information) when the first time authenticating part 45c authenticates the "period of time taken to communicate with the viewer" to be appropriate. Also, the authentication recording part 53 (refer to FIG. 8) of the viewing authentication system 40 (refer to FIG. 8) is configured to record the "time authentication (viewing authentication system) 104b" based on a "period of time taken to communicate with the viewer" (tertiary information) output from the first time authenticating part 45c of the received information processing part 45 as information included in the "authentication record 107" (refer to FIG. 5).

Thus, the viewing authenticating principal can authenticate the viewer's viewing of the audio-visual program based on an objective time managed by the viewing authenticating principal using the first time authenticating part 45c of the received information processing part 45 shown in FIG. 9 by maintaining the time which is output from the clock 49 (refer to FIG. 8) of the viewing authentication system 40 of the viewing authenticating principal (refer to FIG. 8) at the right time. When the received information processing part 45 of the viewing authentication system 40 has the first time authenticating part 45c as described above, the coding part 24 (refer to FIG. 1) of the audio-visual terminal 20 does not have to have the time authenticating part 24c (refer to FIG. 2) in the audio-visual terminal 20 (refer to FIG. 1). However, the viewing authentication system 40 and the audio-visual terminal 20 may be configured to perform similar information processing for mutual verification of the information processing.

Also, the received information processing part 45 shown in FIG. 9 has a second time authenticating part 45d. The second time authenticating part 45d is configured to output a "time authentication (viewing authentication system) 104b" based on a "period of time taken by the viewer to respond" (refer to FIG. 5) (tertiary information). The "time authentication (viewing authentication system) 104b" (tertiary information) is an authentication which determines the "period of time taken by the viewer to respond" to be appropriate. The authentication which determines the "period of time taken by the viewer to respond" to be appropriate is created when the "period of time taken by the viewer to respond" (secondary information) is within a predetermined time range (within "three minutes" when the "authentication criteria" require the "period of time taken by the viewer to respond" to be "within three minutes" in order to be determined to be appropriate, for example). Here, the "period of time taken by the viewer to respond" is the period of time from the time when the viewer was instructed to make a motion by the motion instructing part 22 (refer to FIG. 1) ("instruction time"), which is output from the clock 28 (refer to FIG. 1) of the audio-visual terminal 20 operated by the viewer (refer to FIG. 1) and received by the receiving part 44 (refer to FIG. 8) of the viewing authentication system 40 (refer to FIG. 8), to the time when a response motion of the viewer was detected by the motion sensor 23 (refer to FIG. 1) of the audio-visual terminal 20 ("detection time"), which is output from the clock 28 of the audio-visual terminal 20 operated by the viewer and received by the receiving part 44.

In this case, the second time authenticating part 45d of the received information processing part 45 shown in FIG. 9 receives the time when the audio-visual terminal 20 performs a control operation, which is output from the clock 28 (refer to FIG. 1) of the audio-visual terminal 20 (refer to FIG. 1), with the receiving part 44 (refer to FIG. 8) of the viewing authentication system 40 (refer to FIG. 8). The times ("instruction time" and "detection time") are received as "information about a response motion of the viewer" obtained from a detection result (primary information) detected by the motion sensor 23 (refer to FIG. 1) and sent from the sending part 29 (refer to FIG. 1) of the audio-visual terminal 20. Also, the second time authenticating part 45d calculates the "period of time taken by the viewer to respond" (secondary information) based on the times which are output from the clock 28 of the audio-visual terminal 20 and received by the receiving part 44. Also, the second time authenticating part 45d outputs a "time authentication (viewing authentication system) 104b" based on a "period of time taken by the viewer to respond" (refer to FIG. 5) (tertiary information) based on the "authentication criteria."

Because the viewing authentication system 40 (refer to FIG. 8) and the audio-visual terminal 20 (refer to FIG. 1) perform information processing in conjunction with each other as described above, the viewing authenticating principal can provide the viewing authentication system 40 and the audio-visual terminal 20 so as to authenticate the viewer's viewing of the audio-visual program. In this case, the coding part 24 (refer to FIG. 1) of the audio-visual terminal 20 does not have to have the time authenticating part 24c (refer to FIG. 2).

Referring now to FIG. 8, the viewer authenticating performed by the viewing authentication system 40 is described. The response motion recording part 46 of the viewing authentication system 40 is, just like the response motion recording part 25 (refer to FIG. 1) of the audio-visual terminal 20 operated by the viewer (refer to FIG. 1) discussed previously, a database-management system for recording the detection result (primary information) detected last by the motion sensor 23 (refer to FIG. 1) of the audio-visual terminal 20 operated by the viewer and received by the receiving part 44 (and further output by the received information processing part 45) in a response motion history database 52 as a large-capacity storage device (hard disk) connected to the response motion recording part 46. Thus, the response motion history database 52 is configured to be able to record all the detection results (primary information) detected by the motion sensor 23 of the audio-visual terminal 20 operated by the viewer and received by the receiving part 44 (and output by the received information processing part 45) as a "response motion history." Alternatively, the response motion recording part 46 may be configured to record not only the detection result (primary information) detected by the motion sensor 23 of the audio-visual terminal 20 operated by the viewer and received by the receiving part 44 but also derivative information derived from the detection result (primary information) (for example, derivative information obtained by processing the primary information through a numerical analysis by the received information processing part 45).

Also, the response motion recording part 46 shown in FIG. 8 is configured to be able to, just like the response motion recording part 25 (refer to FIG. 1) of the audio-visual terminal 20 operated by the viewer (refer to FIG. 1) as discussed previously, search and extract pieces of information that satisfy certain search conditions in the "response motion history" (detection results (primary information) detected by the motion sensor 23 (refer to FIG. 1) of the audio-visual terminal 20 operated by the viewer (or derivative information derived from the primary information)) recorded in the response motion history database 52. Thus, the response motion recording part 46 is able to search and extract other detection results (primary information (or derivative information derived from the primary information)) made by the same viewer based on the same motion instruction from the "response motion history."

Here, the detection result detected by the motion sensor 23 (refer to FIG. 1) (or information processed by the received information processing part 45) (primary information or derivative information derived from the primary information) and received by the receiving part 44 shown in FIG. 8 is recorded in the response motion history database 52 as information of "response motion" included in the "motion response information 102" (refer to FIG. 4). Also, as information included in each piece of "motion response information 102," a piece of "motion instruction information 101" (refer to FIG. 3) corresponding to the piece of "motion response information 102," is recorded. As information included in the "motion instruction information 101," the information of "viewer ID," "instructed motion" and "instruction ID" is further recorded. Thus, the response motion recording part 46 can perform a search through the "response motion history" according to the search condition that each of the "viewer ID" and "instructed motion" among the information included in the "motion response information 102" is the same and the "instruction ID" is different to search and extract other detection results (information of "response motion" included in the "motion response information 102") made by the same viewer based on an instruction to make the same motion.

Also, the response motion comparing part 47 shown in FIG. 8 is configured to compare, just like the response motion comparing part 26 (refer to FIG. 1) of the audio-visual terminal 20 operated by the viewer (refer to FIG. 1) as discussed previously, the detection result detected last by the motion sensor 23 (refer to FIG. 1) (information of "response motion" included in the "motion response information 102" (refer to FIG. 4)) (primary information) and other detection results (information of "response motion" included in the "motion response information 102") (primary information) searched and extracted by the response motion recording part 46. The response motion comparing part 47 can quantitatively recognize the differences between the detection results (primary information or derivative information derived from the primary information) detected by the motion sensor 23 by comparing a plurality of pieces of "motion response information 102" to each other.

Also, the viewer authenticating part 48 shown in FIG. 8 is, just like the viewer authenticating part 27 (refer to FIG. 1) of the audio-visual terminal 20 operated by the viewer (refer to FIG. 1) discussed previously, an authentication device for evaluating the "differences between response motions" (secondary information) quantitatively recognized by the response motion comparing part 47 in the light of predetermined criteria decided by the viewing authenticating principal. The viewer authenticating part 48 is configured to authenticate the viewer who made the response motion last as the correct viewer to whom the program provider is supposed to provide the audio-visual program when the "difference in response motion" (secondary information) between the detection result detected last by the motion sensor 23 (refer to FIG. 1) (information of "response motion" included in the "motion response information 102" (refer to FIG. 4)) (primary information) and the other detection results (information of "response motion" included in the "motion response information 102") searched and extracted by the response motion recording part 46 (primary information) is determined to be within a reference range decided by the viewing authenticating principal (for example, "the difference in acceleration is 1.2G or smaller at a maximum" when the "authentication criteria" requires "the difference in acceleration to be 1.2G or smaller at a maximum in order to the viewer to be determined to the same"). When the viewer made a response motion last is authenticated to be the correct viewer, the viewer authenticating part 48 is configured to output a "viewer authentication (viewing authentication system) 106*b*" (refer to FIG. 5) (tertiary information). Also, the authentication recording part 53 is configured to record the output "viewer authentication (viewing authentication system) 106*b*" (tertiary information) as information included in the "authentication record 107" (refer to FIG. 5).

When the viewing authentication system 40 shown in FIG. 8 includes the response motion recording part 46, the response motion comparing part 47, the viewer authenticating part 48 and the response motion history database 52, the audio-visual terminal 20 (refer to FIG. 1) does not have to have the response motion recording part 25, the response motion comparing part 26, the viewer authenticating part 27 and the response motion history database 31 (refer to FIG. 1). However, the viewing authentication system 40 and the audio-visual terminal 20 may perform similar information processing for mutual verification of the information processing.

Figure 10:
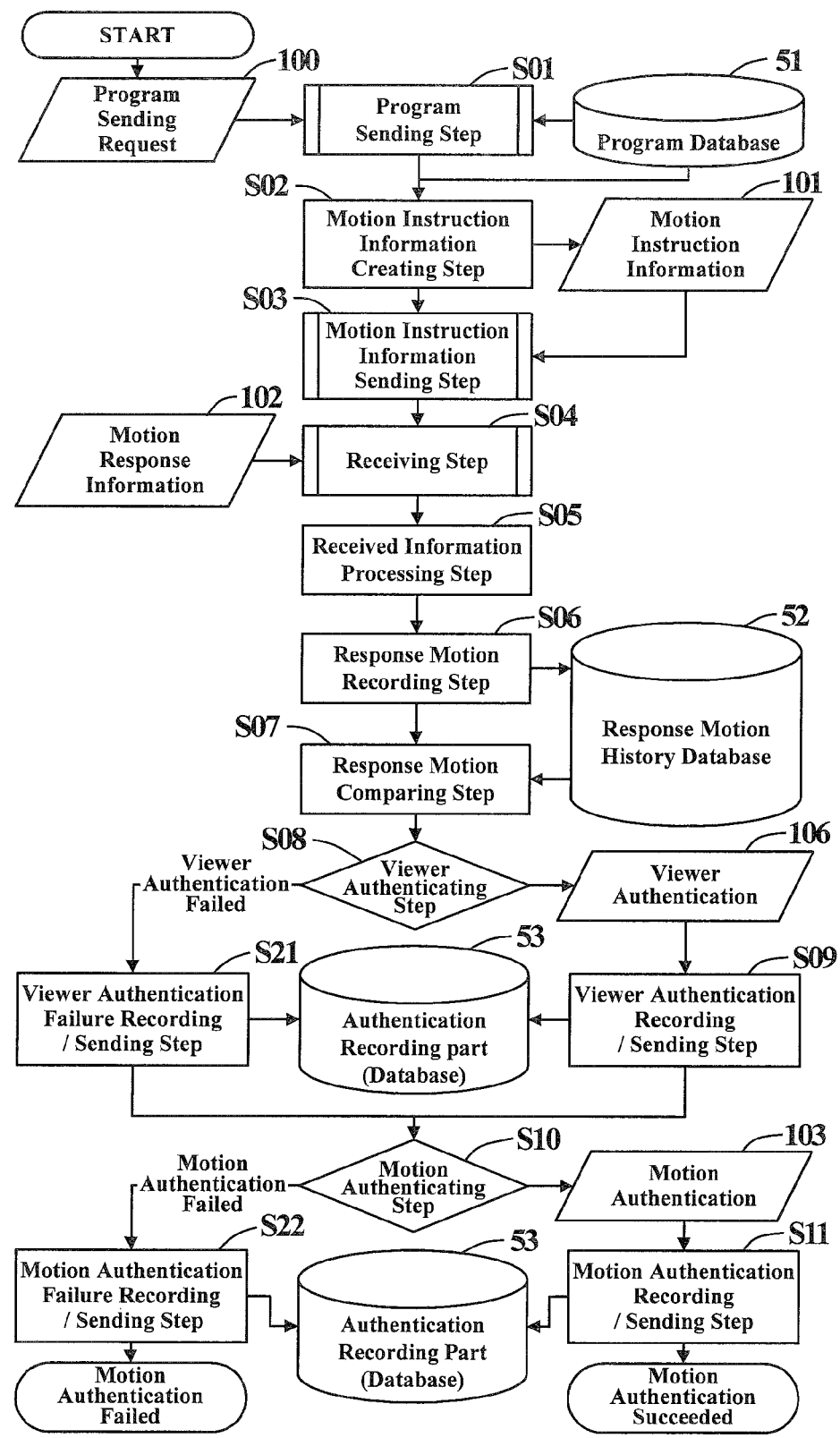
FIG. 10 is a flowchart illustrating an example of execution steps of a control program for controlling the viewing authentication system according to the second embodiment of the present invention.

Referring now to FIG. 10, a control program for controlling the viewing authentication system 40 (refer to FIG. 8) is described. The central processing unit (CPU) 50 (refer to FIG. 8) of the viewing authentication system 40 is configured to execute steps according to the control program for controlling the viewing authentication system 40 in the order shown in a flowchart shown in FIG. 10 illustrating an execution procedure of the program for controlling the viewing authentication system 40. Because the details of the functions of the program sending part 41, the motion instruction information creating part 42, the motion instruction information sending part 43, the receiving part 44, the received information processing part 45, the response motion recording part 46, the response motion comparing part 47, the viewer authenticating part 48, the clock 49, the program database 51, the response motion history database 52, and the authentication recording part 53 (refer to FIG. 8) have been already described, redundant description is omitted.

Referring to the flowchart of FIG. 10, an example of execution procedure of the program for controlling the viewing authentication system 40 (refer to FIG. 8) according to the second embodiment of the present invention is described. In this control program, the control program sends information of an audio-visual program recorded in the program database 51 (refer to FIG. 8) provided by the audio-visual program provider to the audio-visual terminal 20 operated by the viewer (refer to FIG. 1), using the program sending part 41 (refer to FIG. 8) based on a "program sending request 100" from the viewer sent from the audio-visual terminal 20 operated by the viewer to the viewing authentication system 40, first (step S01). Next, the control program performs the step of creating "motion instruction information 101" (refer to FIG. 3) unique to each audio-visual program and consisting of information with which the audio-visual program provider that provides the audio-visual program requests the viewer to make a predetermined motion at times unique to the audio-visual program, using the motion instruction information creating part 42 (refer to FIG. 8) (step S02). Next, the control program performs the step of sending the "motion instruction information 101" to the audio-visual terminal 20 operated by the viewer, using the motion instruction information sending part 43 (refer to FIG. 8) (step S03). Next, the control program performs the step of receiving "motion response information 102" (refer to FIG. 4) sent by the sending part 29 (refer to FIG. 1) of the audio-visual terminal 20 operated by the viewer, using the receiving part 44 (refer to FIG. 8) (step S04). The "motion response information 102" received here is "information about a response motion of the viewer" obtained from a detection result (primary information) of the response motion made by the viewer in response to the "motion instruction information 101" and detected by the motion sensor 23 (refer to FIG. 1) of the audio-visual terminal 20 as descried in relation to the audio-visual terminal 20. Next, the control program performs the step of specifying the response motion of the viewer by performing a numerical analysis on the information of "response motion" included in the "motion response information 102," using the motion analyzing/specifying part 45*a* (refer to FIG. 9) of the received information processing part 45 (refer to FIG. 8). Also, the control program performs the step of authenticating the response motion of the viewer to agree with the motion instructed by the motion instruction information sending part 43 (tertiary information), using the motion authenticating part 45*b* (refer to FIG. 9) of the received information processing part 45 (step S10). Next, the control program performs the step of recording the "motion response information 102" sent back from the audio-visual terminal 20 operated by the viewer and the "motion authentication (viewing authentication system) 103*b*" (refer to FIG. 5) (tertiary information) in the authentication recording part 53 (refer to FIG. 8) to authenticate the viewer's viewing of the audio-visual program, and the step of transmitting the success of motion authentication to the viewer (step S11). It is needless to say that the execution control operation in the viewing authentication system 40 may include supplementary control or execution steps in addition to the primary execution steps described above.

This control program shown in FIG. 10 also includes the step of recording the "motion response information 102" (refer to FIG. 4) in the response motion history database 52 (refer to FIG. 8), using the response motion recording part 46 (refer to FIG. 8) (step S06). Also included is the step of searching information of "response motions" made by the same viewer before according to the same motion instruction based on the "motion instruction information 101" (refer to FIG. 3) included in the "motion response information 102" and recorded in the "response motion history," using the response motion recording part 46, and comparing the information of "response motion" detected last and included in the "motion response information 102" and the "response motions" included in other pieces of "motion response information 102" searched by the response motion recording part 46, using the response motion comparing part 47 (refer to FIG. 8) (step S07). Also included is the step of authenticating that the viewer who sent the "motion response information 102" detected last is the correct viewer to whom the audio-visual program provider is supposed to provide the audio-visual program based on the result of comparison by the response motion comparing part 47 and outputting a "viewer authentication (viewing authentication system) 106*b*" (refer to FIG. 5) (tertiary information), using the viewer authenticating part 48 (refer to FIG. 8) (step M08). Also included is the step of informing the viewer that the viewer authentication by the viewer authenticating part 48 was successful through communication and recording the "viewer authentication (viewing authentication system) 106*b*" (tertiary information) as information included in the "authentication record 107" (refer to FIG. 5), using the authentication recording part 53 (refer to FIG. 8) (step S09).

On the other hand, this control program also includes the step of informing the viewer that the viewer authentication was unsuccessful when the viewer authenticating part 48 (refer to FIG. 8) failed in the viewer authentication (step S21), and the step of informing the viewer that the motion authentication was unsuccessful when the motion authenticating part 45*b* (refer to FIG. 9) of the received information processing part 45 (refer to FIG. 8) failed in the motion authentication (step S22). The program described above may further include various supplementary steps.

Figure 20:
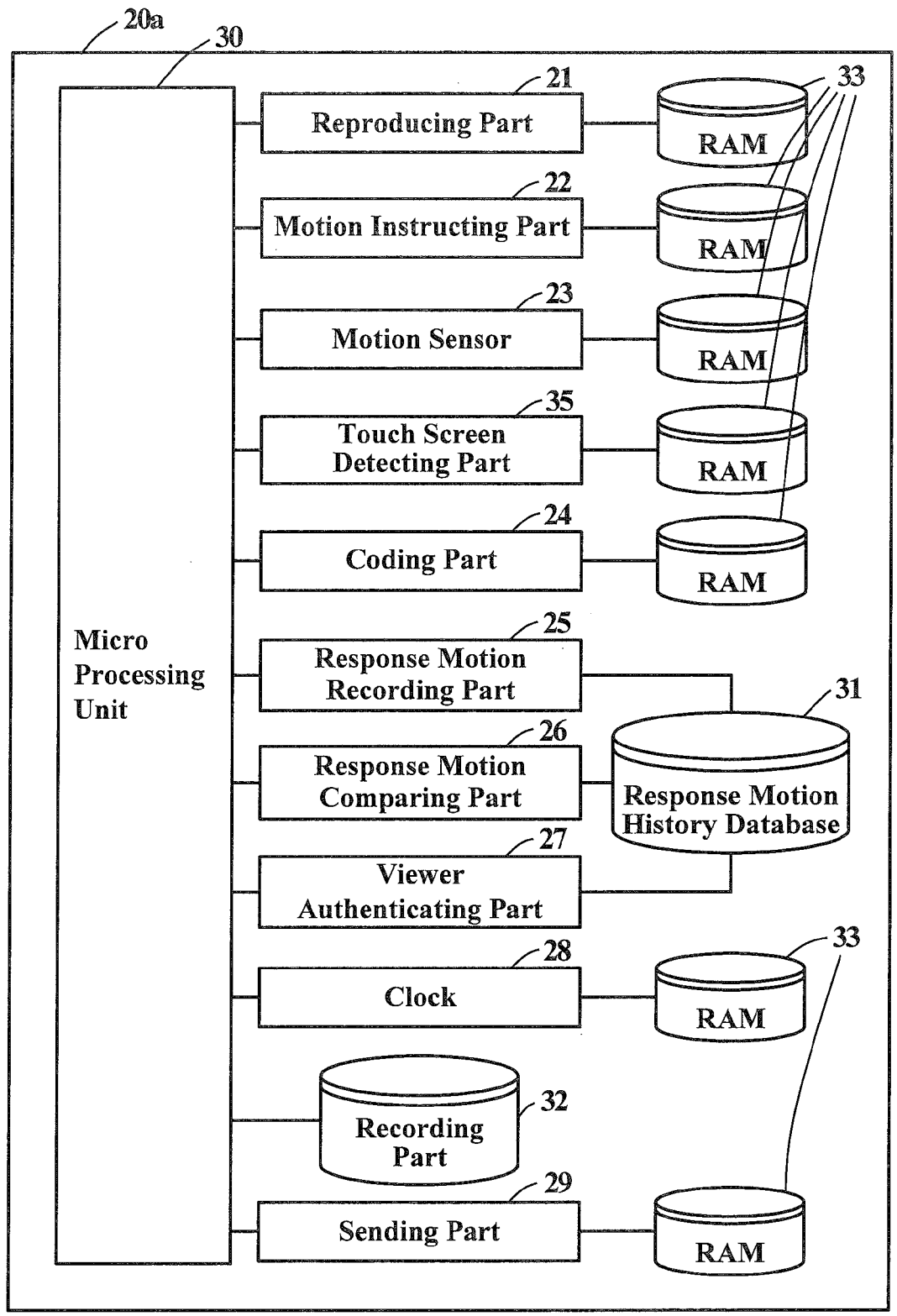
FIG. 20 is a block diagram illustrating an example of the construction of an audio-visual terminal according to another embodiment of the present invention.

Next, FIG. 20 shows the configuration of an audio-visual terminal 20*a* according to yet another embodiment of the present invention. The audio-visual terminal 20*a* includes a touch screen detecting part 35 in addition to the configuration of the audio-visual terminal 20 (refer to FIG. 1) described previously. The touch screen detecting part 35 is provided as a projected capacitive type touch screen (touch panel) device obtained by stacking a matrix switch composed of a transparent electrode on the liquid crystal display screen (not shown) of the reproducing part 21 of the audio-visual terminal 20*a*. Thus, the touch screen detecting part 35 can specify and detect the position where the viewer touches the touch screen detecting part 35 with a finger. Because the touch screen detecting part 35 shown in this embodiment is of a projected capacitive type, it can support multi-touch detection by which a multiplicity of conduction points can be detected simultaneously so that the viewer can simultaneously touch with a plurality of fingers. However, because what is required of the touch screen detecting part 35 is to be able to detect a touch of the viewer, it may be provided as a simpler surface capacitive type touch screen or a much simpler resistive type touch screen.

The motion instructing part 22 shown in FIG. 20 is configured to instruct the viewer to make a predetermined touch based on the "touch instruction information" (not shown) unique to the audio-visual program with which the audio-visual program provider that provides the audio-visual program requests the viewer to make the predetermined touch at times unique to the audio-visual program, similar to the instructing a motion based on the "motion instruction information 101" (refer to FIG. 3) as described previously.

When the "motion instruction information 101" (refer to FIG. 3) and the "touch instruction information" (not shown) are compared, they are different in that the "motion instruction information 101" is typically information that requests the viewer to make a three-dimensional response motion whereas the "touch instruction information" is information that requests the viewer to make only a touch (contact) on the touch screen detecting part 35 provided in a two-dimensional plane. That is, a response by means of an response motion requested by the "motion instruction information 101" and a response by means of a touch requested by the "touch instruction information" are different in that only a touch (contact) on the touch screen detecting part 35 is requested in the case of the touch requested by the "touch instruction information" and the motion of the viewer before the touch (contact) is out of the question at all. Thus, there is a difference indicating that a response by means of a response motion is a response method with a higher information creation efficiency by which a response including a larger amount of information than a response by means of a touch (contact) can be instantaneously made.

In this embodiment, the motion instructing part 22 is configured to give an instruction which allows the viewer to select a response by means of either a motion or touch to respond based on a motion instruction based on a "motion instruction information 101" (refer to FIG. 3) and a touch instruction based on "touch instruction information" (not shown). Specifically, a motion instruction "Please shake" (refer to FIGS. 6A-6C) based on the "motion instruction information 101" as described previously and a touch instruction "Please touch" (refer to FIG. 21) based on the "touch instruction information" are transmitted to the motion instructing part 22, and a motion instruction "Please shake or touch" (refer to FIG. 21) is displayed on a displaying part (refer to FIG. 21) of the motion instructing part 22 by the motion instructing part 22.

Figure 21:
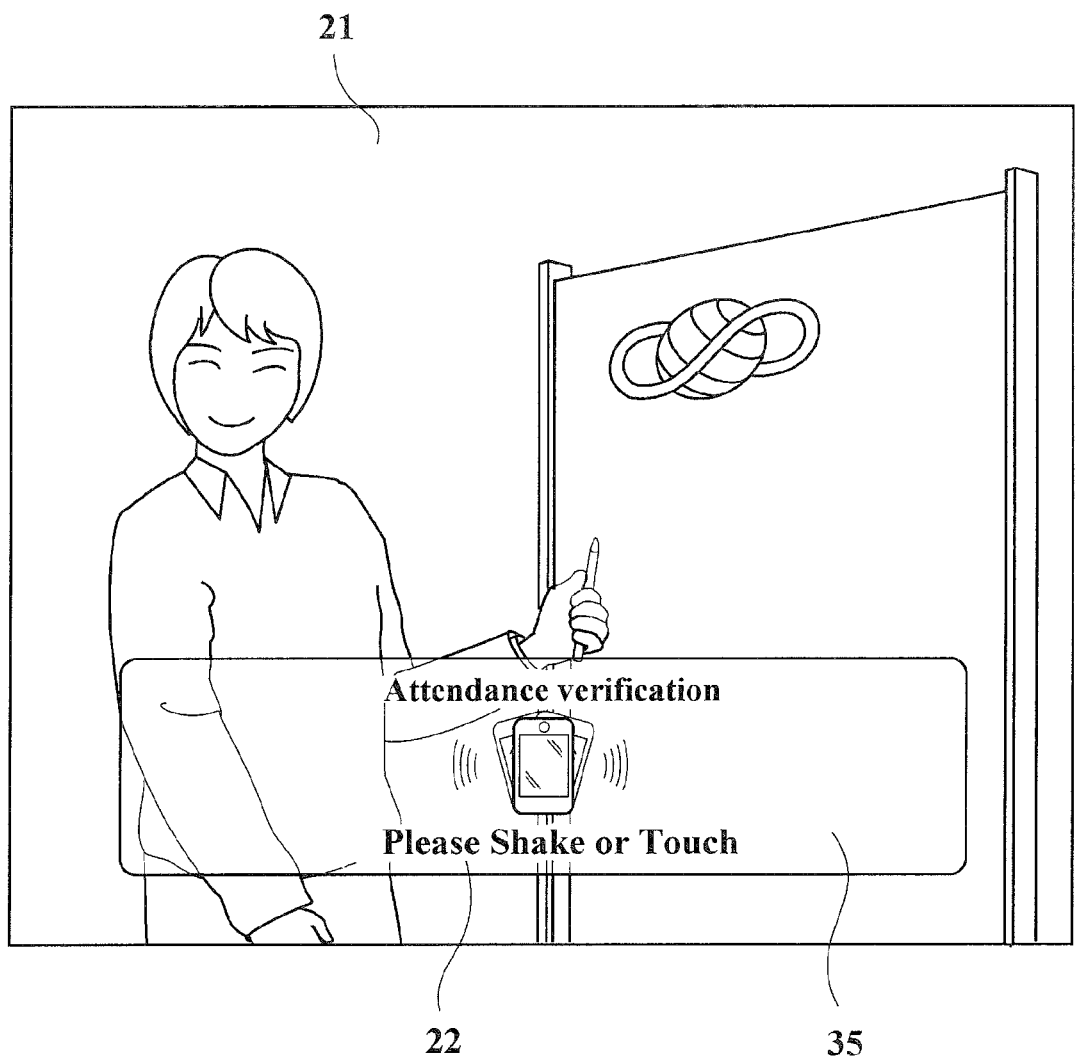
FIG. 21 is an explanatory view illustrating instruction of motion and touch according to another embodiment of the present invention.
Figure 22:
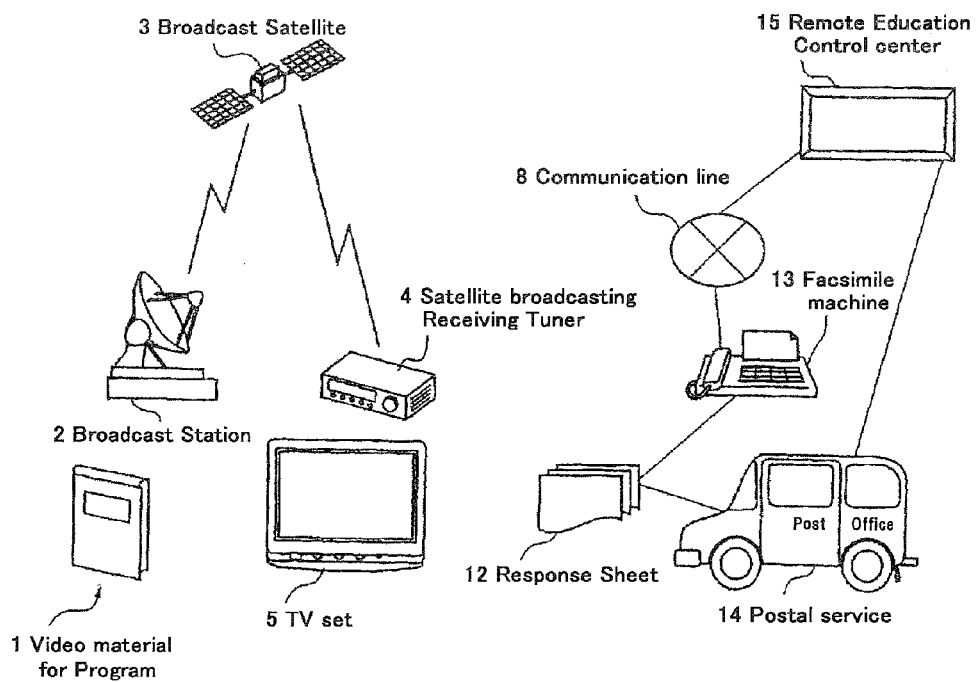
FIG. 22 is a conceptual diagram illustrating a conventional viewing authentication method using broadcasting.

In this embodiment, the instruction "Please shake or touch" to the viewer by the motion instructing part 22 is displayed at the center of a lower part of the screen as a message which consists of translucent illustration and text and which blinks on and off until the viewer responds for a predetermined period of time (for example, for "two minutes") as shown in FIG. 21. Specifically, a character string "Please touch the blue area or shake until this message disappears," for example, may be displayed in a detection area displayed in translucent blue on the touch screen detecting part 35 to instruct the view to make a response. In this embodiment, the message displayed by the motion instructing part 22 disappears when the viewer responds by means of a "shaking" motion or "touch." When the viewer responds and the message disappears, the request (motion instruction) to the viewer from the motion instructing part 22 is fulfilled.

There are situations in which the viewer's response by means of an instructed motion in response to the motion instruction from the motion instructing part 22 shown in FIG. 20 and FIG. 21 is less appropriate than the viewer's response by means of a touch instructed, on the touch screen detecting part 35 in response to a touch instruction which is simultaneously given by the motion instructing part 22 in the light of the environment in which the viewer responds. Examples of the situations include when the viewer is in a place crowded with people and when the viewer is in a library or the like and therefore does not want to attract attentions of other people around him or her by making a response motion. When the viewer views an audio-visual program using the audio-visual terminal 20*a* shown in this embodiment, the viewer has an advantage that the viewer can respond quietly by selecting a touch on the touch screen detecting part 35 in response to a touch instruction given by the motion instructing part 22 of the audio-visual terminal 20*a* depending on the situation compared to responding by means of a response motion. That is, the viewer can respond by simply making a quiet touch (contact) on the touch screen detecting part 35 regardless of the motion for it depending on the situation.

Typically, making a response motion to respond by shaking the hand holding the audio-visual terminal 20*a* when the viewer is holding the audio-visual terminal 20*a* shown in FIG. 20 with one hand is a response method which is especially easy and does not distract the viewer viewing an audio-visual program from viewing the audio-visual program. On the other hand, it can be said that the response by means of a touch on the audio-visual terminal 20*a* with the hand other than the hand holding the audio-visual terminal 20*a* (that is, using both hands) is a method which may be relatively burdensome to the viewer. Also, the response and viewing authentication method that uses more unique and redundant information which is created when the viewer makes a response motion, typically as a result of a three-dimensional movement, has an advantage that very strict viewing authentication can be made. However, depending on the viewer's circumstances, the response method in which the viewer responds by means of a touch on the audio-visual terminal 20*a* with the hand other than the hand holding the audio-visual terminal 20*a* may be more appropriate and advantageous. Thus, the audio-visual terminal 20*a* shown in this embodiment is configured to perform supplementary detection of the viewer's touch on the touch screen detecting part 35 in addition to the detection of a response motion of the viewer by the motion sensor 23 in order to provide an improved response method.

In this embodiment, the viewer can respond by touching an arbitrary point (including a region with a certain area) on the touch screen detecting part 35 with a finger in response to a touch instruction from the motion instructing part 22 shown in FIG. 20. It can be said that the response method in which the viewer responds by simply touching an arbitrary point on the touch screen detecting part 35 with a finger is a method by which the viewer can respond particularly quietly and easily among response methods which the viewer can use in response to an instruction for viewing authentication from the motion instructing part 22. The touch screen detecting part 35 is configured to be able to detect a touch of the viewer on an arbitrary point or a plurality of points with, for example, a finger or stylus when necessary. Also, the coding part 24 can obtain a detection by the touch screen detecting part 35 as a detection result (primary information) and also obtain "information about a touch of the viewer" (primary information, secondary information and tertiary information) detected by the touch screen detecting part 35 as a signal/information that is sendable by the sending part 29 based on the detection result (primary information) as in the case of the "information about a response motion of the viewer" described previously. The "information about a touch of the viewer" coded by the coding part 24 may be either a digital signal/information or an analog signal/information. The "information about a touch of the viewer" coded by the coding part 24 can be sent to the viewing authentication system 40 of the viewing authenticating principal (refer to FIG. 8) by the sending part 29 as in the case of the "information about a response motion of the viewer" described previously.

Alternatively, the motion instructing part 22 shown in FIG. 20 may instruct the viewer to draw a figure, such as a circle or triangle, or a letter, such as 8, on the touch screen detecting part 35 with, for example, a finger or stylus based on the "touch instruction information." In this case, the detection result (primary information) detected by the touch screen detecting part 35 can be obtained as, for example, "information about a touch of the viewer" including "information of the path of the touch of the viewer" (primary information, and secondary information and tertiary information derived from the primary information) detected by the touch screen detecting part 35 using the coding part 24 as in the case of the detection result (primary information) of a response motion of the viewer detected by the motion sensor 23 and the "information about a response motion of the viewer" described previously. Thus, compared to the case of requesting the viewer to touch an arbitrary point on the touch screen detecting part 35 alone, response and viewing authentication can be made based on a larger amount of information. For example, in the case of instructing the viewer to draw a character string including a characteristic by which the viewer can be uniquely identified, such as a signature, on the touch screen detecting part 35, the viewing of an audio-visual program and the correct viewer can be authenticated based on a much larger amount of information.

However, this method has a disadvantage in the amount of information which can be used to authenticate the viewing of an audio-visual program and authentication of the correct viewer and in the efficiency in creating the information compared to the response and viewing authentication method based on a response motion as described previously. Thus, there is a possibility that a response including a predetermined amount of information necessary for strict authentication of the viewing of an audio-visual program and the correct viewer, such as one by means of a touch to draw a character string including many letters, may impose a burden on the viewer, or a possibility, in contrast, that the strictness of the authentication may be reduced due to insufficient amount of information. To avoid these possibilities, the response and authentication of the viewing of an audio-visual program (or authentication of the correct viewer) based on a detection of a touch by the touch screen detecting part 35 as in the configuration of the audio-visual terminal 20*a* shown in this embodiment may be provided to temporarily assist the response and authentication of the viewing of an audio-visual program (or authentication of the correct viewer) based on a detection of a response motion by the motion sensor 23. The details of the detection of a touch of the viewer by the touch screen detecting part 35, coding of the "information about a touch of the viewer" by the coding part 24 and the sending of the signal/information by the sending part 29 are the same as the detection of a response motion of the viewer by the motion sensor 23, the coding of the "information about a response motion of the viewer" by the coding part 24 and the sending of the signal/information by the sending part 29, respectively, described previously, and therefore their description is omitted.

When the touch screen detecting part 35 is provided as a auxiliary detection device as in the configuration of the audio-visual terminal 20a shown in FIG. 20, the amount of information and the efficiency in creating the information can be so higher that the user can select a response by means of a response motion, which allows stricter authentication, and a response by means of a touch, which is quieter and easier, depending on the situation, and the response and the viewing of an audio-visual program (or the correct viewer) can be authenticated more properly even if the viewer views an audio-visual program using a relatively large portable terminal, such as "iPad" (trademark).

The audio-visual terminal 20a shown in FIG. 20 may be a small, cellular phone-type portable terminal (such as "iPhone" (trademark)) or a portable terminal (such as "iPad" (trademark)) with a larger display screen. When the audio-visual terminal 20a is a large and heavy portable terminal, the response method by means of a response motion of shaking the audio-visual terminal 20a may be less easy than the response method by means of a touch on the audio-visual terminal 20a. Thus, the audio-visual terminal 20a is configured to enable the viewer to respond suitably at the viewer's choice depending on the situation regardless of whether the audio-visual terminal 20a is a small portable terminal or a large portable terminal.

In this case, the viewing authenticating principal may previously decide, for example, the ratio between the number of responses by means of a response motion and the number of responses by means of a touch in the "authentication criteria" so that the viewing authenticating principal can perform viewing authentication with desired strictness. For example, the viewing authenticating principal may decide that "the responses are determined to be appropriate when the total number of responses by means of a response motion is one-third or greater the total number of responses by means of a touch" in the "authentication criteria."

On the other hand, when the audio-visual terminal 20a shown in FIG. 20 and the viewing authentication system 40 of the viewing authenticating principal (refer to FIG. 8) perform mutual information communication and viewing authentication, the motion instruction information creating part 42 (refer to FIG. 8) of the viewing authentication system 40 is configured to create, as in the case of the "motion instruction information 101" (refer to FIG. 3) discussed previously, "touch instruction information" (not shown) unique to each audio-visual program and consisting of information with which the audio-visual program provider that provides the audio-visual program requests the viewer to make a predetermined touch at times unique to the audio-visual program. The "touch instruction information" is similar information with "motion instruction information 101." Also, the motion instruction information sending part 43 (refer to FIG. 8) of the viewing authentication system 40 is configured to send, as in the case of the "motion instruction information 101" discussed previously, the "touch instruction information" to the audio-visual terminal 20a operated by the viewer. Also, the receiving part 44 (refer to FIG. 8) of the viewing authentication system 40 is configured to receive, as in the case of the "information about a response motion of the viewer" discussed previously, the "information about a touch of the viewer" obtained from a detection result detected by the touch screen detecting part 35 of the audio-visual terminal 20a operated by the viewer, which is sent back to transmit the fact that the viewer is normally viewing the audio-visual program. Also, the received information processing part 45 (refer to FIG. 8) of the viewing authentication system 40 is configured to process, as in the case of the "information about a response motion of the viewer" discussed previously, the received "information about a touch of the viewer" into "information for use in authenticating that the viewer has viewed the audio-visual program." Thus, the response and the viewing of an audio-visual program (or the correct viewer) can be authenticated more properly depending on the viewer's situation when the audio-visual terminal 20a and the viewing authentication system 40 are used. The details of the functions of the viewing authentication system 40 and the information processing therein are the same as the description of the "motion instruction information 101" and "information about a response motion of the viewer" and "information for use in authenticating that the viewer has viewed an audio-visual program" described previously, and therefore their description is omitted.

As described above, according to this embodiment in which the detection of a response motion of the viewer by the motion sensor 23 of the audio-visual terminal 20a shown in FIG. 20 and the detection of a touch of the viewer by the touch screen detecting part 35 of the audio-visual terminal 20a are performed, the viewer can have the freedom of choice which allows the viewer to select a more appropriate response method depending on the viewer's situation or depending on the type (size, weight etc.) of the audio-visual terminal 20a the viewer uses to view an audio-visual program. That is, it is possible to accept viewers who have no choice but view an audio-visual program in crowded places as well as places suitable for viewing and to provide remote education programs to not only viewers who use a small portable terminal but also viewers who use a larger audio-visual terminal (not only a portable terminal but also a stationary terminal) to view an audio-visual program. The viewers who use a stationary terminal can always select a touch even if there is a choice for a motion. In other words, it is possible to dramatically expand the range of viewers or learners as targets of the audio-visual programs who can obtain viewing authentication.

In addition, in another embodiment, the audio-visual terminal 20a shown in FIG. 20 may be configured to detect a response motion of the viewer with, for example, a camera (not shown) of the motion sensor 23 as described previously and detect a touch of the viewer with the touch screen detecting part 35 so that viewing of an audio-visual program and viewing authentication can be properly made using the audio-visual terminal 20a even if it is provided as a stationary terminal. To provide the audio-visual terminal 20a and the viewing authentication system 40 (refer to FIG. 8) so as to allow the viewers to take more opportunities to view an audio-visual program and obtain viewing authentication with the audio-visual terminal 20a of various types (size, weight, etc.) as described above produces an especially fruitful effect in the field of remote education in which viewers of audio-visual programs are learners who learn through remote education.

Third Embodiment

Figures 11, 12:
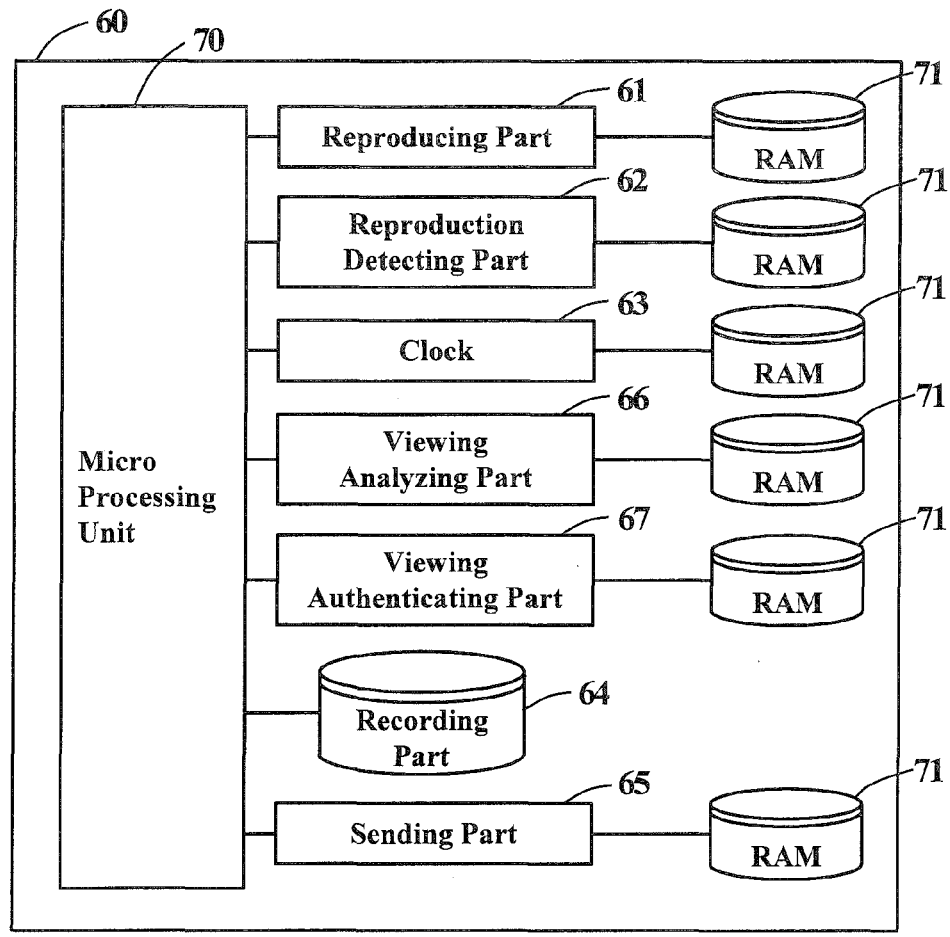
FIG. 11 is a block diagram illustrating an example of the construction of an audio-visual terminal according to a third embodiment of the present invention.
FIG. 12 is an explanatory view illustrating information included in reproduction authentication point according to the third embodiment of the present invention.

The third embodiment of the invention will be hereinafter described in detail. FIG. 11 is a block diagram illustrating an example of the basic construction of the audio-visual terminal 60 according to the third embodiment of the present invention. The audio-visual terminal 60 is a portable terminal, which an audio-visual program viewer can hold and operate easily with one hand. The audio-visual terminal 60 includes a reproducing part 61, a reproduction detecting part 62, a clock 63, a recording part 64, a sending part 65, a viewing analyzing part 66, and a viewing authenticating part 67. The audio-visual terminal 60 also includes a microprocessor (Micro Processing Unit) 70 as a control device for controlling the audio-visual terminal 60. Each of the reproducing part 61, a reproduction detecting part 62, a clock 63, a sending part 65, a viewing analyzing part 66, and a viewing authenticating part 67 is provided with a random access memory (RAM) 71 for assisting its function. The details of the function of each device of the audio-visual terminal 60 are described in sequence below.

The reproducing part 61 shown in FIG. 11 is an audio-visual reproduction device having a liquid crystal display screen (refer to FIGS. 6A-6C) and an air-conduction loudspeaker (not shown) which can present an audio-visual program provided by an audio-visual program provider via a broadcast, reproducible recording medium or electrical communication line (information communication line) to the viewer by means of video images and sounds.

The reproducing part 61 shown in FIG. 11 has a tuner (not shown) which can receive a broadcast audio-visual program just like the reproducing part 21 (refer to FIG. 1) of the audio-visual terminal 20 (refer to FIG. 1). Also, the reproducing part 61 has a multimedia player (not shown) just like the reproducing part 21. Also, the reproducing part 61 has a wireless information communication instrument (wireless LAN communication instrument (router)) (not shown) just like the reproducing part 21. Thus, the reproducing part 61 can be connected to a public wireless LAN (not shown) via wireless communication and reproduce an audio-visual program through streaming (stream distribution). Alternatively, the reproducing part 61 may have a plasma display screen, or have an organic electroluminescence display screen, just like the reproducing part 21 of the audio-visual terminal 20. Alternatively, the reproducing part 61 may have a bone-conduction loudspeaker, or may be configured to present an audio-visual program by means of subtitles only without the use of sounds. The reproducing part 61 may be configured to be able to perform wireless or wired information communication according to any standard, just like the reproducing part 21 of the audio-visual terminal 20.

Also, in the reproducing an audio-visual program with the reproducing part 61 shown in FIG. 11, in the information of the audio-visual program provided by the program provider to the audio-visual program viewer, "reproduction authentication points 110" (refer to FIG. 12) as signals for defining the program running time of the audio-visual program are provided at predetermined time intervals (at a constant period (physics) in this embodiment) by the program provider are provided for the purpose of checking if the viewer is viewing the audio-visual program.

Referring to FIG. 12, information included in "reproduction authentication point 110" is described here. Each "reproduction authentication point 110" includes information of "program ID," "authentication ID," "viewer ID," "sending time," "period (physics) information," "detection time," "sending back time," and "authentication criteria." Here, the information of "program ID" is uniquely assigned to each audio-visual program. The "program ID" is information given by the viewing authenticating principal to distinguish one audio-visual program out of audio-visual programs provided by the viewing authenticating principal.

The information of "authentication ID" included in the "reproduction authentication point 110" shown in FIG. 12 is information given by the viewing authenticating principal to individually identify pieces of "reproduction authentication point 110" which are given in one audio-visual program. The "authentication ID" is made up of the total number of pieces of "reproduction authentication point 110" given in one audio-visual program and an ascending serial number, starting from 1 for the first piece, which is assigned to every piece of "reproduction authentication point 110" in one audio-visual program. Specifically, in the case of this embodiment in which "reproduction authentication points 110" are provided at intervals of one minute in an audio-visual program having a program running time of 90 minutes, an "authentication ID" of "1/90" is given to the "reproduction authentication point 110" which is the first to be created because the total number of "reproduction authentication points 110" given in one audio-visual program is 90.

The information of "viewer ID" included in the "reproduction authentication point 110" shown in FIG. 12 is information unique to the correct viewer which is issued by the viewing authenticating principal to the correct viewer to whom the audio-visual program provider is supposed to provide an audio-visual program. In this embodiment, the "viewer ID" is issued by the viewing authenticating principal, together with a "password" (simple viewer authentication information) (not shown) unique to the "viewer ID." In this embodiment, the "viewer ID" and the "password" (simple viewer authentication information) unique to the "viewer ID" are both made up of text string information consisting of twenty alphabets and numbers. The form of information of the "viewer ID" and the "password" is not limited to a text string consisting of twenty alphabets and numbers and may be arbitrarily decided by the viewing authenticating principal.

The information of "sending time" included in the "reproduction authentication point 110" shown in FIG. 12 is information in which the time when the viewing authentication system 80 of the viewing authenticating principal (refer to FIG. 16), which is descried in detail later, sent each piece of "reproduction authentication point 110" with the audio-visual program to the viewer is recorded. By obtaining the period of time from the "sending time" to the "detection time" (the time when the reproduction detecting part 62 (refer to FIG. 11) detected the "reproduction authentication point 110," which is output from the clock 63 (refer to FIG. 11) of the audio-visual terminal 60 operated by viewer (refer to FIG. 11) outputs), which is described in detail later, the viewing authenticating principal can recognize an approximate period of communication between the audio-visual terminal 60 and the viewing authentication system 80.

In the information of "period (physics) information" included in the "reproduction authentication point 110" shown in FIG. 12, the time intervals (period (physics)) at which the "reproduction authentication points 110" are provided through the program running time by the reproduction authentication point setting part 81 (refer to FIG. 16) of the viewing authentication system 80 (refer to FIG. 16), which is described in detail later, is recorded. The audio-visual terminal 60 (refer to FIG. 11) and the viewing authentication system 80 can recognize the program running time in a part of the audio-visual program in which a given "reproduction authentication point 110" is provided with reference to the "period (physics) information."

The information of "detection time" included in the "reproduction authentication point 110" shown in FIG. 12 is information in which the time when the "reproduction authentication point 110" was detected by the reproduction detecting part 62 (refer to FIG. 11), which is output from the clock 63 (refer to FIG. 11) of the audio-visual terminal 60 (refer to FIG. 11), is recorded as described in detail later. As described in detail later, the audio-visual terminal 60 and the viewing authentication system 80 (refer to FIG. 16) can recognize the time at which and period for which the viewer reproduced the audio-visual program based on the information of "detection time."

The information of "sending back time" included in the "reproduction authentication point 110" shown in FIG. 12 is information in which the time when the sending part 65 (refer to FIG. 11) of the audio-visual terminal 60 (refer to FIG. 11) sent back the "reproduction authentication point 110" to the viewing authentication system 80 of the viewing authenticating principal (refer to FIG. 16) is recorded. The viewing authentication system 80 can recognize the time at which and the period for which the viewer reproduced the audio-visual program based on the information of "sending back time." Also, the information of "sending back time" can be used to recognize an approximate period of communication between the audio-visual terminal 60 and the viewing authentication system 80 as in the case of the information of "sending time."

The information of "authentication criteria" included in the "reproduction authentication point 110" shown in FIG. 12 is information in which "maximum reproduction speed" and "minimum reproduction period" of the audio-visual program decided by the viewing authenticating principal are recorded. The "maximum reproduction speed" defines an appropriate reproduction speed of the audio-visual program accepted by the viewing authenticating principal. When the viewer reproduces the audio-visual program at a reproduction speed at which the viewer cannot understand the contents of audio-visual program, the viewing of the part reproduced at the fast speed cannot be authenticated based on the "authentication criteria." Also, the "minimum reproduction period" defines the minimum period for which the viewer should view the audio-visual program based on the program running time of the audio-visual program. The "minimum reproduction period" is calculated by accumulating the program running times of the parts of the audio-visual program the viewer reproduced at an appropriate reproduction speed. The audio-visual terminal 60 (refer to FIG. 11) and the viewing authentication system 80 (refer to FIG. 16) are configured to be able to perform mutual information communication of the "reproduction authentication points 110" including these information to authenticate the viewer's viewing of the audio-visual program. However, the "reproduction authentication point 110" may be provided to have another information configuration.

Figure 13A:
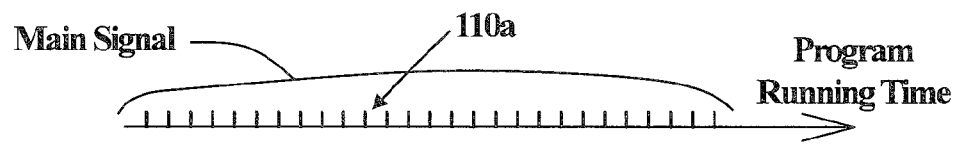
FIGS. 13A-13D are explanatory views illustrating predetermined time intervals at which reproduction authentication points are provided according to the third embodiment of the present invention.

Referring now to FIGS. 13A-13D, a method for providing the "reproduction authentication points 110" (refer to FIG. 12) at predetermined time intervals is described. FIG. 13A shows temporal locations of "reproduction authentication points 110" in this embodiment. The "reproduction authentication points 110" are provided at points 110a on the time axis in each audio-visual program. In this embodiment, the predetermined time intervals (intervals between the points 110a) at which the "reproduction authentication points 110" are provided, which are decided by the viewing authenticating principal, are decided to be 60 seconds throughout the program running time of each audio-visual program. The intervals at which the "reproduction authentication points 110" are provided shown in FIG. 13A are illustrated by extracting a part of the program running time of an audio-visual program.

The existence of the "reproduction authentication points 110" including the information as shown in FIG. 12 and provided at the time intervals shown in FIG. 13A is not perceived by the viewer. However, in view of the fact that this embodiment is also disclosed to viewers of audio-visual programs, the information of the predetermined time interval at which the "reproduction authentication points 110" are provided may be kept secret from the viewers. For example, as in the example of the placement of "reproduction authentication points 110" shown in FIG. 13B, the "reproduction authentication points 110" may be provided in a nested interval structure in which a multiplicity of "reproduction authentication points 110" are provided at random using random numbers (points 110b provided at random intervals on the time axis) in the intervals of "reproduction authentication points 110" provided at a regular period (physics) (regular sections) (intervals between points 110a provided at regular intervals on the time axis) so that the intervals between the "reproduction authentication points 110" cannot be easily perceived by the viewers of the audio-visual program. At this time, when the random placement is achieved using a table of random digits, the "reproduction authentication point 110" can be information peculiar to each audio-visual program which functions likely as a finger-pattern of the audio-visual program.

Figure 13B:
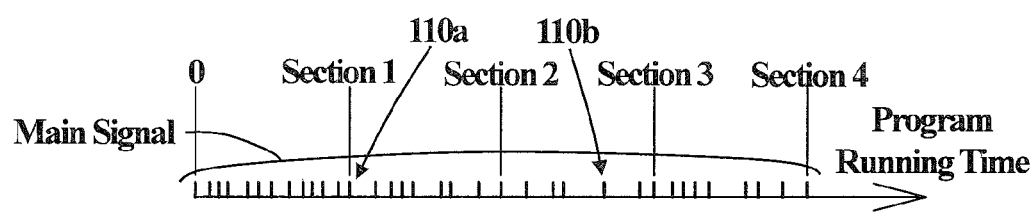

The reason for the placement of the "reproduction authentication points 110" (refer to FIG. 12) which cannot be easily perceived by the viewers as shown in FIG. 13B is not that the viewing authenticating principal suspects the viewers' dishonesty. The time intervals at which the "reproduction authentication points 110" are provided are kept secret from the viewers so that viewing authenticating principal can maintain a neutral stance to improve the objectivity of the viewing authentication by the viewing authenticating principal and to return the benefit of obtaining objective viewing authentication by the viewing authenticating principal to the viewer of the audio-visual program.

Figure 13C:
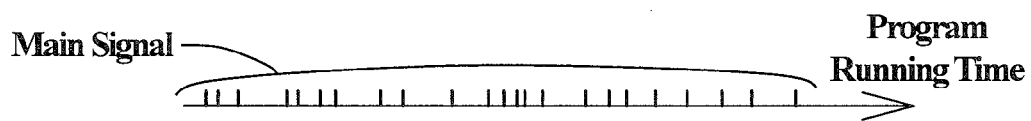

Alternatively, the "reproduction authentication points 110" may be provided not at regular intervals but at completely random time intervals as in the example of placement of "reproduction authentication points 110" (refer to FIG. 12) shown in FIG. 13C for the same reason.

Figure 13D:
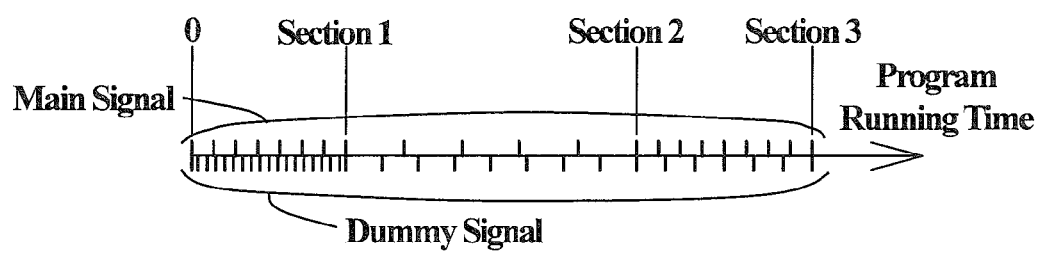

Alternatively, the "reproduction authentication points 110" (refer to FIG. 12) may be provided as shown in FIG. 13D. In the example of placement shown in FIG. 13D, "valid reproduction authentication points 110" (main signals) are provided in a nested structure in which periods (physics) (sections) with random lengths are first decided and placement intervals are provided at a regular period (physics) in each period (physics) (section) but different periods (physics) in different periods (physics) (section). Also, the "valid reproduction authentication points 110" (main signals) are provided together with "invalid reproduction authentication points 110" (dummy signals) shown below the program running time axis in FIG. 13D. In addition, the program running time of the audio-visual program is associated only with the "valid reproduction authentication points 110" (main signals). On the other hand, the "invalid reproduction authentication points 110" (dummy signals) are overlapped with the "valid reproduction authentication points 110" (main signals) at random intervals in each of the random periods (physics) (sections) to keep the period (physics) at which the "valid reproduction authentication points 110" (main signals) are provided secret from the viewer of the audio-visual program.

The "reproduction authentication points 110" (refer to FIG. 12) shown in FIGS. 13A-13D may be provided at any time intervals as long as the time intervals are predetermined time intervals recognized by the viewing authenticating principal. In addition to the above examples, the placement intervals may be provided in a geometric series manner, or "reproduction authentication points 110" may be provided at important parts of the audio-visual program in view of the contents of the audio-visual program.

Figure 16:
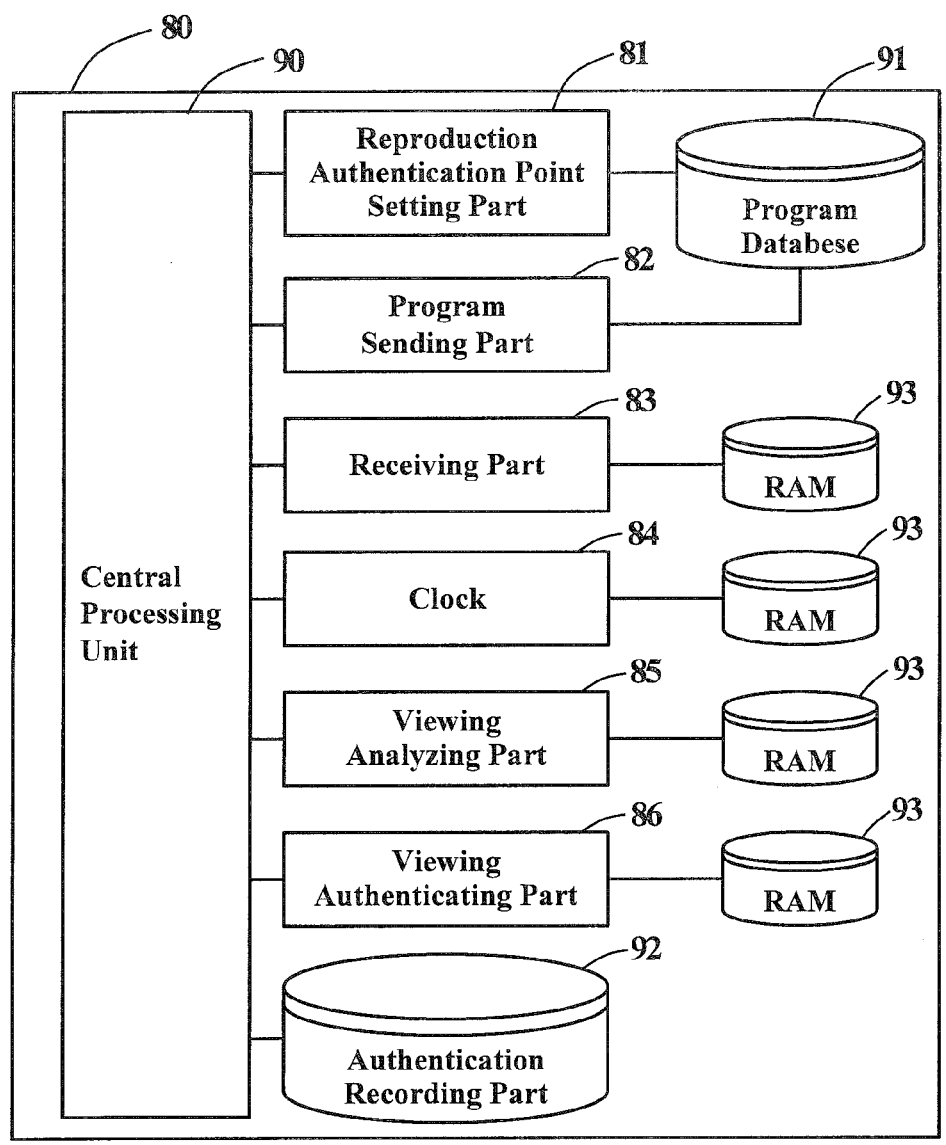
FIG. 16 is a block diagram illustrating an example of the construction of a viewing authentication system according to the third embodiment of the present invention.

In this embodiment, the placement of the "reproduction authentication points 110" (refer to FIG. 12) at the predetermined time intervals as shown in FIGS. 13A-13D is made by the reproduction authentication point setting part 81 (refer to FIG. 16) of the viewing authentication system 80 as a dedicated server of the viewing authenticating principal (refer to FIG. 16). The reproduction authentication point setting part 81 is configured to write the information of the "reproduction authentication points 110" on the information of each audio-visual program recorded in the program database 91 as a large-capacity storage device (hard disk) (refer to FIG. 16) at predetermined time intervals. At this time, the information of the predetermined time intervals (period (physics)) at which the "reproduction authentication points 110" are provided is encrypted and recorded in the information of "period (physics) information" included in the information of "reproduction authentication point 110" by the viewing authenticating principal. In this embodiment, the information that the "reproduction authentication points 110" are provided at a "placement period (physics) of 60 seconds" is recorded in the information of "period (physics) information" included in the information of each "reproduction authentication point 110."

Alternatively, when "valid reproduction authentication points 110" (refer to FIG. 12) (main signals) and "invalid reproduction authentication points 110" (refer to FIG. 12) (dummy signals) are provided as shown in FIG. 13D, the information that the "valid reproduction authentication points (main signals) are provided at period (physics) of 60 seconds" may be recorded in the information of period (physics) of the "valid reproduction authentication points 110" (main signals) as the information of "period (physics) information" included in the "valid reproduction authentication point 110" (main signal). On the other hand, the information that "invalid reproduction authentication points (dummy signals) are provided at period (physics) of 15 seconds" may be recorded in the information of period (physics) of the "invalid reproduction authentication points 110" as the information of "period (physics) information" included in the "invalid reproduction authentication point 110" (dummy signal).

Referring to FIG. 11, the audio-visual terminal 60 is described. The reproduction detecting part 62 shown in FIG. 11 is an information processing device for detecting the "reproduction authentication points 110" (refer to FIG. 12) as signals for defining the program running time of the audio-visual program provided in the audio-visual program at predetermined time intervals (at a regular period (physics) of 60 seconds through the program running time in this embodiment) by the audio-visual program provider in the information of the audio-visual program reproduced according to a reproduction operation by the viewer using the reproducing part 61. In this embodiment, when the viewer views the audio-visual program as a normal reproduction speed, the reproduction detecting part 62 detects the "reproduction authentication points 110" at intervals of 60 seconds.

Alternatively, when "valid reproduction authentication points 110" (refer to FIG. 12) (main signals) (refer to FIG. 13D) and "invalid reproduction authentication points 110" (dummy signals) (refer to FIG. 13D) are provided in an audio-visual program, the reproduction detecting part 62 shown in FIG. 11 may be configured to detect both the "valid reproduction authentication points 110" (main signals) and the "invalid reproduction authentication points 110" (dummy signals). Alternatively, the reproduction detecting part 62 may be configured to detect only the "valid reproduction authentication points 110" (main signals) selectively. The "valid reproduction authentication points 110" (main signals) can be discriminatively detected with reference to the information of period (physics) of the "valid reproduction authentication points 110" (main signals), which is information encrypted and recorded in the information of "period (physics) information" (refer to FIG. 12) included in the "reproduction authentication point 110" by the viewing authenticating principal.

Also, the clock 63 shown in FIG. 11 is configured to output the "times when the reproduction authentication points 110 (refer to FIG. 12 and FIGS. 13A-13D) were detected" by the reproduction detecting part 62. The times output from the clock 63 are configured to be recorded in the "detection time" (refer to FIG. 12) included in the "reproduction authentication point 110." In this embodiment, when the viewer views the audio-visual program as a normal reproduction speed, the clock 63 outputs the "detection time" at intervals of 60 seconds.

Alternatively, when "valid reproduction authentication points 110" (refer to FIG. 12) (main signals) (refer to FIG. 13D) and "invalid reproduction authentication points 110" (dummy signals) (refer to FIG. 13D) are provided in an audio-visual program, the clock 63 shown in FIG. 11 may be configured to output the times when both the "valid reproduction authentication points 110" (main signals) and the "invalid reproduction authentication points 110" (dummy signals) are detected by the reproduction detecting part 62. Alternatively, the clock 63 may be configured to output the times only when the "valid reproduction authentication points 110" (main signals) are detected selectively. The "valid reproduction authentication points 110" (main signals) can be discriminated with reference to the information of period (physics) of the "valid reproduction authentication points 110" (main signals), which is information encrypted and recorded in the information of "period (physics) information" included in the "reproduction authentication point 110" by the viewing authenticating principal.

Also, the sending part 65 shown in FIG. 11 is an information communication device for sending the "reproduction authentication points 110" (refer to FIG. 12) to the viewing authenticating principal to transmit them to the viewing authenticating principal, which authenticates that the viewer is normally viewing the audio-visual program. Specifically, the sending part 65 is a wireless information communication instrument (wireless LAN communication instrument (router)) (not shown) connected to a public wireless LAN (not shown). In this embodiment, the sending part 65 sends the "reproduction authentication points 110" to the viewing authenticating principal at intervals of 60 seconds.

Alternatively, when "valid reproduction authentication points 110" (refer to FIG. 12) (main signals) (refer to FIG. 13D) and "invalid reproduction authentication points 110" (dummy signals) (refer to FIG. 13D) are provided in an audio-visual program, the sending part 65 shown in FIG. 11 may be configured to send both the "valid reproduction authentication points 110" (main signals) and the "invalid reproduction authentication points 110" (dummy signals) to the viewing authentication system 80 of the viewing authenticating principal (refer to FIG. 16). Alternatively, the sending part 65 may be configured to send only the "valid reproduction authentication points 110" (main signals) selectively. The "valid reproduction authentication points 110" (main signals) can be discriminated with reference to the information of the placement period (physics) of the "valid reproduction authentication points 110" (main signals), which is information encrypted and recorded in the information of "period (physics) information" included in the "reproduction authentication point 110" by the viewing authenticating principal.

As for the sending of information to the viewing authentication system 80 (refer to FIG. 16) by the sending part 65 shown in FIG. 11, the information may not be sent and the information to be sent may be recorded in the recording part 64 while the viewer is viewing an audio-visual program and all the information may be sent to the viewing authentication system 80 at a time after the viewer finishes reproducing (the viewer has reproduced) the audio-visual program as in the case of the sending of information to the viewing authentication system 40 (refer to FIG. 8) by the sending part 29 (refer to FIG. 1) of the audio-visual terminal 20 (refer to FIG. 1).

Also, the viewing analyzing part 66 shown in FIG. 11 is an information processing device for analyzing a history of reproduction operation by the viewer from at least two "times when the reproduction authentication points 110 (refer to FIG. 12) were detected." Also, the sending part 65 is configured to send a "reproduction operation history (audio-visual terminal) 111a" (refer to FIG. 14) analyzed and output by the viewing analyzing part 66 to the viewing authenticating principal for authentication of the viewer's viewing of the audio-visual program.

The viewing analyzing part 66 shown in FIG. 11 is configured to decode and refer to the information of the period (physics) at which the "reproduction authentication points 110" are provided, which has been encrypted and recorded by the viewing authenticating principal in the information of "period (physics) information" included in the "reproduction authentication point 110" (refer to FIG. 12). Also, the viewing analyzing part 66 is configured to seriate the "reproduction authentication points 110" in the order of the number of "authentication ID" recorded in the information of "authentication ID" included in the "reproduction authentication point 110" and add up the period (physics) of the "reproduction authentication points 110." Thus, the viewing analyzing part 66 can calculate the program running time in a time section of the audio-visual program defined by at least two valid "reproduction authentication points 110."

Alternatively, when "valid reproduction authentication points 110" (refer to FIG. 12) (main signals) (refer to FIG. 13D) and "invalid reproduction authentication points 110" (dummy signals) (refer to FIG. 13D) are provided in an audio-visual program, the viewing analyzing part 66 may be configured to add up only the information of the period (physics) at which the "valid reproduction authentication points 110" (main signals) are provided by decoding and referring to the information of the period (physics) at which the "valid reproduction authentication points 110" (main signals) are provided, which has been encrypted and recorded by the viewing authenticating principal in the information of "period (physics) information" included in the "valid reproduction authentication point 110" (main signal). Alternatively, the viewing analyzing part 66 may be configured to seriate the "valid reproduction authentication points 110" (main signals) in the order of the number of "authentication ID" recorded in the information of "authentication ID" included in the "valid reproduction authentication point 110" (main signals) and add up the placement period (physics) of the "valid reproduction authentication points 110" (main signals). Also in this case, the viewing analyzing part 66 can calculate the program running time in a time section of the audio-visual program defined by at least two "valid reproduction authentication points 110" (main signals).

On the other hand, the time when the reproduction detecting part 62 detects the "reproduction authentication point 110" (refer to FIG. 12), which is output from the clock 63 shown in FIG. 11, is recorded as information of "detection time" (refer to FIG. 12) included in the "reproduction authentication point 110." The "detection time" in the "reproduction authentication point 110" is blank when embedded in an audio-visual program. The "detection time" detected later is recorded in the blank. It can be said that the "detection time" is the program reproduction time at which the audio-visual program was reproduced by the viewer. Also, the period for which the audio-visual program was reproduced by the viewer as a result of a reproduction operation by the audio-visual program viewer can be determined based on the program reproduction times recorded in the "detection time." Thus, the viewing analyzing part 66 can calculate the period for which the audio-visual program was reproduced by the viewer as a result of a reproduction operation by the viewer in a time section between at least two valid "reproduction authentication points 110" (the same holds true for the "valid reproduction authentication point 110" (main signal)). Also, the viewing analyzing part 66 can calculate at what reproduction speed (how many times of normal reproduction speed) the viewer viewed the audio-visual program by operating the reproducing part 61 by comparing the program running time of the audio-visual program recorded in the "reproduction authentication point 110" and the period for which the audio-visual program was reproduced by the viewer.

An example of calculation of the reproduction operation history of the viewer by the viewing analyzing part 66 shown in FIG. 11 is cited. For example, suppose that, in a time section between two "reproduction authentication points 110" (refer to FIG. 12) (the same holds true for "valid reproduction authentication points 110" (main signals)), the information encrypted and recorded in the information of "period (physics) information" included in the second (rearward) "reproduction authentication point 110" by the viewing authenticating principal is that "the placement period (physics) is 60 seconds" (the same holds true for "the placement period (physics) of valid reproduction authentication points 110 (main signal) is 60 seconds"). In this case, the program running time of the audio-visual program in the section between the two "reproduction authentication points 110" is 60 seconds. On the other hand, suppose that the interval between the times recorded in the "detection time" (refer to FIG. 12) included in two valid "reproduction authentication point 110" (that is, the period for which the program was reproduced by the viewer) is 30 seconds. In this case, the viewing analyzing part 66 can calculate a history of reproduction operation ("reproduction operation history") (reproduction speed) of the viewer about the audio-visual program indicating that the viewer reproduced and viewed the audio-visual program at double reproduction speed as a result of comparison between the program running time of the audio-visual program and the period for which the program was reproduced by the viewer.

Also, the viewing analyzing part 66 shown in FIG. 11 can refer to the information of "authentication ID," which is information included in the "reproduction authentication point 110" (refer to FIG. 12). An ascending serial number is assigned to every "reproduction authentication point 110" through one audio-visual program as the information of "authentication ID," which is information included in the "reproduction authentication point 110". Thus, the viewing analyzing part 66 can specify the parts of the audio-visual program reproduced and viewed by the viewer. Thus, the viewing analyzing part 66 can determine the reproduction speeds at which the viewer viewed an audio-visual program through the audio-visual program as a reproduction operation history of the viewer about the audio-visual program, such as "the viewer reproduced an audio-visual program having a program running time of 90 minutes at normal reproduction speed for first 30 minutes, at double reproduction speed for the next 30 minutes and at four times the normal reproduction speed for the last 30 minutes."

Also, in this embodiment, the viewing analyzing part 66 is configured to output a reproduction operation history of the viewer (for example, information that "the program was reproduced at double speed") in one-to-one relationship with the "reproduction authentication points 110" for each part of audio-visual program (program running time) defined by the "reproduction authentication points 110" (refer to FIG. 12) as information of "reproduction operation history (audio-visual terminal) 111a" (refer to FIG. 14). The pieces of information of "reproduction operation history (audio-visual terminal) 111a" can be individually distinguished based on the information of "authentication ID" given by the "reproduction authentication point 110" as in the case of the information of "reproduction authentication point 110." Thus, pieces of information of "reproduction operation history (audio-visual terminal) 111a" can be sequentially output in accordance with the pieces of information of "reproduction authentication point 110" regardless of the order in which the viewer views parts of the audio-visual program.

Thus, the viewing analyzing part 66 shown in FIG. 11 can calculate a history of reproduction operation of the viewer regardless of the order in which the "reproduction authentication points 110" (refer to FIG. 12) are detected even when the viewer first viewed the last 30-minute part of a 90-minute audio-visual program at double reproduction speed and then returned to the beginning of the audio-visual program and viewed the remaining 60-minute part of the audio-visual program at normal reproduction speed during the program reproduction period, for example.

In this embodiment, a "reproduction operation history (audio-visual terminal) 111a" (refer to FIG. 14) is created in one-to-one relationship with each of the "reproduction authentication points 110" (refer to FIG. 12) to create an information structure which allows easy communication between the audio-visual terminal 60 shown in FIG. 11 and the viewing authentication system 80 as a dedicated server of the viewing authenticating principal (refer to FIG. 16). In this embodiment, however, the viewing analyzing part 66 may be configured to create and output one "reproduction operation history" in one audio-visual program by gathering the pieces of information of "reproduction operation history (audio-visual terminal) 111a" created individually for each audio-visual program.

When the viewing analyzing part 66 of the audio-visual terminal 60 shown in FIG. 11 outputs the "reproduction operation history," a viewing analyzing part 85 (refer to FIG. 16), which is described in detail later, of the viewing authentication system 80 of the viewing authenticating principal (refer to FIG. 16) is unnecessary. Because what is necessary is that these functions are fulfilled by the audio-visual terminal 60 and the viewing authentication system 80 in conjunction with each other, the audio-visual terminal 60 and the viewing authentication system 80 may divide these functions between them as appropriate. However, the audio-visual terminal 60 and the viewing authentication system 80 may be configured to perform similar information processing for mutual verification of the information processing.

Also, the viewing authenticating part 67 shown in FIG. 11 is an information processing device for authenticating that the viewer has viewed an audio-visual program at a reproduction speed within a predetermined range for a predetermined period of time based on the "reproduction operation history (audio-visual terminal) 111a" (refer to FIG. 14) output from the viewing analyzing part 66. Also, the sending part 65 is configured to send the "viewing authentication (audio-visual terminal) 114a" (refer to FIG. 14) output from the viewing authenticating part 67 to the viewing authentication system 80 of the viewing authenticating principal (refer to FIG. 16).

The viewing authenticating part 67 shown in FIG. 11 recognizes the "authentication criteria" based on which the viewing authenticating principal authenticates the viewer's viewing of an audio-visual program with reference to the information of "authentication criteria" given by the viewing authenticating principal and included in the "reproduction authentication point 110" (refer to FIG. 12). In this embodiment, the information of "maximum reproduction speed" and "minimum reproduction period" is given as the "authentication criteria" ("requiring the viewer to view an audio-visual program at a reproduction speed equal to or slower than the double reproduction speed for at least 60 minutes in terms of the program running time"). The "authentication criteria" may be arbitrarily decided as long as they are sufficiently reasonable to authenticate viewer's viewing of an audio-visual program.

Referring now to FIG. 14, the information that is sent from the sending part 65 (refer to FIG. 11) of the audio-visual terminal 60 (refer to FIG. 11) to the viewing authentication system 80 (refer to FIG. 16) is described. The information sent from the audio-visual terminal 60 to the viewing authentication system 80 is recorded as an information included in "authentication record 115" by the authentication recording part 92 (refer to FIG. 16) of the viewing authentication system 80. In the "authentication record 115," the information of "authentication ID," "reproduction authentication point 110," "reproduction operation history 111," "reception time 112," "recorded time 113" and "viewing authentication 114" is recorded. The "authentication record 115" may consist of other types of information than those shown in FIG. 14.

As for the information of "authentication ID" included in the "authentication record 115" shown in FIG. 14, an "authentication ID" is attached to each piece of "reproduction authentication point 110" (refer to FIG. 12 and FIGS. 13A-13D) sent back from the audio-visual terminal 60 operated by the viewer (refer to FIG. 11) prior to authentication recording. Because the viewing authenticating principal make an authenticity judgment on each piece of the "reproduction authentication point 110" sent back from the viewer, it can be said that the "authentication ID" is provided for each of authenticity judgment made by the viewing authenticating principal. The viewing authenticating principal can authenticate that the viewer has viewed the audio-visual program by analyzing the information included in the "reproduction authentication point 110" and gathered for each "authentication ID."

In the information of "reproduction authentication point 110" included in the "authentication record 115" shown in FIG. 14, the information of "reproduction authentication point 110" (refer to FIG. 12 and FIGS. 13A-13D) sent back from the viewer is recorded without any change. The viewing authenticating principal can authenticate that the viewer has viewed the audio-visual program by analyzing the information included in the "reproduction authentication point 110."

In the information of "reproduction operation history 111" included in the "authentication record 115" shown in FIG. 14, the "reproduction operation history (audio-visual terminal) 111a" sent from the audio-visual terminal 60 (refer to FIG. 11) is recorded. The viewing authenticating principal can recognize the reproduction operation by the viewer on the audio-visual program with reference to the "reproduction operation history (audio-visual terminal) 111a."

In the information of "reception time 112" included in the "authentication record 115" shown in FIG. 14, the time when the "reproduction authentication point 110" (refer to FIG. 12 and FIGS. 13A-13D) sent from the audio-visual terminal 60 operated by the viewer (refer to FIG. 11) was received by receiving part 83 (refer to FIG. 16), which is output from the clock 84 (refer to FIG. 16) of the viewing authentication system 80 (refer to FIG. 16), is recorded. The viewing authentication system 80 can authenticate the viewer's viewing of the audio-visual program based on the "times when the reproduction authentication points 110 were received" as described in detail later.

In the information of "recorded time 113" included in the "authentication record 115" shown in FIG. 14, the "times when the reproduction authentication points 110 (refer to FIG. 12 and FIGS. 13A-13D) were detected" by the reproduction detecting part 62 (refer to FIG. 11), which were output from the clock 63 (refer to FIG. 11) and which have been recorded by the recording part 64 (refer to FIG. 11) of the audio-visual terminal 60 (refer to FIG. 11), and which are received by the receiving part 83 (refer to FIG. 16) of the viewing authentication system 80 (refer to FIG. 16), are recorded. The viewing authentication system 80 can authenticate the viewer's viewing of the audio-visual program based on the "times when the reproduction authentication points 110 were detected," which have been recorded by the audio-visual terminal 60 as described in detail later.

In the information of "viewing authentication" included in the "authentication record 115" shown in FIG. 14, the "viewing authentication (audio-visual terminal) 114a" based on the "reproduction operation history 111a" sent from the audio-visual terminal 60 (refer to FIG. 11) is recorded. The viewing authenticating principal can authenticate the viewer's viewing of the audio-visual program base on the "viewing authentication (audio-visual terminal) 114a" based on the "reproduction operation history 111a."

When the viewing authenticating part 67 (refer to FIG. 11) of the audio-visual terminal 60 (refer to FIG. 11) outputs the "viewing authentication," the viewing authenticating part 86 (refer to FIG. 16) of the viewing authentication system 80 of the viewing authenticating principal (refer to FIG. 16), which is described in detail later, is unnecessary. Because what is necessary is that these functions are fulfilled by the audio-visual terminal 60 and the viewing authentication system 80 in conjunction with each other, the audio-visual terminal 60 and the viewing authentication system 80 may divide these functions between them as appropriate. However, the audio-visual terminal 60 and the viewing authentication system 80 may be configured to perform similar information processing for mutual verification of the information processing.

Figure 18:
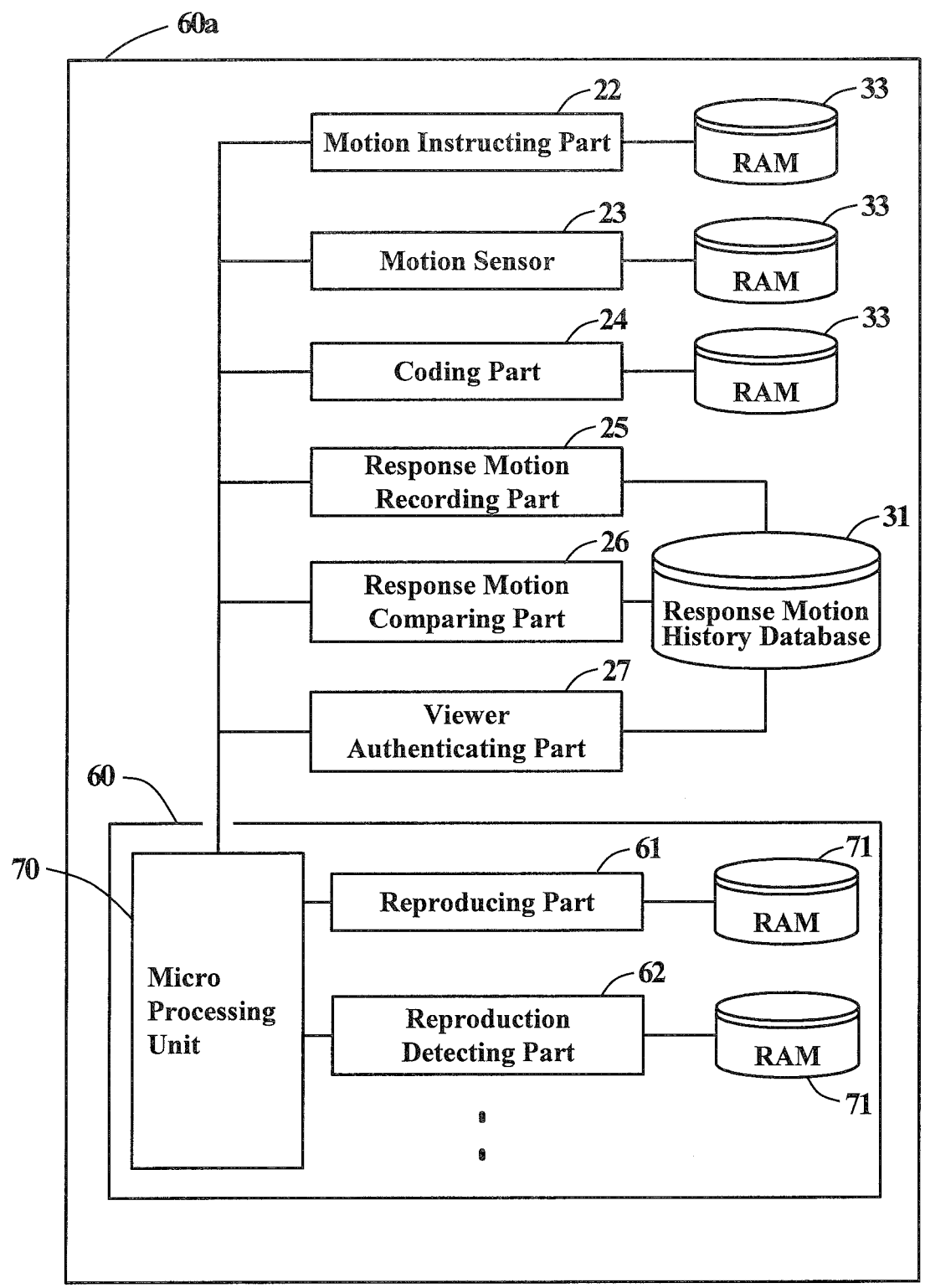
FIG. 18 is a block diagram illustrating an example of the construction of an audio-visual terminal according to another embodiment of the present invention.

Also, in another embodiment shown in FIG. 18, an audio-visual terminal 60a can be constructed by incorporating the functions of the audio-visual terminal 20 (refer to FIG. 1) in the audio-visual terminal 60 (refer to FIG. 11). In this case, the audio-visual terminal 60a may further include the motion instructing part 22, the motion sensor 23 and the coding part 24 included in the audio-visual terminal 20. Alternatively, the audio-visual terminal 60a may further include the response motion recording part 25, the response motion comparing part 26, the viewer authenticating part 27 and the response motion history database 31. The description of the function and configuration of each device of the audio-visual terminal 60 and the audio-visual terminal 20 necessary to incorporate the functions of the audio-visual terminal 20 in the audio-visual terminal 60 has already been made in detail. The viewing authenticating principal can perform strict viewing authentication without frequently requesting the viewer to make a predetermined motion when the audio-visual program viewer reproduces and views an audio-visual program with the audio-visual terminal 60a.

Thus, the viewing authenticating principal does not have to request the viewer to make a response motion frequently to perform viewing authentication. For example, when the viewer uses the audio-visual terminal 60a to view an audio-visual program, the viewing authenticating principal can reduce the number of viewing authentications made by requesting the viewer to make a predetermined motion to three or so, one at the beginning of the audio-visual program, one in the middle of the program running time of the audio-visual program and one at the end of the audio-visual program.

On the other hand, when the viewer uses the audio-visual terminal 60a shown in FIG. 18, the viewing authenticating principal can perform stricter viewing authentication than that using only the "reproduction authentication points 110" (refer to FIG. 12 and FIGS. 13A-13D) because the viewing authenticating principal can perform viewing authentication by requesting the viewer to make a predetermined motion in addition to viewing authentication using the "reproduction authentication points 110."

Figure 15:
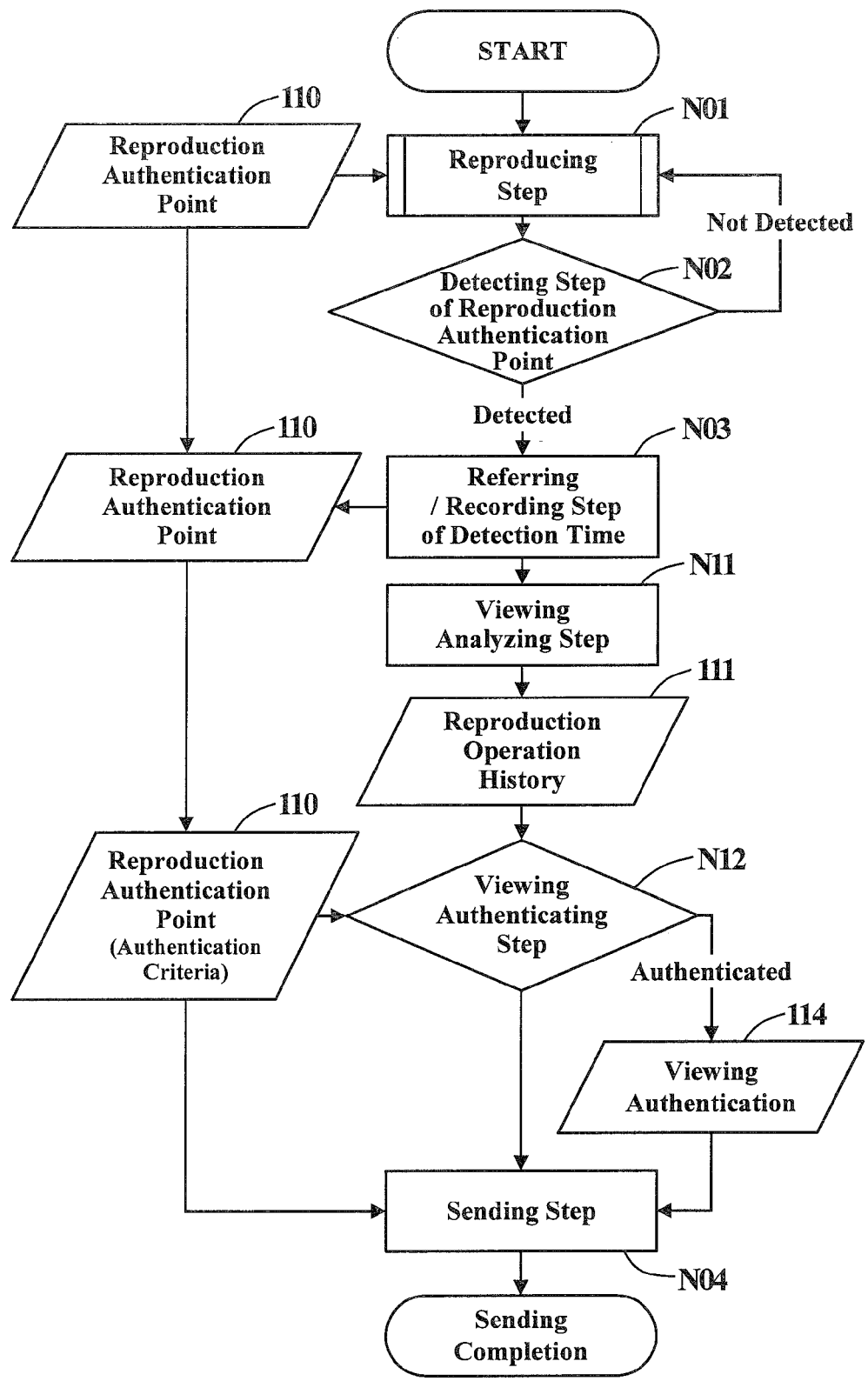
FIG. 15 is a flowchart illustrating an example of execution steps of a control program for controlling the audio-visual terminal according to the third embodiment of the present invention.

Referring now to FIG. 15, a control program for controlling the audio-visual terminal 60 (refer to FIG. 11) is described. The microprocessor (Micro Processing Unit) 70 (refer to FIG. 11) of the audio-visual terminal 60 is configured to execute steps according to the control program for controlling the audio-visual terminal 60 in the order shown in a flowchart shown in FIG. 15 illustrating an execution procedure of the program for controlling the audio-visual terminal 60. Because the details of the functions of the reproducing part 61, the reproduction detecting part 62, the clock 63, the recording part 64, the sending part 65, the viewing analyzing part 66, the viewing authenticating part 67 (refer to FIG. 11) have been already described, redundant description is omitted.

The control program shown in FIG. 15 performs to reproduce and present an audio-visual program to the viewer, using the reproducing part 61 (refer to FIG. 11) according to an operation of the viewer on the audio-visual terminal 60 (refer to FIG. 11), first (step N01). Next, the control program performs to detect the "reproduction authentication points 110" (refer to FIG. 12 and FIGS. 13A-13D) as signals for defining the program running time provided in the audio-visual program at a predetermined time interval by the audio-visual program provider in the audio-visual program reproduced as a result of a reproduction operation by the viewer, using the reproduction detecting part 62 (refer to FIG. 11) (step N02). Next, the control program performs to output the "times when the reproduction authentication points 110 were detected" by the reproduction detecting part 62, using the clock 63 (refer to FIG. 11). Also, the control program performs to record the "times when the reproduction authentication points 110 were detected" in the "reproduction authentication point 110" (step N03). Next, the control program performs to send the "reproduction authentication points 110" detected by the reproduction detecting part 62 and the "times when the reproduction authentication points 110 were detected," which are output from the clock 63, to the viewing authentication system 80 of the viewing authenticating principal (refer to FIG. 16), using the sending part 65 (refer to FIG. 11), for transmission to the viewing authenticating principal, which authenticates that the viewer is normally viewing the audio-visual program (step N04).

The execution control operation for the audio-visual terminal 60 (refer to FIG. 11) with the control program shown in FIG. 15 is configured to include supplementary control steps in addition to the primary execution steps described above. First, the step of outputting a "reproduction operation history (audio-visual terminal) 111a" (refer to FIG. 14) as a history of reproduction operation of the viewer, using the viewing analyzing part 66 (refer to FIG. 11) (step N11) is provided in the control program. Also provided is the step of authenticating the viewer's viewing of the audio-visual program based on the "reproduction operation history (audio-visual terminal) 111a" analyzed by the viewing analyzing part 66 and outputting a "viewing authentication (audio-visual terminal) 114a" (refer to FIG. 14), using the viewing authenticating part 67 (refer to FIG. 11) (step N12).

Alternatively, in another embodiment, a control program (not shown) obtained by incorporating the control operation which is performed by the control program (refer to FIG. 7) for controlling the audio-visual terminal 20 (refer to FIG. 1) in the control program for controlling the audio-visual terminal 60 (refer to FIG. 11) shown in FIG. 15 is configured to be able to control the audio-visual terminal 60a (refer to FIG. 18) obtained by incorporating the functions of the audio-visual terminal 20 in the audio-visual terminal 60. Description of the control operation which the program for controlling the audio-visual terminal 60 and the audio-visual terminal 20 needs to perform when a control program for controlling the audio-visual terminal 20 is incorporated in a control program for controlling the audio-visual terminal 60 has already been made in detail. In this case, when the viewer reproduces and views an audio-visual program with the audio-visual terminal 60a controlled by this control program, the viewing authenticating principal can perform strict viewing authentication without frequently requesting the viewer to make a predetermined motion as described previously.

Description is next made of the viewing authentication system 80 according to a third embodiment of the present invention with reference to FIG. 16. The viewing authentication system 80 includes a reproduction authentication point setting part 81, a program sending part 82, a receiving part 83, a clock 84, a viewing analyzing part 85, a viewing authenticating part 86, a program database 91 and an authentication recording part 92. The viewing authentication system 80 also includes a central processing unit (CPU) 90 as a control device for controlling the viewing authentication system 80. Each of the receiving part 83, the clock 84, the viewing analyzing part 85 and the viewing authenticating part 86 is provided with a random access memory (RAM) 93 for assisting its function. The details of the function of each device of the viewing authentication system 80 are described in sequence below.

The viewing authentication system 80 shown in FIG. 16 is, just like the viewing authentication system 40 (refer to FIG. 8) as discussed previously, a dedicated server of the viewing authenticating principal connected to a WAN. Also, the viewing authentication system 80 is configured to present, just like the viewing authentication system 40 as discussed previously, a dedicated "information service web page" (not shown) through which the outline of audio-visual programs and so on can be transmitted to the audio-visual program viewer, and identify the correct viewer using the information of both a "viewer ID" (refer to FIG. 12) and a "password" unique to the "viewer ID" (simple viewer authentication information) (not shown) in response to a "program sending request 100" (refer to FIG. 17) sent from the viewer.

Also, the reproduction authentication point setting part 81 shown in FIG. 16 is an information processing device for providing "reproduction authentication points 110" (refer to FIG. 12) for defining the program running time of the audio-visual program at predetermined intervals (refer to FIGS. 13A-13D) in an audio-visual program provided by the audio-visual program provider and recorded in the program database 91. The reproduction authentication point setting part 81 is configured to insert the information of "reproduction authentication points 110" into the information of the audio-visual program in a predetermined program running time of the audio-visual program, and encrypt and record the information of the program running time defined by the "reproduction authentication points 110" provided in the information of "period (physics) information" included in the "reproduction authentication point 110." The audio-visual program in which "reproduction authentication points 110" are provided by the reproduction authentication point setting part 81 is recorded in the program database 91 again.

Also, the program sending part 82 shown in FIG. 16 is, just like the program sending part 41 (refer to FIG. 8) of the viewing authentication system 40 (refer to FIG. 8) discussed previously, a streaming server connected to a WAN, configured to send an audio-visual program provided by the program provider and recorded in the program database 91 as a large-capacity storage device (hard disk) to the audio-visual terminal 60 operated by the viewer (refer to FIG. 11) in response to a "program sending request 100" (refer to FIG. 17) sent from the (correct) viewer identified by means of a "viewer ID" (refer to FIG. 12) and a "password" unique to the "viewer ID" (simple viewer authentication information) (not shown).

Also, the receiving part 83 shown in FIG. 16 is configured to receive the information of "reproduction authentication points 110" (refer to FIG. 12 and FIGS. 13A-13D) detected by the reproduction detecting part 62 (refer to FIG. 11) of the audio-visual terminal 60 when the viewer reproduces the audio-visual program with the audio-visual terminal 60 and sent back to the viewing authentication system 80 by the sending part 65 (refer to FIG. 11) of the audio-visual terminal 60 (refer to FIG. 11). The receiving part 83 is an information communication instrument (high-speed wired information communication instrument (router)) connected to a WAN.

Also, the clock 84 shown in FIG. 16 is configured to output the "times when the reproduction authentication points 110 (refer to FIG. 12 and FIGS. 13A-13D) were received" ("reception time 112") (refer to FIG. 14) by the receiving part 83. Because the "times when the reproduction authentication points 110 were received" ("reception time 112") can be considered to be approximately the times when the audio-visual program was reproduced by the audio-visual terminal 60 operated by the viewer (refer to FIG. 11), the viewing authenticating principal can authenticate the times when the audio-visual program was reproduced by the audio-visual terminal 60 operated by the viewer and the period for which the audio-visual program was reproduced based on the reproduction times of the audio-visual program from the "times when the reproduction authentication points 110 were received" ("reception time 112"), which are output from the clock 84.

The authentication recording part 92 as a large-capacity storage device (hard disk) shown in FIG. 16 is configured to record the information of the "reproduction authentication points 110" (refer to FIG. 12) and the information of the "times when the reproduction authentication points 110 were received" by the receiving part 83 ("reception time 112") (refer to FIG. 14), which are output from the clock 84, as information included in the "authentication record 115" (refer to FIG. 14).

The receiving part 83 shown in FIG. 16 is also configured to receive the "times when the reproduction authentication points 110 (refer to FIG. 12 and FIGS. 13A-13D) were detected" recorded by the audio-visual terminal 60 operated by the viewer (the times recorded in the "detection time"

(refer to FIG. 12) included in the "reproduction authentication point 110") for a case that the audio-visual terminal 60 operated by the viewer (refer to FIG. 11) cannot be connected to a high-speed information communication network for information communication. Also, the authentication recording part 92 is configured to record the "times when the reproduction authentication points 110 were detected" recorded by the audio-visual terminal 60 in the "authentication record 115" (refer to FIG. 14) (the times recorded in the "detection time" included in the "reproduction authentication point 110").

Because any record of the times when the audio-visual terminal 60 operated by the viewer handled the reproduction authentication points 110 (refer to FIG. 12 and FIGS. 13A-13D) from which the times when the viewer reproduced the audio-visual program with the audio-visual terminal 60 (refer to FIG. 11) can be presumed can be used for viewing authentication by the viewing authenticating principal in addition to the "detection time" (refer to FIG. 12), viewing authentication may be performed based on the "times when the reproduction authentication points 110" were recorded by the audio-visual terminal 60 ("recorded time 113" (refer to FIG. 14)).

The viewing analyzing part 85 shown in FIG. 16 is also configured to analyze a reproduction operation history of the viewer from at least two of the "times when the reproduction authentication points 110 (refer to FIG. 12) were received" ("reception times 112") (refer to FIG. 14) by the receiving part 83, which are output from the clock 84, as in the case of the viewing analyzing part 66 (refer to FIG. 11) of the audio-visual terminal 60 (refer to FIG. 11) discussed previously, for a case that the audio-visual terminal 60 operated by the viewer is connected to a high-speed information communication network for information communication. The authentication recording part 92 is also configured to record the "reproduction operation history (viewing authentication system) 111b" (refer to FIG. 14) analyzed by the viewing analyzing part 85 in the "authentication record 115" (refer to FIG. 14).

When the viewing authentication system 80 shown in FIG. 16 has the viewing analyzing part 85, the viewing analyzing part 66 (refer to FIG. 11) may not be included in the audio-visual terminal 60 (refer to FIG. 11). Because what is necessary is that these functions are fulfilled by the viewing authentication system 80 and the audio-visual terminal 60 in conjunction with each other, the viewing authentication system 80 and the audio-visual terminal 60 may divide these functions between them as appropriate. However, the viewing authentication system 80 and the audio-visual terminal 60 may perform similar information processing for mutual verification of the information processing.

Also, the viewing analyzing part 85 shown in FIG. 16 is configured to be able to analyze a history of reproduction operation of the viewer from at least two of the "times when the reproduction authentication points 110 (refer to FIG. 12 and FIGS. 13A-13D) were detected" recorded by the audio-visual terminal 60 operated by the viewer (the "times recorded in the "detection time" included in the reproduction authentication point 110" (refer to FIG. 12)) for a case that the audio-visual terminal 60 (refer to FIG. 11) operated by the viewer cannot be connected to a high-speed information communication network for information communication. The authentication recording part 92 is also configured to record the "reproduction operation history (viewing authentication system) 111c" (refer to FIG. 14) analyzed by the viewing analyzing part 85.

Thus, the viewing analyzing part 85 shown in FIG. 16 can calculate a "reproduction operation history (viewing authentication system) 111c" (refer to FIG. 14) of the viewer based on the "reproduction authentication points 110" (refer to FIG. 12 and FIGS. 13A-13D) recorded in the recording part 64 (refer to FIG. 11) of the audio-visual terminal 60 operated by the viewer (refer to FIG. 11) and the "times when the reproduction authentication points 110 were detected" recorded by the audio-visual terminal 60 (the times recorded in the "detection time" included in the "reproduction authentication point 110" (refer to FIG. 12)). The "times when the reproduction authentication points 110 were detected" ("detection time") recorded by the audio-visual terminal 60 can be received at a time by the receiving part 83 of the viewing authentication system 80 in response to sending of information from the viewer by manually operating the audio-visual terminal 60 when the audio-visual terminal 60 operated by the viewer is connected to a high-speed information communication network for information communication after the viewer has viewed an audio-visual program with the audio-visual terminal 60 via a broadcast or reproducible recording medium.

The authentication recording part 92 shown in FIG. 16 not only can record the "reproduction operation histories (viewing authentication system) 111b and 111c" (refer to FIG. 14) output from the viewing analyzing part 85 but also can record the "reproduction operation history (audio-visual terminal) 111a" (refer to FIG. 14, which is output from the viewing analyzing part 66 (refer to FIG. 11) of the audio-visual terminal 60 and sent by the sending part 65 (refer to FIG. 11) of the audio-visual terminal 60 operated by the viewer (refer to FIG. 11) and received by the receiving part 83 of the viewing authentication system 80 as information included in the "authentication record 115" (refer to FIG. 14).

Also, the viewing authenticating part 86 shown in FIG. 16 is an information processing device, just like the viewing authenticating part 67 of the audio-visual terminal 60 (refer to FIG. 11), for authenticating that the viewer has viewed an audio-visual program at a reproduction speed within a predetermined range for a predetermined period of time based on the "reproduction operation history (audio-visual terminal) 111a" (refer to FIG. 14) and the "reproduction operation histories (viewing authentication system) 111b and 111c" (refer to FIG. 14) included in the "authentication record 115". The "viewing authentication (viewing authentication system) 114b" (refer to FIG. 14) output from the viewing authenticating part 86 is configured to be able to be recorded as information included in the "authentication record 115" (refer to FIG. 14) by the authentication recording part 92.

When the viewing authentication system 80 shown in FIG. 16 has the viewing authenticating part 86, the viewing authenticating part 67 (refer to FIG. 11) in the audio-visual terminal 60 (refer to FIG. 11) is unnecessary. Because what is necessary is that these functions are fulfilled by the viewing authentication system 80 and the audio-visual terminal 60 in conjunction with each other, the viewing authentication system 80 and the audio-visual terminal 60 may divide these functions between them as appropriate. However, the viewing authentication system 80 and the audio-visual terminal 60 may perform similar information processing for mutual verification of the information processing.

Figure 19:
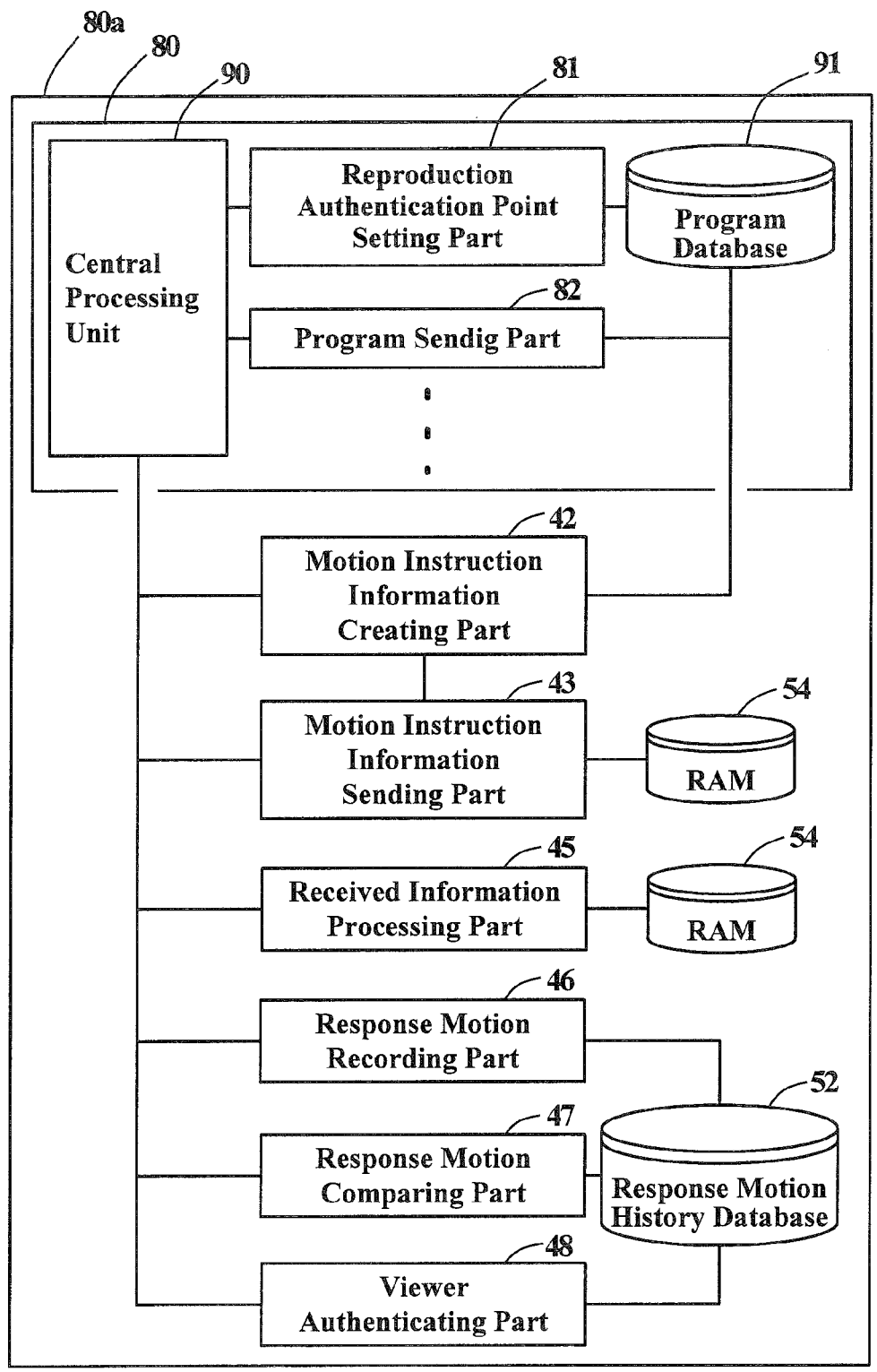
FIG. 19 is a block diagram illustrating an example of the construction of a viewing authentication system according to another embodiment of the present invention.

Also, in another embodiment shown in FIG. 19, a viewing authentication system 80a can be constructed by incorporating the functions of the viewing authentication system 40 (refer to FIG. 8) in the viewing authentication system 80 (refer to FIG. 16). In this case, the viewing authentication system 80a may further include the motion instructing information creating part 42, the motion instruction information sending part 43 and the received information processing part 45 included in the viewing authentication system 40. Alternatively, the viewing authentication system 80a may further include the response motion recording part 46, the response motion comparing part 47, the viewer authenticating part 48 and the response motion history database 52 (refer to FIG. 8). The description of the function and configuration of each device of the viewing authentication system 80 and the viewing authentication system 40 necessary to incorporate the functions of the viewing authentication system 40 in the viewing authentication system 80 has already been made in detail. The viewing authenticating principal can perform strict viewing authentication without frequently requesting the viewer to make a predetermined motion when the viewing authentication system 80a performs to authenticate the viewer's viewing of the audio-visual program.

Figure 17:
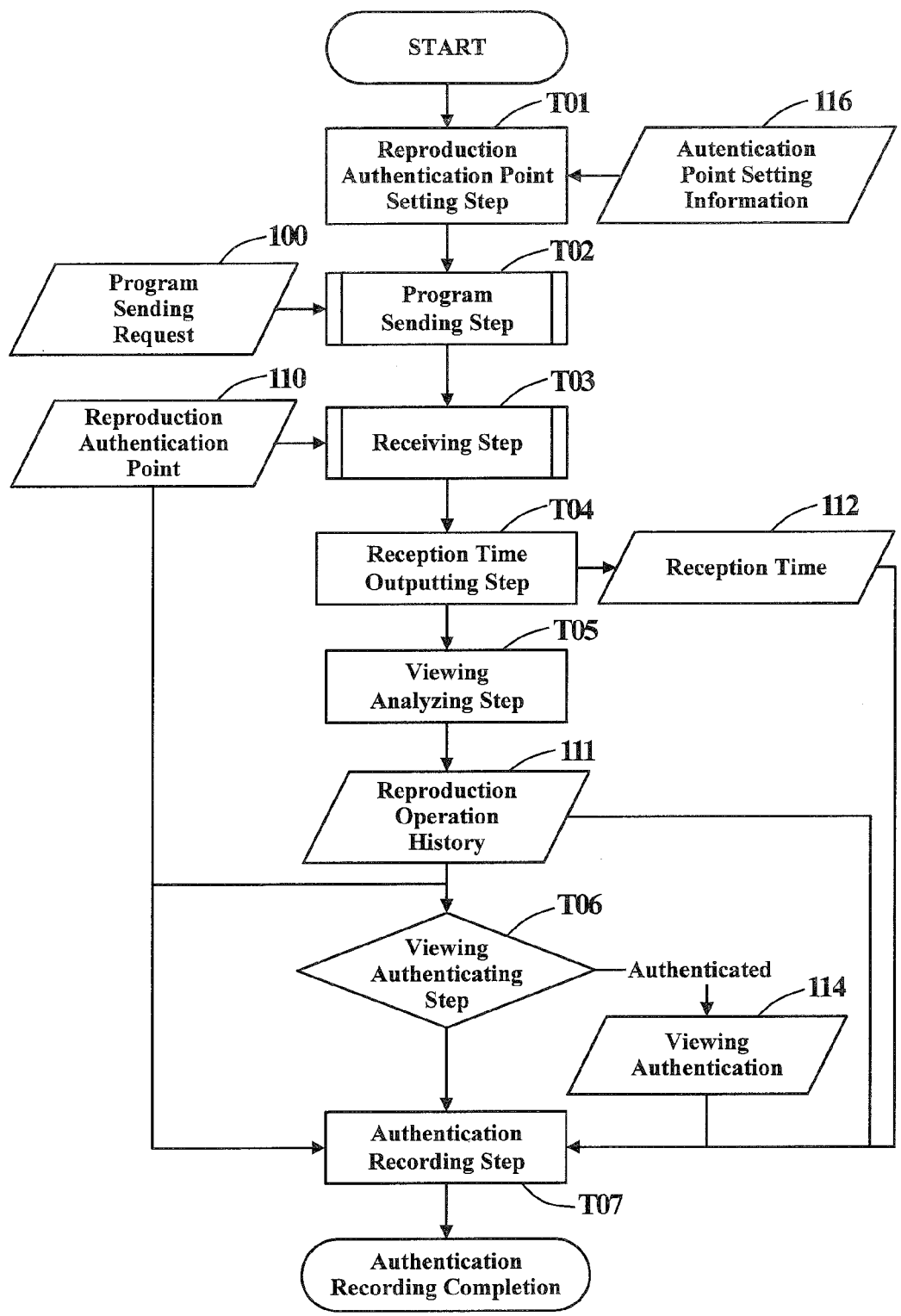
FIG. 17 is a flowchart illustrating an example of execution steps of a control program for controlling the viewing authentication system according to the third embodiment of the present invention.

Referring now to FIG. 17, a control program for controlling the viewing authentication system 80 (refer to FIG. 16) is described. The central processing unit (CPU) 90 (refer to FIG. 16) of the viewing authentication system 80 is configured to execute steps according to the control program for controlling the viewing authentication system 80 in the order shown in a flowchart shown in FIG. 17 illustrating an execution procedure of the program for controlling the viewing authentication system 80. Because the details of the functions of the reproduction authentication point setting part 81, the program sending part 82, the receiving part 83, the clock 84, the viewing analyzing part 85, the viewing authenticating part 86, the program database 91 and the authentication recording part 92 (refer to FIG. 16) have been already described, redundant description is omitted.

The control program shown in FIG. 17 performs to provide "reproduction authentication points 110" (refer to FIG. 12 and FIGS. 13A-13D) as signals for defining the program running time of the audio-visual program at predetermined time intervals in an audio-visual program, using the reproduction authentication point setting part 81 (refer to FIG. 16), first (step T01). Next, the control program performs to send the audio-visual program to the audio-visual terminal 60 operated by the viewer (refer to FIG. 11), using the program sending part 82 (refer to FIG. 16) (step T02). Next, the control program performs to receive the "reproduction authentication points 110," which are detected as a result of reproducing the audio-visual program when the viewer reproduces the audio-visual program by operating the audio-visual terminal 60 and sent from the audio-visual terminal 60 operated by the viewer, using the receiving part 83 (refer to FIG. 16) (step T03). Next, the control program performs to output the "times when the reproduction authentication points 110 were received" (refer to FIG. 14) by the receiving part 83, using the clock 84 (refer to FIG. 16) (step T04). Next, the control program performs to record the "reproduction authentication points 110" and the "times when the reproduction authentication points 110 were received" by the receiving part 83, using the authentication recording part 92 (refer to FIG. 16) (step T07). It is needless to say that the execution control operation in the viewing authentication system 80 may include supplementary control or execution steps in addition to the primary execution steps described above.

Also, the control program shown in FIG. 17 is configured to include the step of analyzing the history of reproduction operation of the viewer and outputting the "reproduction operation histories (viewing authentication system) 111b and 111c" (refer to FIG. 14), using the viewing analyzing part 85 (refer to FIG. 16) (step T05), and the step of authenticating the viewer's viewing of the audio-visual program and outputting a "viewing authentication (viewing authentication system) 114b" (refer to FIG. 14), using the viewing authenticating part 86 (refer to FIG. 16) (step T06).

Also in another embodiment, the viewing authentication system 80a (refer to FIG. 19) constructed by incorporating the functions of the viewing authentication system 40 in the viewing authentication system 80 can be controlled by means of a control program (not shown) obtained by incorporating the control operation of the control program (refer to FIG. 10) performs to control the viewing authentication system 40 (refer to FIG. 8) in the control program for controlling the viewing authentication system 80 (refer to FIG. 16) shown in FIG. 17. Description of the control operation which the program for controlling the viewing authentication system 80 and the viewing authentication system 40 needs to perform when a control program for controlling the viewing authentication system 40 is incorporated in a control program for controlling the viewing authentication system 80 has already been made in detail. In this case, the viewing authenticating principal can perform strict viewing authentication with the viewing authentication system 80a controlled by this control program without frequently requesting the viewer to make a predetermined motion as described previously.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 video material for program
2 broadcast station 3 broadcast satellite
4 satellite broadcasting receiving tuner
5 TV set
8 communication line
12 response sheet
13 facsimile machine
14 postal service
15 remote education control center
20 audio-visual terminal
20a audio-visual terminal
21 reproducing part
22 motion instructing part
23 motion sensor
24 coding part
24a motion authenticating part
24b response authenticating part
24c time authenticating part
25 response motion recording part
26 response motion comparing part
27 viewer authenticating part
28 clock
29 sending part
30 microprocessor (Micro Processing Unit)
31 response motion history database
32 recording part
33 random access memory (RAM)
35 touch screen detecting part
40 viewing authentication system
41 program sending part
42 motion instruction information creating part
43 motion instruction information sending part
44 receiving part
45 received information processing part
45a motion analyzing/specifying part
45b motion authenticating part
45c first time authenticating part
45d second time authenticating part
46 response motion recording part
47 response motion comparing part
48 viewer authenticating part
49 clock
50 central processing unit (CPU)
51 program database
52 response motion history database
53 authentication recording part
54 random access memory (RAM)
60 audio-visual terminal
60a audio-visual terminal
61 reproducing part
62 reproduction detecting part
63 clock
64 recording part
65 sending part
66 viewing analyzing part
67 viewing authenticating part
70 microprocessor (Micro Processing Unit)
71 random access memory (RAM)
80 viewing authentication system
80a viewing authentication system
81 reproduction authentication point setting part
82 program sending part
83 receiving part
84 clock
85 viewing analyzing part
86 viewing authenticating part
90 central processing unit (CPU)
91 program database
92 authentication recording part
93 random access memory (RAM)
100 program sending request
101 motion instruction information
102 motion response information
103 motion authentication
103a motion authentication (audio-visual terminal)
103b motion authentication (viewing authentication system)
104 time authentication
104a time authentication based on a "period of time taken by the viewer to respond" (audio-visual terminal)
104b time authentication based on a "period of time taken to communicate with viewer" or "period of time taken by the viewer to respond" (viewing authentication system)
105 viewing authentication
105a viewing authentication based on a "motion response rate" (audio-visual terminal)
106 viewer authentication
106a viewer authentication (audio-visual terminal)
106b viewer authentication (viewing authentication system)
107 authentication record
110 reproduction authentication point
111 reproduction operation history
111a reproduction operation history (audio-visual terminal)
111b reproduction operation history based on "reception times" (viewing authentication system)
111c reproduction operation history based on recorded times (viewing authentication system)
112 reception time
113 recorded time
114 viewing authentication
114a viewing authentication based on "reproduction operation history" (audio-visual terminal)
114b viewing authentication based on "reproduction operation history" (viewing authentication system)
115 authentication record
116 authentication point setting information

What is claimed is:
1. A viewing authentication system for authenticating that a viewer of an audio-visual program is normally viewing the audio-visual program, the viewing authentication system comprising:
a microprocessing unit,
the microprocessing unit configured to:
send the audio-visual program to an audio-visual terminal operated by the viewer in response to a request from the viewer;
create motion instruction information unique to the audio-visual program which consists of information with which a program provider that provides the audio-visual program requests the viewer to make a predetermined motion at times unique to the audio-visual program;
send the motion instruction information to the audio-visual terminal operated by the viewer;
receive information about a response motion of the viewer which is obtained from a detection result detected by a motion sensor of the audio-visual terminal and which is output from the audio-visual terminal operated by the viewer and sent back to transmit the fact that the viewer is normally viewing the audio-visual program;
process the received information about a response motion of the viewer into information for use in authenticating that the viewer has viewed the audio-visual program; and
record the information for use in authenticating that the viewer has viewed the audio-visual program output from the viewing authentication system to authenticate that the viewer has viewed the audio-visual program; and analyze the received information about a response motion of the viewer to specify the response motion of the viewer.

2. The viewing authentication system according to claim 1, wherein the microprocessing unit is further configured to output a motion authentication which determines that the response motion of the viewer is a valid response motion when the response motion of the viewer obtained from a detection result detected by the motion sensor of the audio-visual terminal and the motion instructed by the motion instruction information are determined to agree with each other in the light of predetermined criteria.

3. The viewing authentication system according to claim 1, further comprising a clock for outputting the times when the viewing authentication system performs a control operation;

wherein microprocessing unit is further configured to, when the period of time taken to communicate with the viewer from the time when the motion instruction information is sent, which is output from the clock, to the time when information about a response motion of the viewer obtained from a detection result detected by the motion sensor of the audio-visual terminal operated by the viewer and sent from the audio-visual terminal was received, which is output from the clock, is within a predetermined time range, outputs a time authentication based on a period of time taken to communicate with the viewer that determines the period of time taken to communicate with the viewer to be appropriate.

4. The viewing authentication system according to claim 1, wherein the microprocessing unit is further configured to, when the period of time taken by the viewer to respond from the time when the audio-visual terminal instructed the viewer to make the motion, which is output from a clock of the audio-visual terminal operated by the viewer, to the time when the response motion of the viewer was detected by the motion sensor of the audio-visual terminal, which is output from the clock of the audio-visual terminal operated by the viewer, is within a predetermined time range, outputs a time authentication based on a period of time taken by the viewer to respond that determines the period of time taken by the viewer to respond to be appropriate.

5. The viewing authentication system according to claim 1 wherein:

the microprocessor unit is further configured to record detection results detected by the motion sensor of the audio-visual terminal operated by the viewer and received as a response motion history;

compare the detection result detected last by the motion sensor and detection results except the detection result detected last by the motion sensor in the response motion history recorded by the response motion recording part; and output a viewer authentication which authenticates the viewer as the correct viewer to whom the program provider of the audio-visual program is supposed to provide the audio-visual program when the detection result detected last by the motion sensor is determined to agree with the other detection results included in the response motion history in the light of predetermined criteria based on a result of comparison.

6. The viewing authentication system according to claim 1, wherein the microprocessing unit is configured to create touch instruction information unique to the audio-visual program and consisting of information with which the program provider that provides the audio-visual program requests the viewer to make a predetermined touch at times unique to the audio-visual program;

to send the touch instruction information to the audio-visual terminal operated by the viewer;

to receive information about a touch of the viewer which is obtained from a detection result detected by a touch screen detecting part of the audio-visual terminal operated by the viewer and which is output from the audio-visual terminal and sent back to transmit the fact that the viewer is normally viewing the audio-visual program; and to process the received information about a touch of the viewer into information for use in authenticating that the viewer has viewed the audio-visual program.

7. A non-transitory computer readable medium with instructions stored thereon, that when executed by a processor, perform the steps of:

sending an audio-visual program to an audio-visual terminal operated by the viewer in response to a request from the viewer;

creating motion instruction information unique to an audio-visual program which consists of information with which a program provider that provides the audio-visual program requests the viewer to make a predetermined motion at times unique to the audio-visual program;

sending the motion instruction information to the audio-visual terminal operated by the viewer;

receiving information about a response motion of the viewer which is obtained from a detection result detected by a motion sensor of the audio-visual terminal and which is output from the audio-visual terminal operated by the viewer and sent back to transmit the fact that the viewer is normally viewing the audio-visual program;

processing the received information about a response motion of the viewer into information for use in authenticating that the viewer has viewed the audio-visual program;

analyzing the received information about a response motion of the viewer to specify the response motion of the viewer; and recording the information for use in authenticating that the viewer has viewed the audio-visual program output from the viewing authentication system to authenticate that the viewer has viewed the audio-visual program.

8. An audio-visual terminal operated by a viewer of an audio-visual program, the audio-visual terminal comprising:

a microprocessing unit, the microprocessing unit configured to:

reproduce the audio-visual program;

detect in the audio-visual program reproduced as a result of a reproduction operation by the viewer, reproduction authentication points as signals provided in the audio-visual program at predetermined time intervals by a program provider that provides the audio-visual program;

cause a clock for outputting the times when the reproduction authentication points were detected;

and sent for transmission to a viewing authenticating principal, which authenticates that the viewer is normally viewing the audio-visual program, the detected reproduction authentication points and the times when the reproduction authentication points were detected to a viewing authentication system of the viewing authenticating principal.

9. The audio-visual terminal according to claim 8, further comprising the microprocessing unit configured to analyze a reproduction operation history of the viewer from at least two of the times when the reproduction authentication points were detected and outputting the reproduction operation history; wherein the microprocessing unit configured to send the reproduction operation history output from the viewing analyzing part to the viewing authentication system of the viewing authenticating principal, for authentication of the viewing.

10. The audio-visual terminal according to claim 9, further comprising the microprocessing unit configured to output a viewing authentication based on a reproduction operation history which authenticates that the viewer has viewed the audio-visual program at a reproduction speed within a predetermined range for a predetermined period of time based on the reproduction operation history; wherein the sending part is also configured to send the viewing authentication based on a reproduction operation history output from the viewing authenticating part to the viewing authentication system of the viewing authenticating principal.

11. The audio-visual terminal according to claim 8, further comprising:
the microprocessing unit configured to instruct, based on motion instruction information unique to the audio-visual program with which a program provider that provides the audio-visual program requests the viewer to make a predetermined motion at times unique to the audio-visual program, the viewer to make the motion;
and to detect a response motion of the viewer made by the viewer for transmission to the viewing authenticating principal, which authenticates that the viewer is normally viewing the audio-visual program, every time the motion is instructed by the motion instructing part; and
a coding part for coding information about the response motion of the viewer obtained from a detection result detected by the motion sensor into a signal sendable by the sending part; and
wherein the sending part is configured to send information output from the audio-visual terminal to the viewing authentication system of the viewing authenticating principal, for obtaining an authentication of the viewing.

12. A non-transitory computer readable medium with instructions stored thereon, that when executed by a processor, perform the steps of:
reproducing and presenting an audio-visual program according to an operation of the viewer on the audio-visual terminal;
detecting, in the audio-visual program reproduced as a result of a reproduction operation by the viewer, reproduction authentication points as signals provided in the audio-visual program at predetermined time intervals by a program provider that provides the audio-visual program;
outputting the times when the reproduction authentication points were detected; and
sending, for transmission to a viewing authenticating principal, which authenticates that the viewer is normally viewing the audio-visual program, the detected reproduction authentication points and the times when the reproduction authentication points were detected to a viewing authentication system of the viewing authenticating principal.

13. A non-transitory computer readable medium as defined in to claim 12, perform the steps of:

instructing, based on motion instruction information unique to the audio-visual program with which the program provider that provides the audio-visual program requests the viewer to make a predetermined motion at times unique to the audio-visual program, the viewer to make the motion;
detecting a response motion of the viewer made by the viewer for transmission to the viewing authenticating principal, which authenticates that the viewer is normally viewing the audio-visual program, every time the motion is instructed, using a motion sensor;
cording information about the response motion of the viewer obtained from a detection result detected by the motion sensor into a signal sendable; and
sending information output from the audio-visual terminal to the viewing authentication system of the viewing authenticating principal, for obtaining a viewing authentication.

14. A viewing authentication system for authenticating that a viewer of an audio-visual program is normally viewing the audio-visual program, the viewing authentication system comprising:
a microprocessing unit, the microprocessing unit configured to:
provide reproduction authentication points as signals for defining the program running time of the audio-visual program in the audio-visual program at predetermined time intervals;
send the audio-visual program to an audio-visual terminal operated by the viewer in response to a request from the viewer;
receive the reproduction authentication points as signals provided in the audio-visual program at predetermined time intervals by a program provider that provides the audio-visual program and detected when the viewer reproduces the audio-visual program with the audio-visual terminal;
cause a clock for outputting the times when the reproduction authentication points were received by the receiving part; and
record the reproduction authentication points and the times when the reproduction authentication points were received, for authentication of the viewing.

15. The viewing authentication system according to claim 14, wherein the microprocessing unit configured to receive the reproduction authentication points and the times when the reproduction authentication points were detected by the audio-visual terminal, which are recorded by the audio-visual terminal operated by the viewer,
and the microprocessing unit configured to record the reproduction authentication points and the times when the reproduction authentication points were detected by the audio-visual terminal, which are recorded by the audio-visual terminal.

16. The viewing authentication system according to claim 14, comprising the microprocessing unit configured to analyze and output a history of reproduction operation of the viewer from at least two of the times when the reproduction authentication points were received; and also configured to record the reproduction operation history based on reception times output.

17. The viewing authentication system according to claim 15, comprising the microprocessing unit configured to analyze and output a history of reproducing operation of the viewer from at least two of the reproduction authentication points and the times when the reproduction authentication points were detected by the audio-visual terminal, which are recorded by the audio-visual terminal operated by the viewer; and also configured to record the reproduction operation history based on recorded times output.

18. The viewing authentication system according to claim 16,
comprising the microprocessing unit configured to output a viewing authentication based on the reproduction operation history which authenticates that viewer has viewed the audio-visual program at a reproduction speed within a predetermined range for a predetermined period of time based on the reproduction operation history; and also configured to record the viewing authentication based on the reproduction operation history output.

19. The viewing authentication system according to claim 14, comprising: the microprocessing unit configured to create motion instruction information unique to the audio-visual program which consists of information with which a program provider that provides the audio-visual program requests the viewer to make a predetermined motion at times unique to the audio-visual program;
send the motion instruction information to the audio-visual terminal operated by the viewer;
process the received information about a response motion of the viewer into information for use in authenticating that the viewer has viewed the audio-visual program; and
analyze the received information about a response motion of the viewer to specify the response motion of the viewer; and
receive the information about a response motion of the viewer which is obtained from a detection result detected by a motion sensor of the audio-visual terminal and which is output from the audio-visual terminal operated by the viewer and sent back to transmit the fact that the viewer is normally viewing the audio-visual program; and
record the information for use in authenticating that the viewer has viewed the audio-visual program output from the viewing authentication system to authenticate that the viewer has viewed the audio-visual program.

20. A non-transitory computer readable medium with instructions stored thereon, that when executed by a processor, perform the steps of:
providing reproduction authentication points as signals for defining a program running time of an audio-visual program in the audio-visual program at predetermined time intervals;
sending the audio-visual program to an audio-visual terminal operated by the viewer in response to a request from the audio-visual terminal;
receiving the reproduction authentication points as signals provided in the audio-visual program at predetermined time intervals by a program provider that provides the audio-visual program and detected when the viewer reproduces the audio-visual program with the audio-visual terminal, from the audio-visual terminal operated by the viewer;
outputting the times when the reproduction authentication points were received; and
recording the reproduction authentication points and the times when the reproduction authentication points were received, for authentication of the viewing.

21. A non-transitory computer readable medium as defined in claim 20, perform the steps of:
creating motion instruction information unique to the audio-visual program which consists of information with which the program provider that provides the audio-visual program requests the viewer to make a predetermined motion at times unique to the audio-visual program;
sending the motion instruction information to the audio-visual terminal operated by the viewer;
receiving information about a response motion of the viewer which is obtained from a detection result detected by a motion sensor of the audio-visual terminal and which is output from the audio-visual terminal operated by the viewer and sent back to transmit the fact that the viewer is normally viewing the audio-visual program;
processing the received information about a response motion of the viewer into information for use in authenticating that the viewer has viewed the audio-visual program;
analyzing the received information about a response motion of the viewer to specify the response motion of the viewer; and
recording the information for use in authenticating that the viewer has viewed the audio-visual program output from the viewing authentication system to authenticate that the viewer has viewed the audio-visual program.

* * * * *